US007213058B1

(12) United States Patent
Torres et al.

(10) Patent No.: US 7,213,058 B1

(45) Date of Patent: May 1, 2007

(54) SYSTEMS AND METHODS FOR PROCESSING AND MANAGING COLLOCATION APPLICATION OVER A COMPUTER NETWORK

(75) Inventors: Mark G. Torres, Birmingham, AL (US); Jennifer B. Thomas, Temple, GA (US); Dennis Brian, Floyds Knobs, IN (US); Nancy Spencer Kallus, Birmingham, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 748 days.

(21) Appl. No.: 10/084,532

(22) Filed: Feb. 27, 2002

(51) Int. Cl.
*G06F 15/16* (2006.01)
*G06F 15/177* (2006.01)

(52) U.S. Cl. .......................... 709/219; 709/220; 705/8; 705/22; 705/29; 715/505; 715/506; 715/507; 715/508; 379/207; 379/219; 379/220; 379/221; 379/230

(58) Field of Classification Search ........ 709/219–220; 705/8, 22, 29; 715/505–508; 379/207, 230, 379/219–221
See application file for complete search history.

(56) References Cited

U.S. PATENT DOCUMENTS 5,644,619 A * 7/1997 Farris et al. ............. 379/29.01
6,018,570 A * 1/2000 Matison ................. 379/207.15
6,104,999 A * 8/2000 Gilles et al. .................... 705/1
6,137,873 A * 10/2000 Gilles ..................... 379/202.01
6,249,578 B1 * 6/2001 Gilles et al. ........... 379/207.13
6,411,935 B1 * 6/2002 Gilles et al. .................... 705/1
6,487,285 B2 * 11/2002 Gilles et al. ........... 379/207.13
6,647,105 B1 * 11/2003 Gilles ..................... 379/201.12
6,681,007 B2 * 1/2004 Gilles et al. ........... 379/221.01
6,877,093 B1 * 4/2005 Desai et al. ................ 713/156
6,907,117 B2 * 6/2005 Gilles ..................... 379/201.12
2001/0034627 A1 10/2001 Curtis et al.

* cited by examiner

*Primary Examiner*—Zarni Maung
*Assistant Examiner*—Saket Daftuar
(74) *Attorney, Agent, or Firm*—Merchant & Gould

(57) ABSTRACT

The invention includes methods and systems of processing and managing applications for collocation space. In a computer network including a workstation, a web server, an application server, and a database, the invention assists users in completing applications for collocation space and allows for management of and preparation of responses to those applications. Generally, embodiments of the invention may include submitting and distributing collocation applications and firm orders online; allowing field personnel to respond to and monitor applications online throughout the response and provisioning process; providing notification to field groups and users via e-mail of the events affecting each application; and displaying the current status of each application.

27 Claims, 62 Drawing Sheets

Login Page

Please enter your name and password.

User Name:
Password:

Login

🛑 The colloration application does not support the use of the browser back button for navigation.

BELLSOUTH
Collocation

© *BELLSOUTH*

Home  Admin  Help  User Guide  Log Off

Collocation > User Admin - Change Password

Your password has expired, please enter a new one now. (0003)

User ID:   CLECTEST

New Password: [        ]

Confirm New Password: [        ]

Return To Admin

Change Password ▲

@ BELLSOUTH

Collocation > User Admin - Unlock Reference Code

Home  Admin  Help  User Guide  Log Off

Application Reference Code: [_____]  Clear Lock

Firm Order Reference Code: [_____]  Clear Lock

Return To Admin

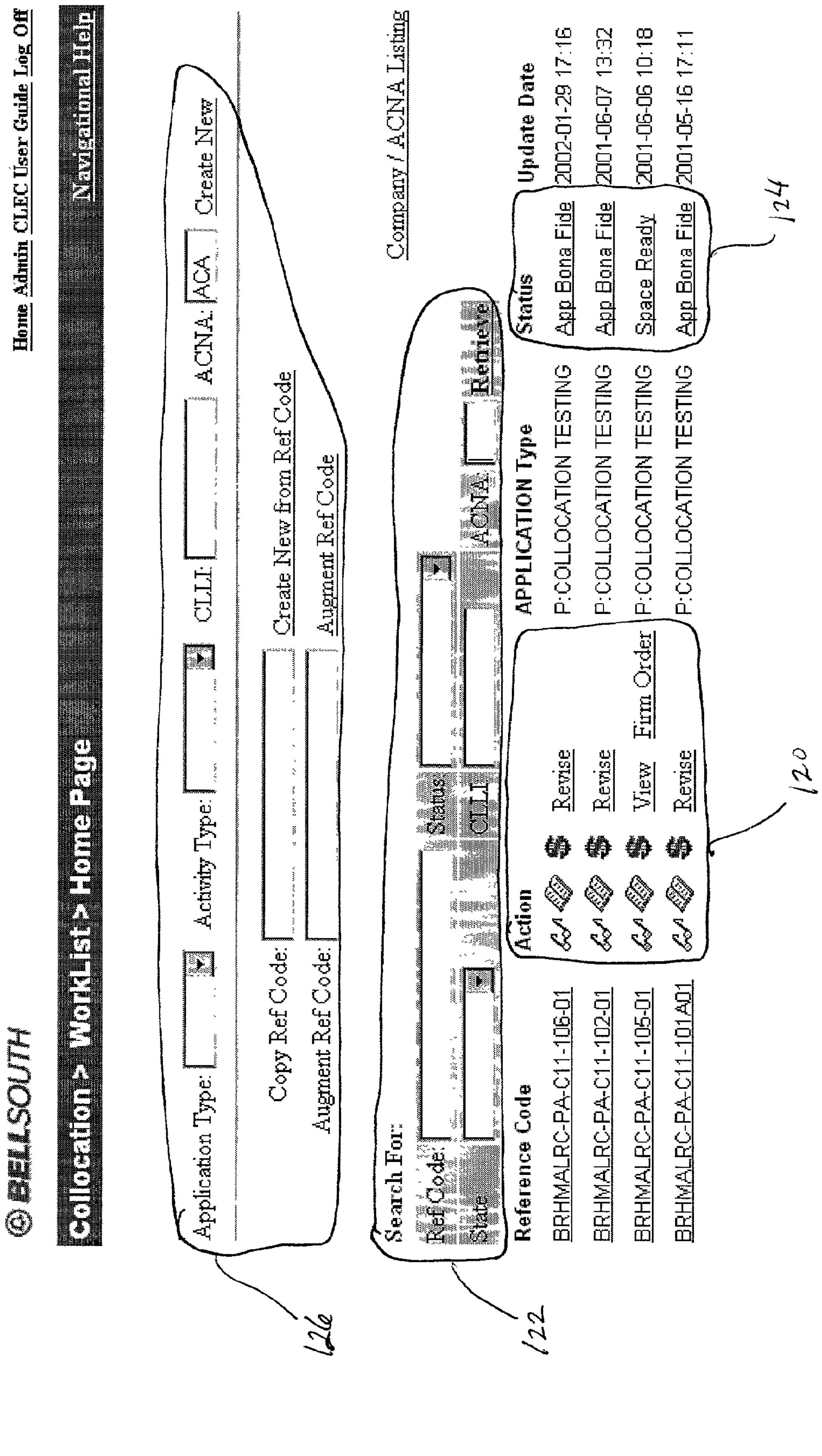

*Figure 8*

⊚ BELLSOUTH  Home Admin CLEC User Guide Log Off

Collocation > WorkList > Home Page  Navigational Help

Application Type: [ ▼ ]  Activity Type: [ ▼ ]  CLLI: [ ]  ACNA: [ACA]  Create New Copy Ref Code: [ ]  Create New from Ref Code Augment Ref Code: [ ]  Augment Ref Code

— 126

Search For:
Ref Code: [ ]
State: [ ▼ ]  Status [ ]  CLLI [ ]  ACNA [ ]  Retrieve

| Reference Code | Action | | Status | APPLICATION Type | Company / ACNA Listing | |
|---|---|---|---|---|---|---|
| | | | | | Status | Update Date |
| BRHMALRC-PA-C11-106-01 | 🗎 | $ | Revise | P:COLLOCATION TESTING | App Bona Fide | 2002-01-29 17:16 |
| BRHMALRC-PA-C11-102-01 | 🗎 | $ | Revise | P:COLLOCATION TESTING | App Bona Fide | 2001-06-07 13:32 |
| BRHMALRC-PA-C11-105-01 | 🗎 | $ | View Firm Order | P:COLLOCATION TESTING | Space Ready | 2001-06-06 10:18 |
| BRHMALRC-PA-C11-101A01 | 🗎 | $ | Revise | P:COLLOCATION TESTING | App Bona Fide | 2001-05-16 17:11 |

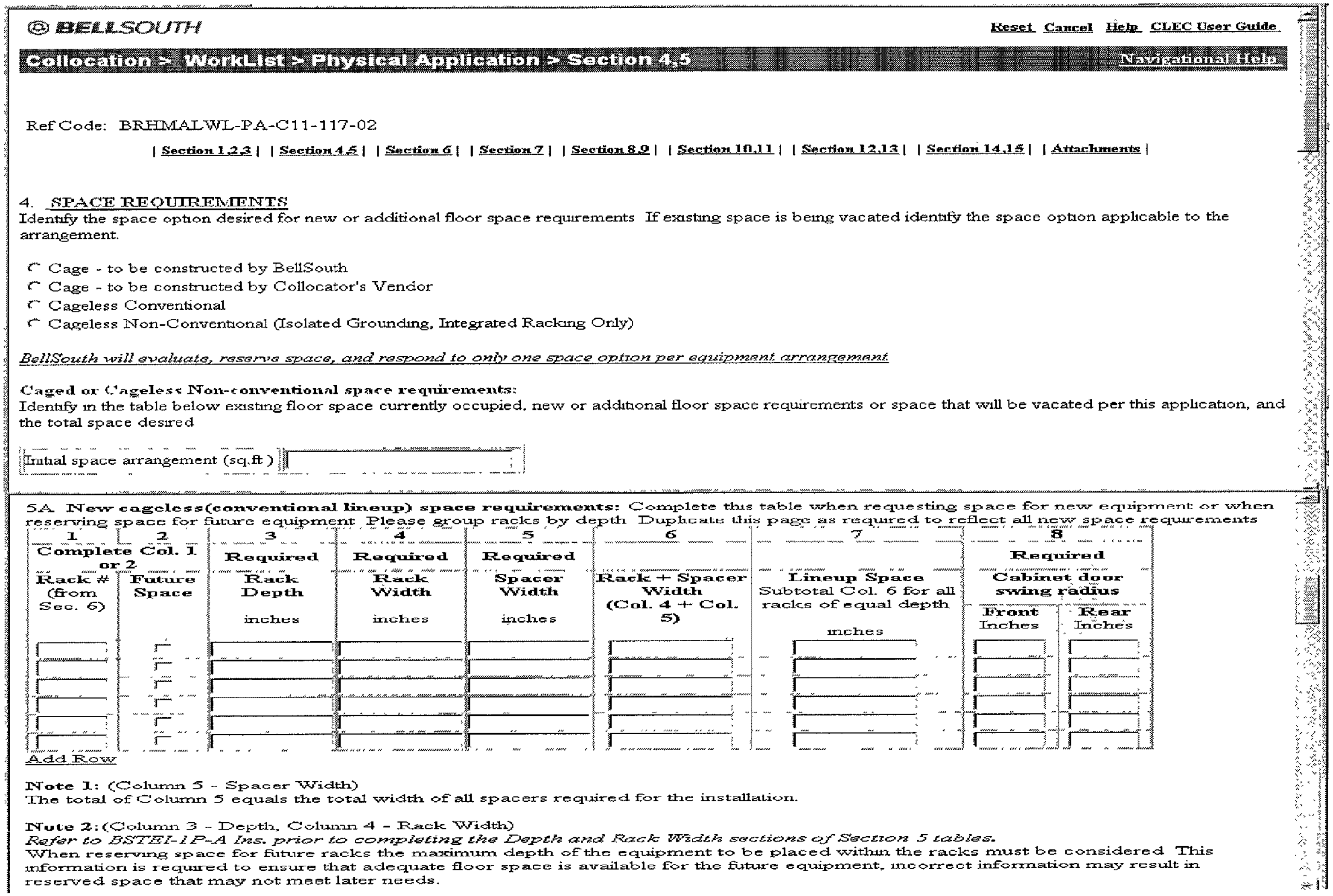

BELLSOUTH

Reset Cancel Help CLEC User Guide

Collocation > WorkList > Physical Application > Section 4,5

Navigational Help

Ref Code: BRHMALWL-PA-C11-117-02

| Section 1,2,3 | | Section 4,5 | | Section 6 | | Section 7 | | Section 8,9 | | Section 10,11 | | Section 12,13 | | Section 14,15 | | Attachments |

4. SPACE REQUIREMENTS

Identify the space option desired for new or additional floor space requirements If existing space is being vacated identify the space option applicable to the arrangement.

- Cage - to be constructed by BellSouth
- Cage - to be constructed by Collocator's Vendor
- Cageless Conventional
- Cageless Non-Conventional (Isolated Grounding, Integrated Racking Only)

*BellSouth will evaluate, reserve space, and respond to only one space option per equipment arrangement.*

Caged or Cageless Non-conventional space requirements:

Identify in the table below existing floor space currently occupied, new or additional floor space requirements or space that will be vacated per this application, and the total space desired Initial space arrangement (sq.ft)

5A. New cageless(conventional lineup) space requirements: Complete this table when requesting space for new equipment or when reserving space for future equipment Please group racks by depth Duplicate this page as required to reflect all new space requirements

| 1 | 2 | 3 | 4 | 5 | 6 | 7 | 8 | |
|---|---|---|---|---|---|---|---|---|
| Complete Col. 1 or 2 | | Required | Required | Required | | | Required | |
| Rack # (from Sec. 6) | Future Space | Rack Depth | Rack Width | Spacer Width | Rack + Spacer Width (Col. 4 + Col. 5) | Lineup Space Subtotal Col. 6 for all racks of equal depth | Cabinet door swing radius | |
| | | inches | inches | inches | | inches | Front Inches | Rear Inches |
| | | | | | | | | |
| | | | | | | | | |
| | | | | | | | | |
| | | | | | | | | |
| | | | | | | | | |
| | | | | | | | | |

Add Row

Note 1: (Column 5 - Spacer Width)
The total of Column 5 equals the total width of all spacers required for the installation.

Note 2: (Column 3 - Depth, Column 4 - Rack Width)
*Refer to BSTEI-1P-A Ins. prior to completing the Depth and Rack Width sections of Section 5 tables.*
When reserving space for future racks the maximum depth of the equipment to be placed within the racks must be considered This information is required to ensure that adequate floor space is available for the future equipment, incorrect information may result in reserved space that may not meet later needs.

*Figure 12*

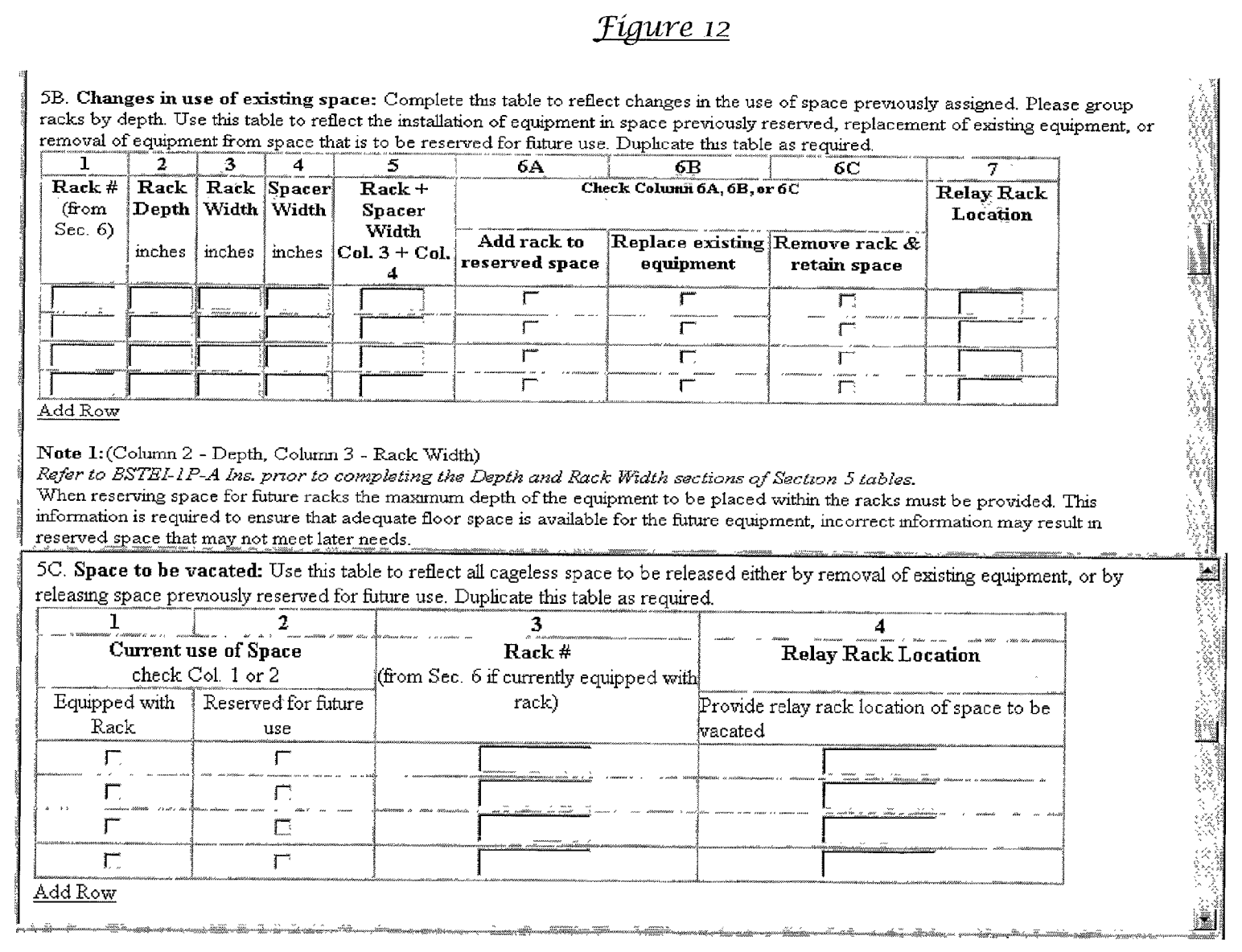

5B. Changes in use of existing space: Complete this table to reflect changes in the use of space previously assigned. Please group racks by depth. Use this table to reflect the installation of equipment in space previously reserved, replacement of existing equipment, or removal of equipment from space that is to be reserved for future use. Duplicate this table as required.

| 1 | 2 | 3 | 4 | 5 | 6A | 6B | 6C | 7 |
|---|---|---|---|---|---|---|---|---|
| **Rack #** (from Sec. 6) | **Rack Depth** inches | **Rack Width** inches | **Spacer Width** inches | **Rack + Spacer Width** **Col. 3 + Col. 4** | **Check Column 6A, 6B, or 6C** | | | **Relay Rack Location** |
| | | | | | **Add rack to reserved space** | **Replace existing equipment** | **Remove rack & retain space** | |
| | | | | | | | | |
| | | | | | | | | |
| | | | | | | | | |
| | | | | | | | | |

Add Row

Note 1: (Column 2 - Depth, Column 3 - Rack Width)
*Refer to BSTEI-1P-A Ins. prior to completing the Depth and Rack Width sections of Section 5 tables.*
When reserving space for future racks the maximum depth of the equipment to be placed within the racks must be provided. This information is required to ensure that adequate floor space is available for the future equipment, incorrect information may result in reserved space that may not meet later needs.

5C. Space to be vacated: Use this table to reflect all cageless space to be released either by removal of existing equipment, or by releasing space previously reserved for future use. Duplicate this table as required.

| 1 | 2 | 3 | 4 |
|---|---|---|---|
| **Current use of Space** check Col. 1 or 2 | | **Rack #** (from Sec. 6 if currently equipped with rack) | **Relay Rack Location** |
| Equipped with Rack | Reserved for future use | | Provide relay rack location of space to be vacated |
| | | | |
| | | | |
| | | | |
| | | | |

Add Row

Figure 13

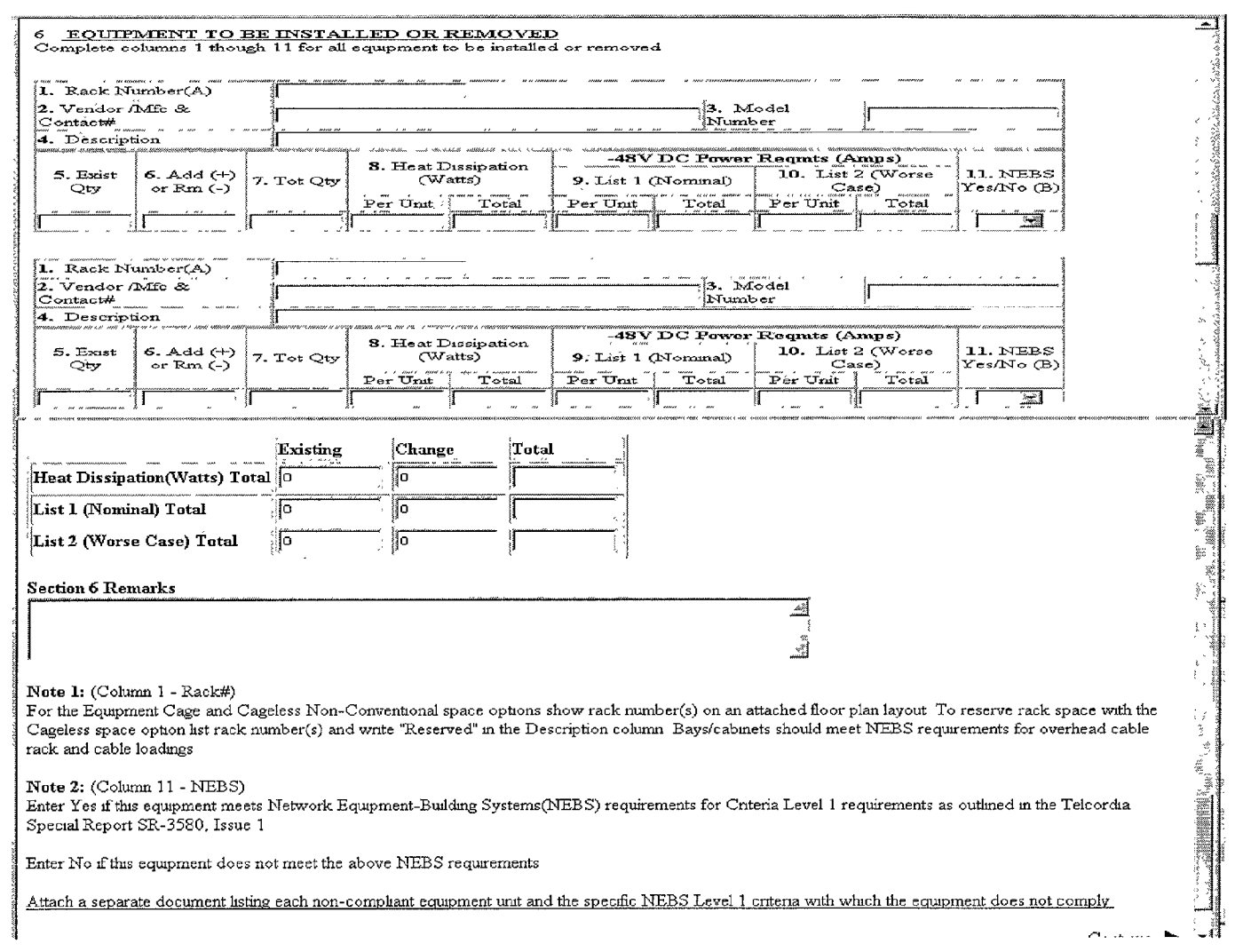

6 EQUIPMENT TO BE INSTALLED OR REMOVED

Complete columns 1 though 11 for all equipment to be installed or removed

1. Rack Number(A)
2. Vendor /Mfc & Contact#
3. Model Number
4. Description

| 5. Exist Qty | 6. Add (+) or Rm (-) | 7. Tot Qty | 8. Heat Dissipation (Watts) | | -48V DC Power Reqmts (Amps) | | | | 11. NEBS Yes/No (B) |
|---|---|---|---|---|---|---|---|---|---|
| | | | | | 9. List 1 (Nominal) | | 10. List 2 (Worse Case) | | |
| | | | Per Unit | Total | Per Unit | Total | Per Unit | Total | |

1. Rack Number(A)
2. Vendor /Mfc & Contact#
3. Model Number
4. Description

| 5. Exist Qty | 6. Add (+) or Rm (-) | 7. Tot Qty | 8. Heat Dissipation (Watts) | | -48V DC Power Reqmts (Amps) | | | | 11. NEBS Yes/No (B) |
|---|---|---|---|---|---|---|---|---|---|
| | | | | | 9. List 1 (Nominal) | | 10. List 2 (Worse Case) | | |
| | | | Per Unit | Total | Per Unit | Total | Per Unit | Total | |

| | Existing | Change | Total |
|---|---|---|---|
| **Heat Dissipation(Watts) Total** | 0 | 0 | |
| **List 1 (Nominal) Total** | 0 | 0 | |
| **List 2 (Worse Case) Total** | 0 | 0 | |

Section 6 Remarks

Note 1: (Column 1 - Rack#)
For the Equipment Cage and Cageless Non-Conventional space options show rack number(s) on an attached floor plan layout To reserve rack space with the Cageless space option list rack number(s) and write "Reserved" in the Description column Bays/cabinets should meet NEBS requirements for overhead cable rack and cable loadings

Note 2: (Column 11 - NEBS)
Enter Yes if this equipment meets Network Equipment-Building Systems(NEBS) requirements for Criteria Level 1 requirements as outlined in the Telcordia Special Report SR-3580, Issue 1

Enter No if this equipment does not meet the above NEBS requirements

Attach a separate document listing each non-compliant equipment unit and the specific NEBS Level 1 criteria with which the equipment does not comply

*Figure 14*

7. -48 POWER AND GROUNDING

Indicate which of the following apply.

- ○ Power requirements for initial installation.
- ○ Additional power requirements for an existing arrangement augmentation.
- ○ Arrangement augmentation, no additional power required

Completion of this section is required if -48V telecommunications equipment power is to be provided by BST. Refer to BSTEI-1P-A instructions for a complete description of available power options and responsibilities.

7A ○ Yes ○ No Does any of this equipment require an isolated ground plane and associated power supply grounding as described in Bellcore (Telcordia) Technical Reference TR-NWT-000295 (a k a TR-295) and BellSouth Engineering and Installation Standards for Central Office Equipment TR-73503? If Yes, complete section 7B.

○ Yes ○ No Will any of this equipment be installed (and grounded) as part of the building integrated ground plane (i.e not part of an isolated ground plane)? If Yes, complete section 7C.

7B -48V DC Power for Equipment Installed as Part of an Isolated Ground Plane.

Specify the quantity of BST provided isolated ground -48V DC breakers. BST will always provide redundant "A" and "B" breaker pairs Order in multiples of two, i.e., for each "A" and "B" breaker pair order two breakers All breakers are rated at 225 amps.

| Existing | Additional | Total | Terminating BDFB/PDF Rack No. per collocator provided equipment layout |
|---|---|---|---|
| | | | |
| | | | |
| | | | |
| | | | |

Add Row

*Figure 15*

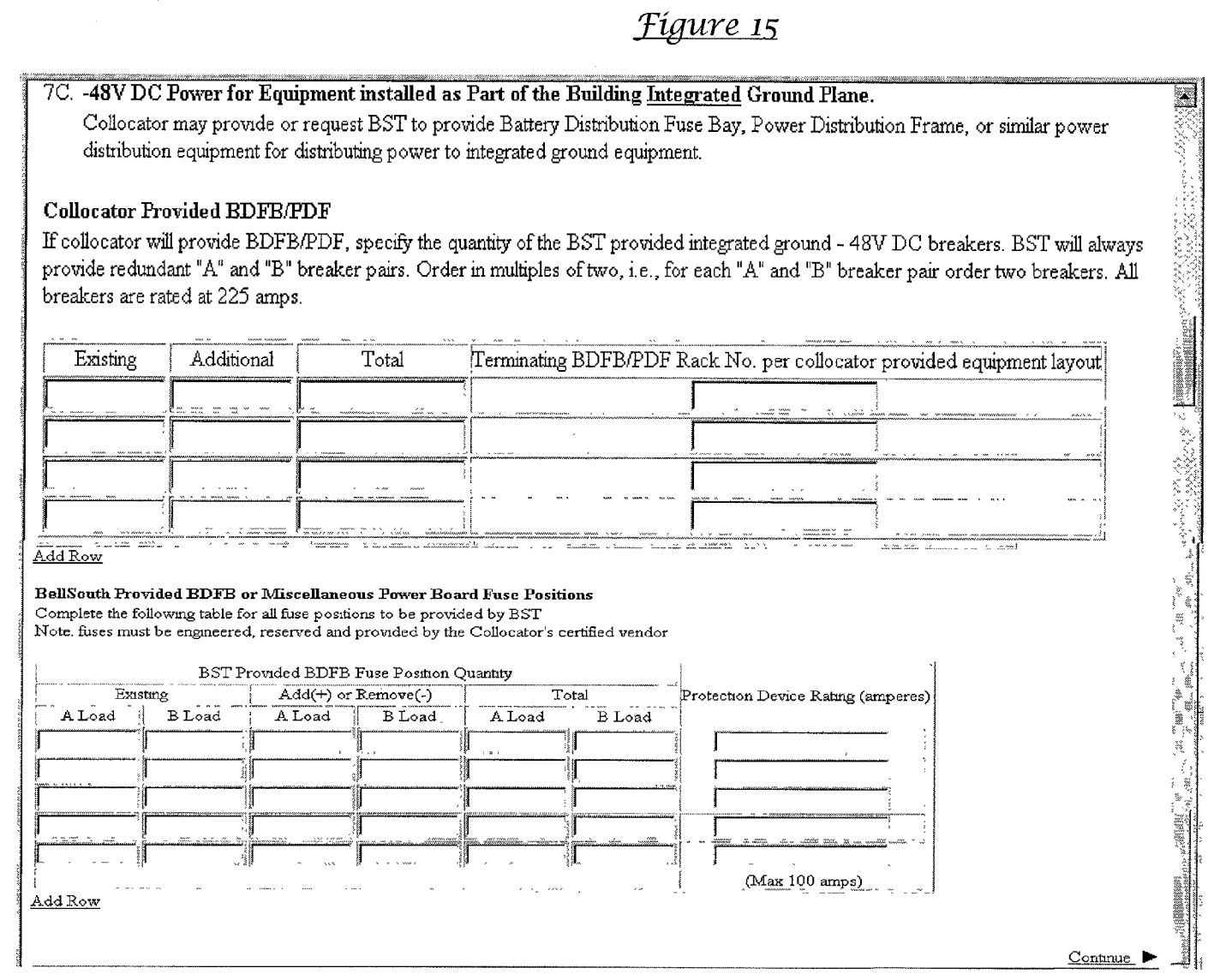

7C. -48V DC Power for Equipment installed as Part of the Building Integrated Ground Plane.

Collocator may provide or request BST to provide Battery Distribution Fuse Bay, Power Distribution Frame, or similar power distribution equipment for distributing power to integrated ground equipment.

Collocator Provided BDFB/PDF

If collocator will provide BDFB/PDF, specify the quantity of the BST provided integrated ground - 48V DC breakers. BST will always provide redundant "A" and "B" breaker pairs. Order in multiples of two, i.e., for each "A" and "B" breaker pair order two breakers. All breakers are rated at 225 amps.

| Existing | Additional | Total | Terminating BDFB/PDF Rack No. per collocator provided equipment layout |
|---|---|---|---|
| | | | |
| | | | |
| | | | |
| | | | |

Add Row

BellSouth Provided BDFB or Miscellaneous Power Board Fuse Positions

Complete the following table for all fuse positions to be provided by BST

Note. fuses must be engineered, reserved and provided by the Collocator's certified vendor

| BST Provided BDFB Fuse Position Quantity | | | | | | Protection Device Rating (amperes) |
|---|---|---|---|---|---|---|
| Existing | | Add(+) or Remove(-) | | Total | | |
| A Load | B Load | A Load | B Load | A Load | B Load | |
| | | | | | | |
| | | | | | | |
| | | | | | | |
| | | | | | | |
| | | | | | | |
| | | | | | | (Max 100 amps) |

Add Row

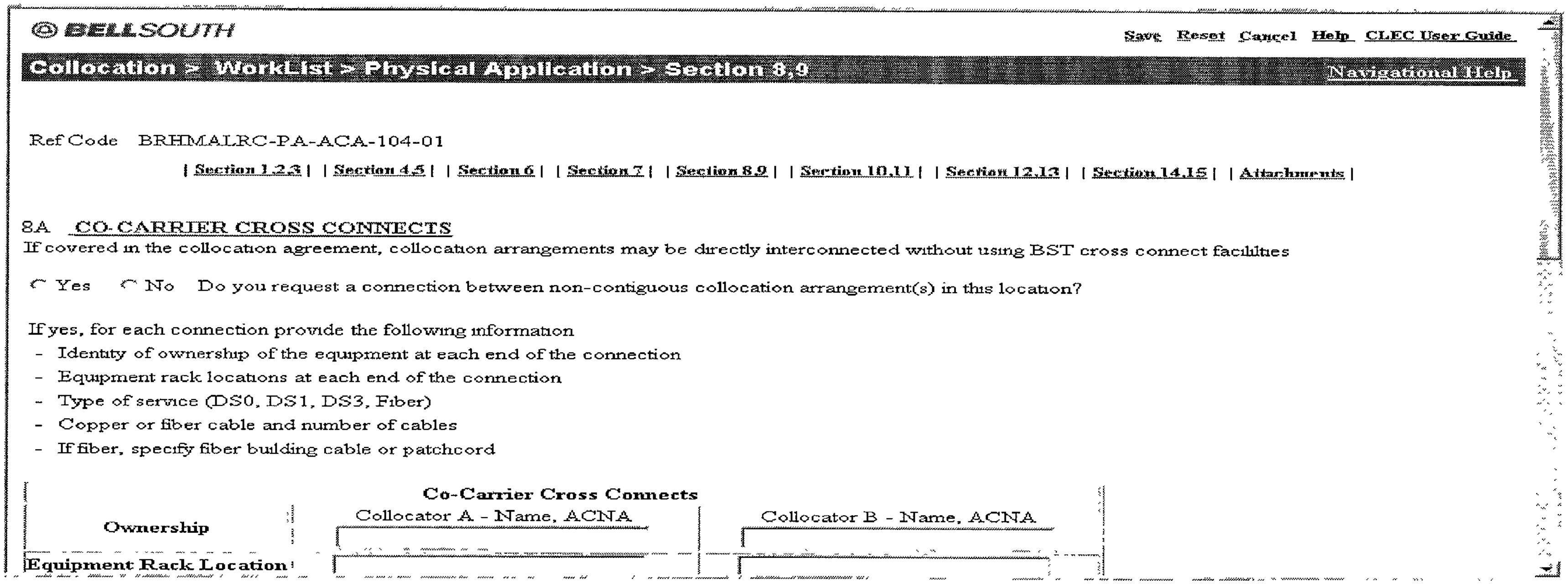

BELLSOUTH

Collocation > WorkList > Physical Application > Section 8,9

Save  Reset  Cancel  Help  CLEC User Guide
Navigational Help

Ref Code  BRHMALRC-PA-ACA-104-01

| Section 1,2,3 | | Section 4,5 | | Section 6 | | Section 7 | | Section 8,9 | | Section 10,11 | | Section 12,13 | | Section 14,15 | | Attachments |

8A. CO-CARRIER CROSS CONNECTS

If covered in the collocation agreement, collocation arrangements may be directly interconnected without using BST cross connect facilities ○ Yes  ○ No   Do you request a connection between non-contiguous collocation arrangement(s) in this location?

If yes, for each connection provide the following information
- Identity of ownership of the equipment at each end of the connection
- Equipment rack locations at each end of the connection
- Type of service (DS0, DS1, DS3, Fiber)
- Copper or fiber cable and number of cables
- If fiber, specify fiber building cable or patchcord

Co-Carrier Cross Connects

| Ownership | Collocator A - Name, ACNA | Collocator B - Name, ACNA |
|---|---|---|
| Equipment Rack Location | | |

*Figure 17*

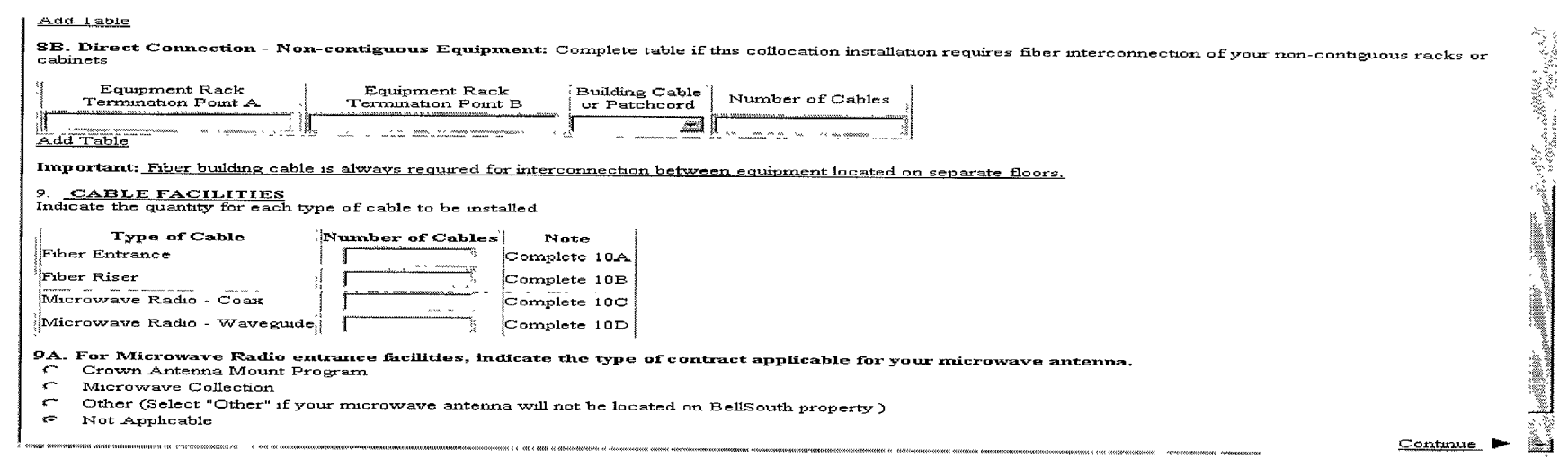

Add Table

8B. Direct Connection - Non-contiguous Equipment: Complete table if this collocation installation requires fiber interconnection of your non-contiguous racks or cabinets

| Equipment Rack Termination Point A | Equipment Rack Termination Point B | Building Cable or Patchcord | Number of Cables |
|---|---|---|---|
| | | | |

Add Table

Important: Fiber building cable is always required for interconnection between equipment located on separate floors.

9. CABLE FACILITIES

Indicate the quantity for each type of cable to be installed

| Type of Cable | Number of Cables | Note |
|---|---|---|
| Fiber Entrance | | Complete 10A |
| Fiber Riser | | Complete 10B |
| Microwave Radio - Coax | | Complete 10C |
| Microwave Radio - Waveguide | | Complete 10D |

9A. For Microwave Radio entrance facilities, indicate the type of contract applicable for your microwave antenna.

- ○ Crown Antenna Mount Program
- ○ Microwave Collection
- ○ Other (Select "Other" if your microwave antenna will not be located on BellSouth property)
- ◉ Not Applicable Continue ▶

Figure 18

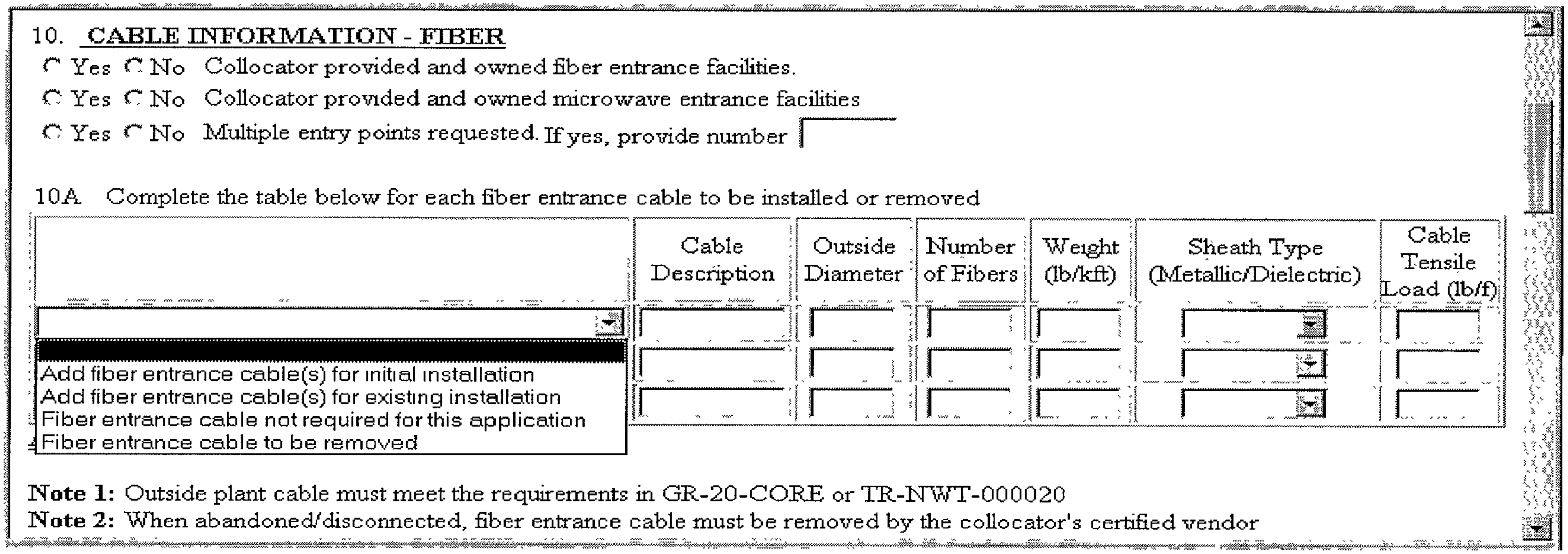

10. CABLE INFORMATION - FIBER

○ Yes ○ No  Collocator provided and owned fiber entrance facilities.
○ Yes ○ No  Collocator provided and owned microwave entrance facilities
○ Yes ○ No  Multiple entry points requested. If yes, provide number ____

10A. Complete the table below for each fiber entrance cable to be installed or removed

| | Cable Description | Outside Diameter | Number of Fibers | Weight (lb/kft) | Sheath Type (Metallic/Dielectric) | Cable Tensile Load (lb/ft) |
|---|---|---|---|---|---|---|
| Add fiber entrance cable(s) for initial installation | | | | | | |
| Add fiber entrance cable(s) for existing installation | | | | | | |
| Fiber entrance cable not required for this application | | | | | | |
| Fiber entrance cable to be removed | | | | | | |

Note 1: Outside plant cable must meet the requirements in GR-20-CORE or TR-NWT-000020
Note 2: When abandoned/disconnected, fiber entrance cable must be removed by the collocator's certified vendor

*Figure 19*

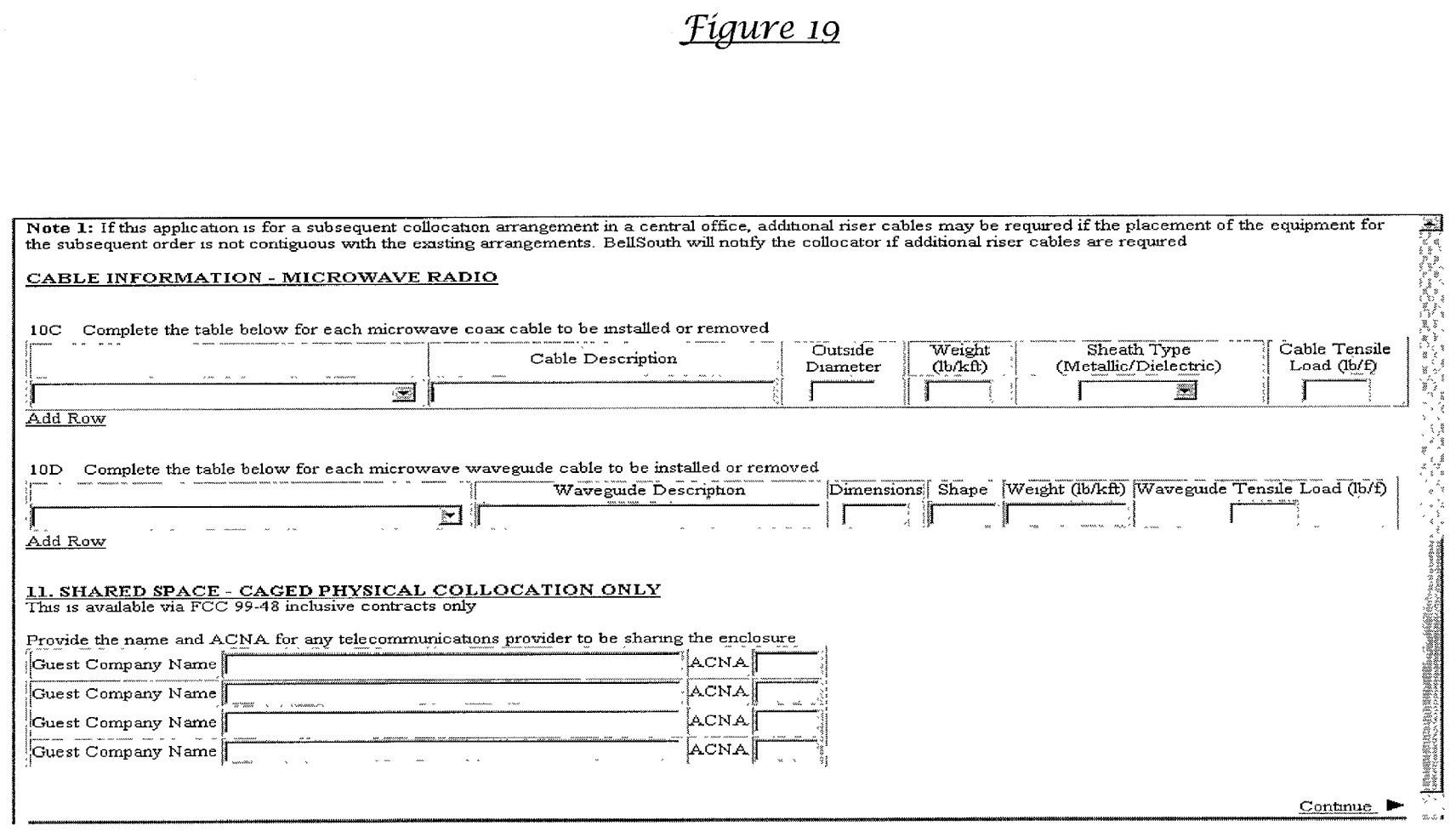

Note 1: If this application is for a subsequent collocation arrangement in a central office, additional riser cables may be required if the placement of the equipment for the subsequent order is not contiguous with the existing arrangements. BellSouth will notify the collocator if additional riser cables are required

CABLE INFORMATION - MICROWAVE RADIO

10C Complete the table below for each microwave coax cable to be installed or removed

| | Cable Description | Outside Diameter | Weight (lb/kft) | Sheath Type (Metallic/Dielectric) | Cable Tensile Load (lb/f) |
|---|---|---|---|---|---|
| | | | | | |

Add Row

10D Complete the table below for each microwave waveguide cable to be installed or removed

| | Waveguide Description | Dimensions | Shape | Weight (lb/kft) | Waveguide Tensile Load (lb/f) |
|---|---|---|---|---|---|
| | | | | | |

Add Row

11. SHARED SPACE - CAGED PHYSICAL COLLOCATION ONLY

This is available via FCC 99-48 inclusive contracts only

Provide the name and ACNA for any telecommunications provider to be sharing the enclosure

| | | | |
|---|---|---|---|
| Guest Company Name | | ACNA | |
| Guest Company Name | | ACNA | |
| Guest Company Name | | ACNA | |
| Guest Company Name | | ACNA | |

Figure 20:
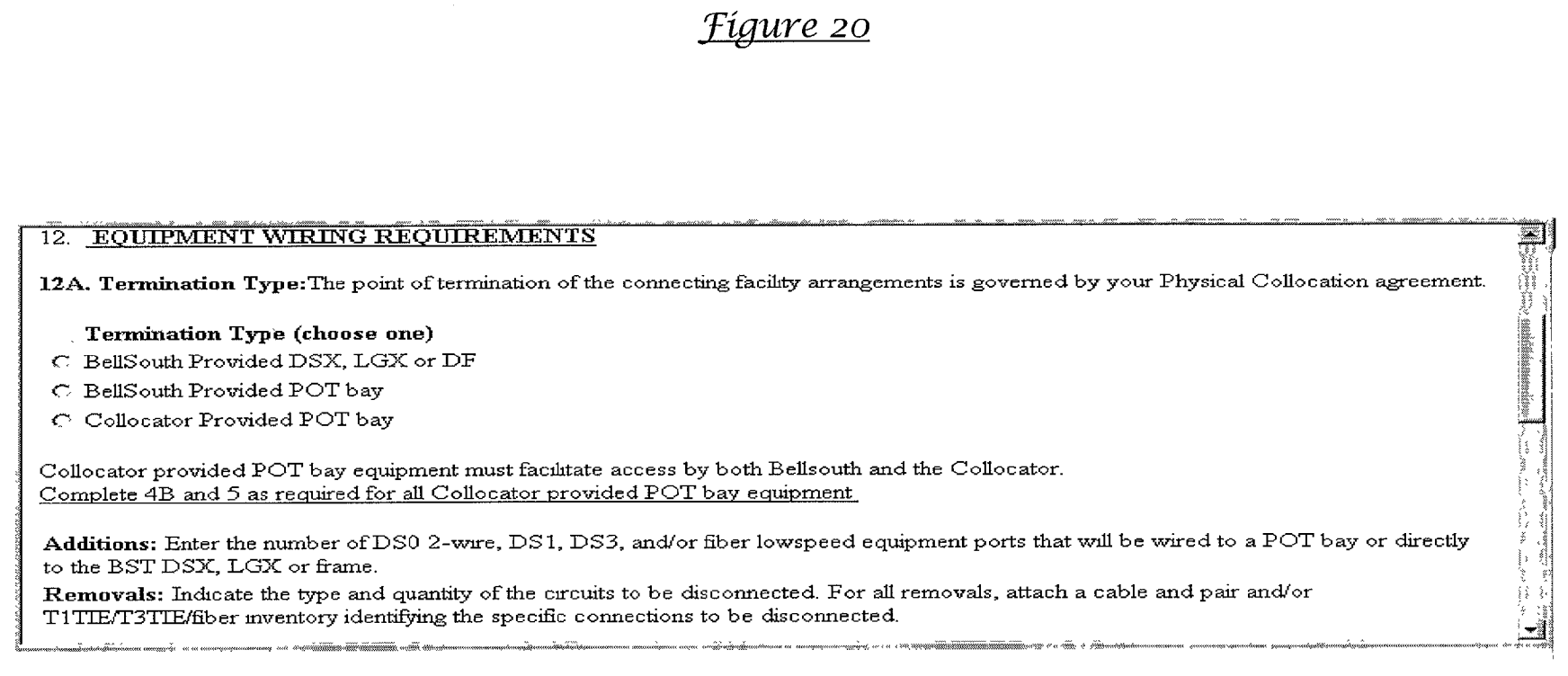

12. <u>EQUIPMENT WIRING REQUIREMENTS</u>

12A. Termination Type: The point of termination of the connecting facility arrangements is governed by your Physical Collocation agreement.

Termination Type (choose one)

- ○ BellSouth Provided DSX, LGX or DF
- ○ BellSouth Provided POT bay
- ○ Collocator Provided POT bay Collocator provided POT bay equipment must facilitate access by both Bellsouth and the Collocator.
<u>Complete 4B and 5 as required for all Collocator provided POT bay equipment</u>

Additions: Enter the number of DS0 2-wire, DS1, DS3, and/or fiber lowspeed equipment ports that will be wired to a POT bay or directly to the BST DSX, LGX or frame.

Removals: Indicate the type and quantity of the circuits to be disconnected. For all removals, attach a cable and pair and/or T1TIE/T3TIE/fiber inventory identifying the specific connections to be disconnected.

*Figure 21*

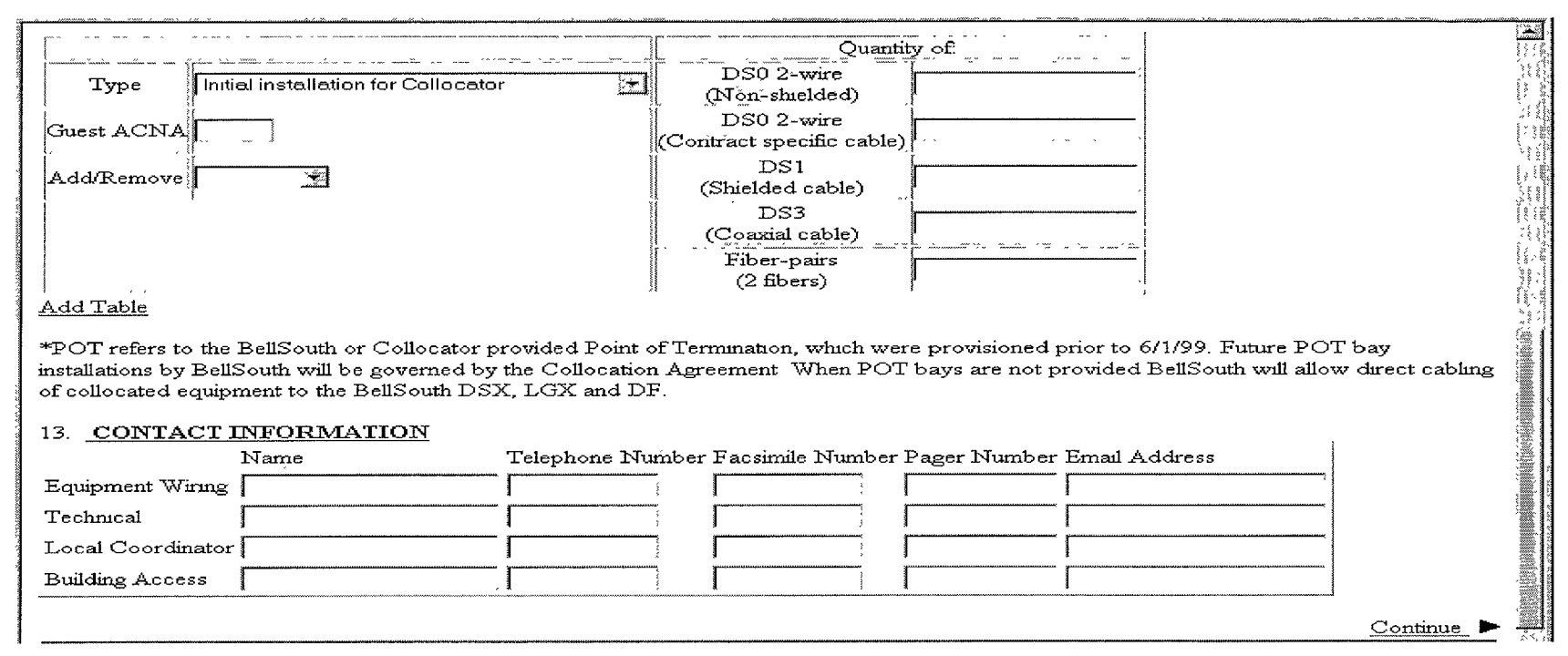

| | | Quantity of: | |
|---|---|---|---|
| Type | Initial installation for Collocator | DS0 2-wire (Non-shielded) | |
| Guest ACNA | | DS0 2-wire (Contract specific cable) | |
| Add/Remove | | DS1 (Shielded cable) | |
| | | DS3 (Coaxial cable) | |
| | | Fiber-pairs (2 fibers) | |

Add Table

*POT refers to the BellSouth or Collocator provided Point of Termination, which were provisioned prior to 6/1/99. Future POT bay installations by BellSouth will be governed by the Collocation Agreement When POT bays are not provided BellSouth will allow direct cabling of collocated equipment to the BellSouth DSX, LGX and DF.

13. CONTACT INFORMATION

| | Name | Telephone Number | Facsimile Number | Pager Number | Email Address |
|---|---|---|---|---|---|
| Equipment Wiring | | | | | |
| Technical | | | | | |
| Local Coordinator | | | | | |
| Building Access | | | | | |

Figure 22:
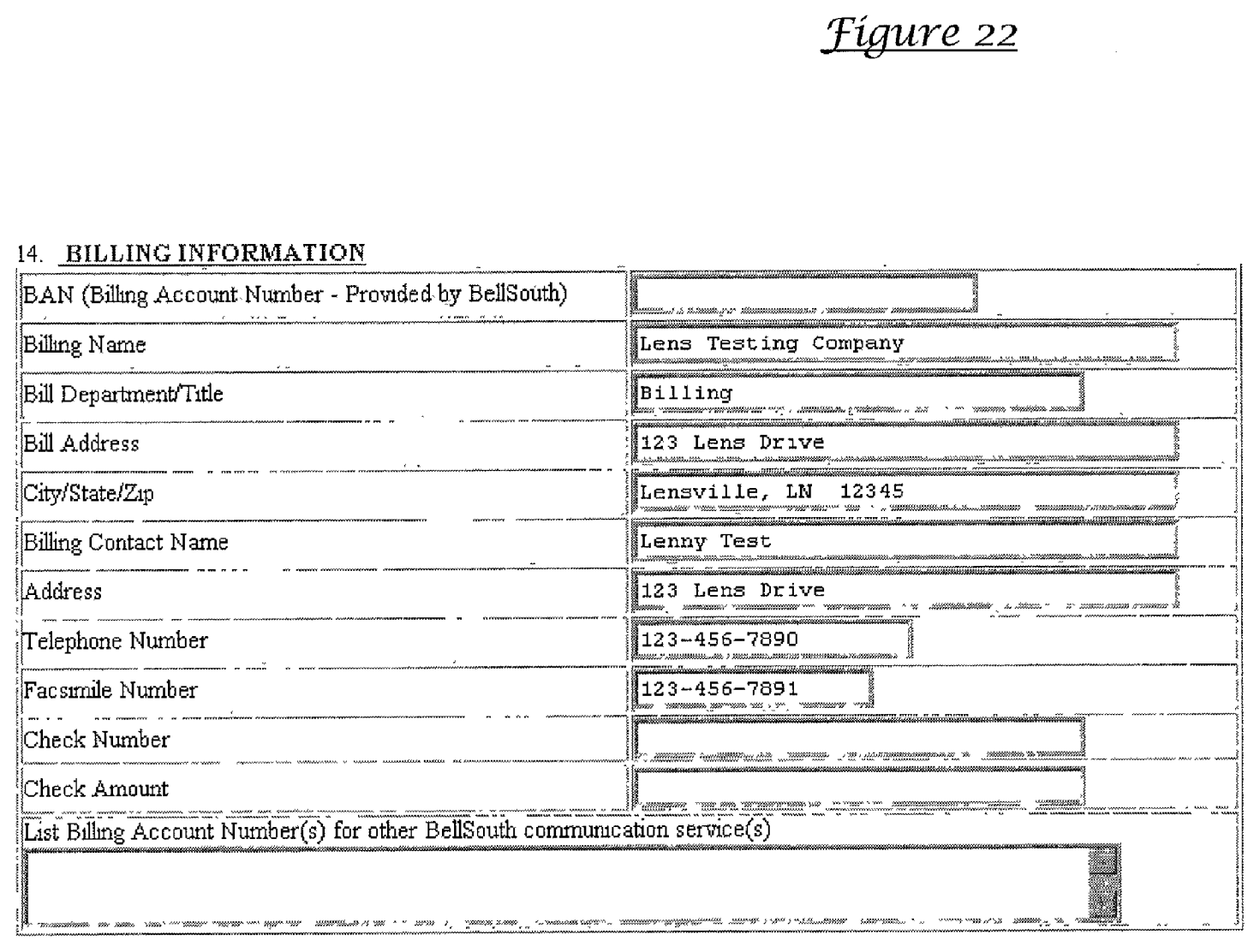

14. BILLING INFORMATION

| | |
|---|---|
| BAN (Billing Account Number - Provided by BellSouth) | |
| Billing Name | Lens Testing Company |
| Bill Department/Title | Billing |
| Bill Address | 123 Lens Drive |
| City/State/Zip | Lensville, LN 12345 |
| Billing Contact Name | Lenny Test |
| Address | 123 Lens Drive |
| Telephone Number | 123-456-7890 |
| Facsimile Number | 123-456-7891 |
| Check Number | |
| Check Amount | |
| List Billing Account Number(s) for other BellSouth communication service(s) | |

*Figure 23*

15. TECHNICAL COMPLIANCE
Applicant certifies that equipment is in compliance with the following industry standards - Criteria Level 1 requirements as outlined in the Bellcore (Telcordia) Special Report SR-3580 Issue 1.
- Equipment design spacial requirements per GR-63-CORE, Section 2.
- Thermal heat dissipation per GR-63-CORE, Section 4, Criteria 77-79.
- Acoustic noise per GR-63-CORE, Section 4, Criterion 128. - Applicable National Electric Code requirements.

Check for certification: ☑ I hereby certify that the equipment listed on page 5 in this document meet the industry standards for safety and compatability For equipment which is noncompliant, attached is documentation describing the equipment, including exceptions or deviations from the above standards.

| | |
|---|---|
| Name: | Lenny Test |
| Date: | 7/15/00 |
| Title: | VP-Everything |
| Company. | Lens Testing Company |

Use of Space in Central Offices
From time to time BellSouth may require access to space occupied by collocator. BellSouth retains the right to access such space for the purpose of making equipment and building modifications, e g., running, altering or removing racking; ducts; electrical wiring; HVAC; and cables. BellSouth will give reasonable notice to collocator when access to collocation space is required and collocator may elect to be present whenever BellSouth performs work in the collocation space. It is agreed that collocator will not bear any of the expense associated with this work Continue ▶

Figure 25

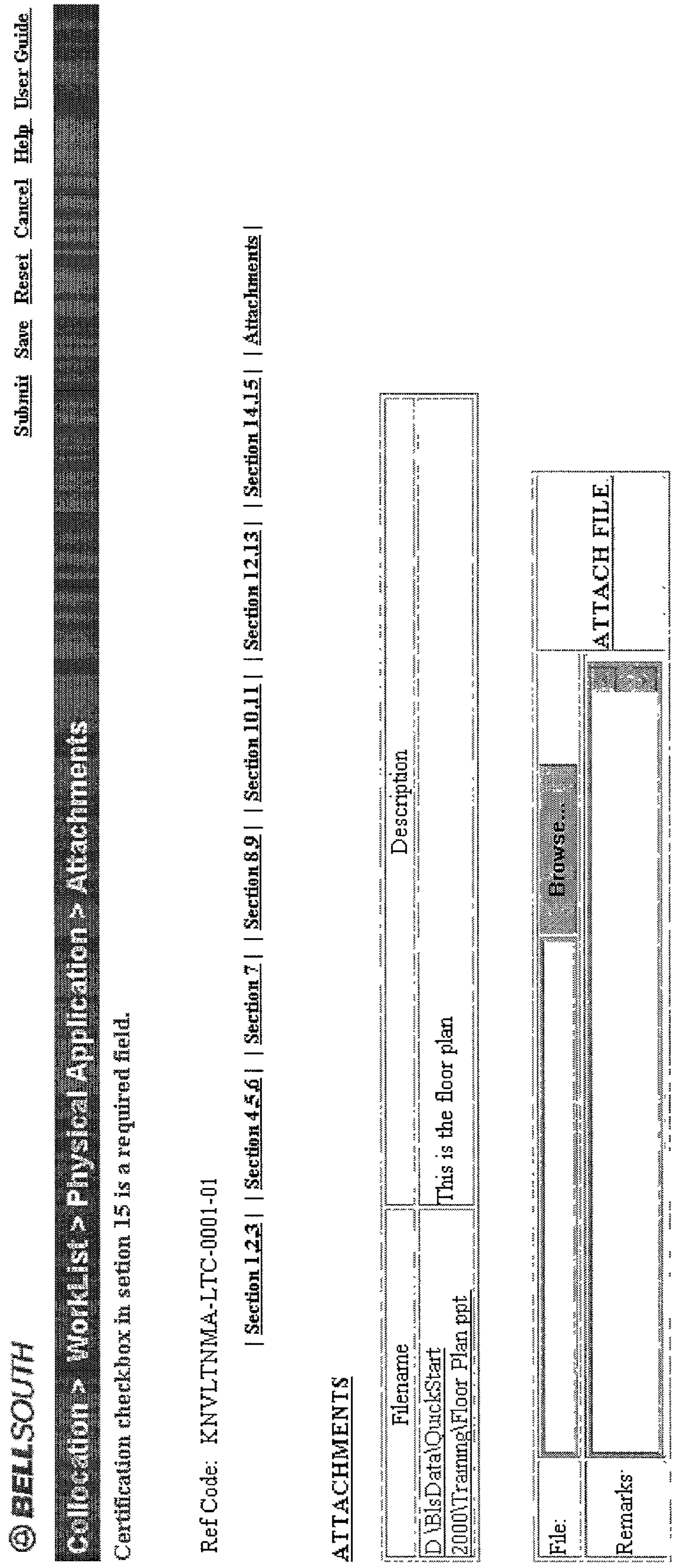

@BELLSOUTH                    Submit  Save  Reset  Cancel  Help  User Guide

Collocation > WorkList > Physical Application > Attachments

Certification checkbox in setion 15 is a required field.

Ref Code: KNVLTNMA-LTC-0001-01

| Section 1,2,3 | | Section 4,5,6 | | Section 7 | | Section 8,9 | | Section 10,11 | | Section 12,13 | | Section 14,15 | | Attachments |

ATTACHMENTS

| Filename | Description |
|---|---|
| D:\Bls\Data\QuickStart 2000\Training\Floor Plan.ppt | This is the floor plan |

File:       [Browse...]
Remarks:
            [ATTACH FILE]

© BELLSOUTH

Collocation > WorkList > Physical Application > Acknowledgement | Navigational Help Application ATLNGAPP-PA-C11-100-02 was successfully submitted on Wednesday, 12/12/2001 at 11:45 AM EST.

Return to Worklist ▲

*Figure 28*

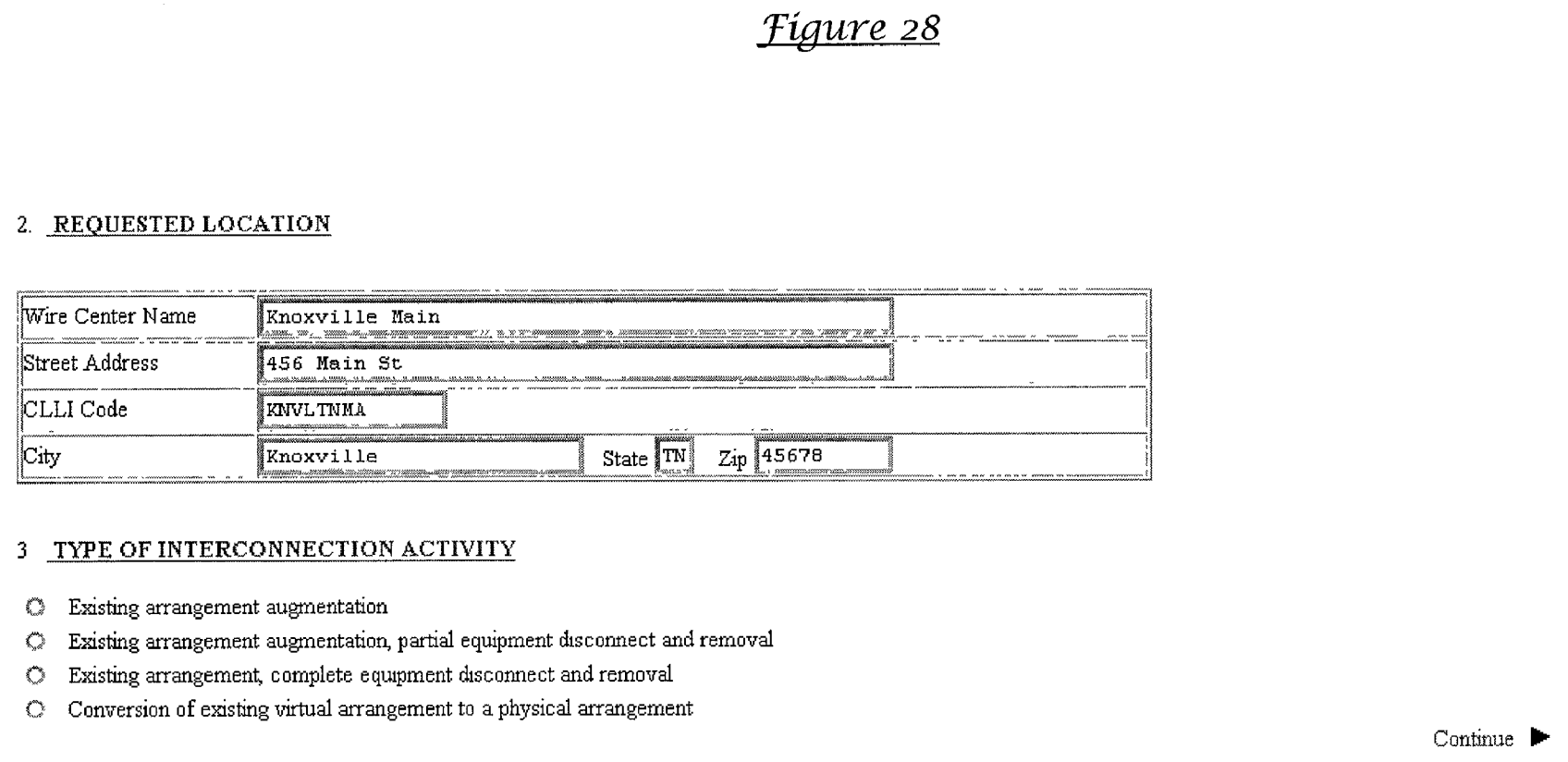

2. REQUESTED LOCATION

| | | | | | |
|---|---|---|---|---|---|
| Wire Center Name | Knoxville Main | | | | |
| Street Address | 456 Main St | | | | |
| CLLI Code | KNVLTNMA | | | | |
| City | Knoxville | State | TN | Zip | 45678 |

3 TYPE OF INTERCONNECTION ACTIVITY

- ○ Existing arrangement augmentation
- ○ Existing arrangement augmentation, partial equipment disconnect and removal
- ○ Existing arrangement, complete equipment disconnect and removal
- ○ Conversion of existing virtual arrangement to a physical arrangement Continue ▶

*Figure 30*

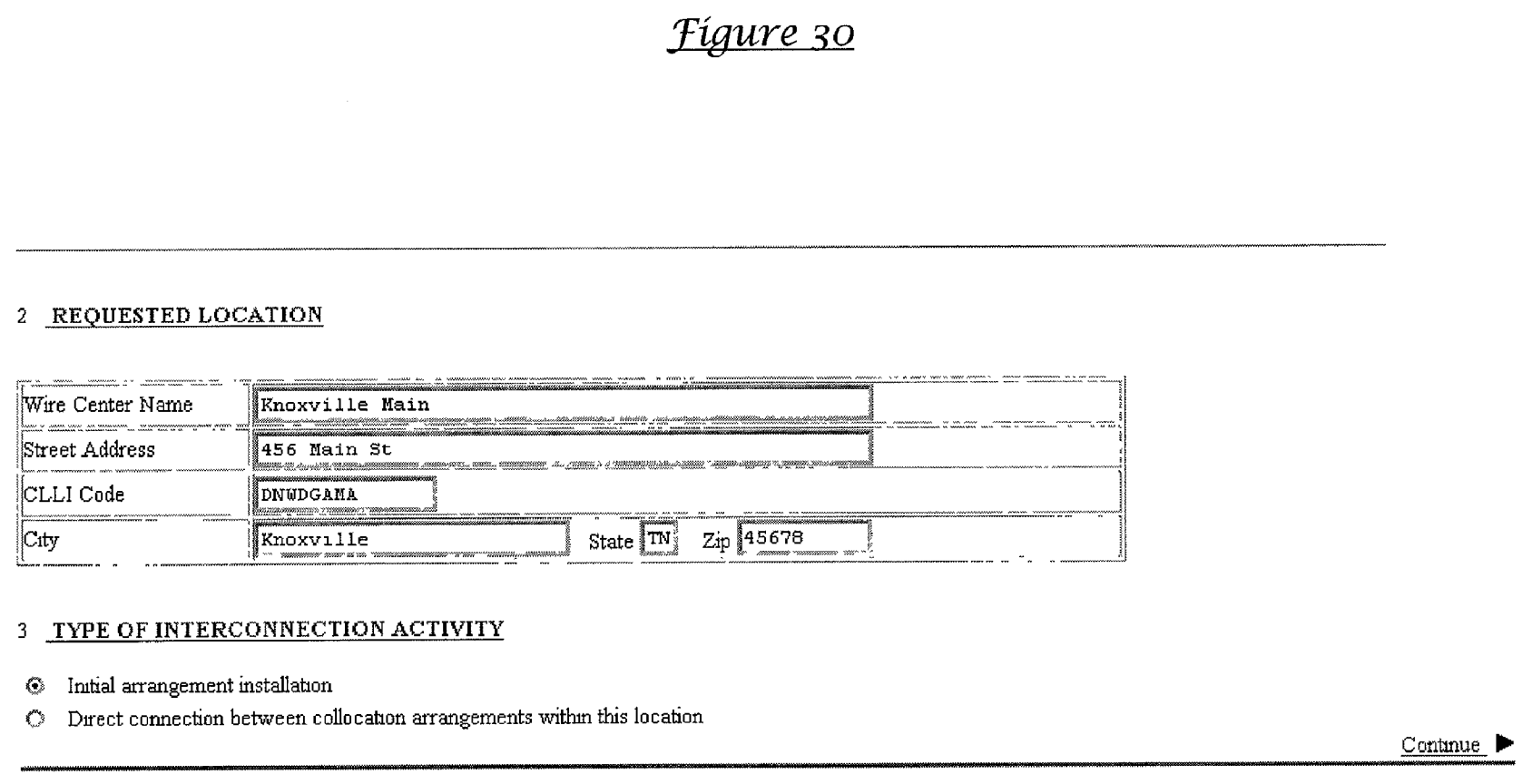

2 REQUESTED LOCATION

| | | | | | |
|---|---|---|---|---|---|
| Wire Center Name | Knoxville Main | | | | |
| Street Address | 456 Main St | | | | |
| CLLI Code | DNWDGAMA | | | | |
| City | Knoxville | State | TN | Zip | 45678 |

3 TYPE OF INTERCONNECTION ACTIVITY

- ◉ Initial arrangement installation
- ○ Direct connection between collocation arrangements within this location Continue ▶

*Figure 31*

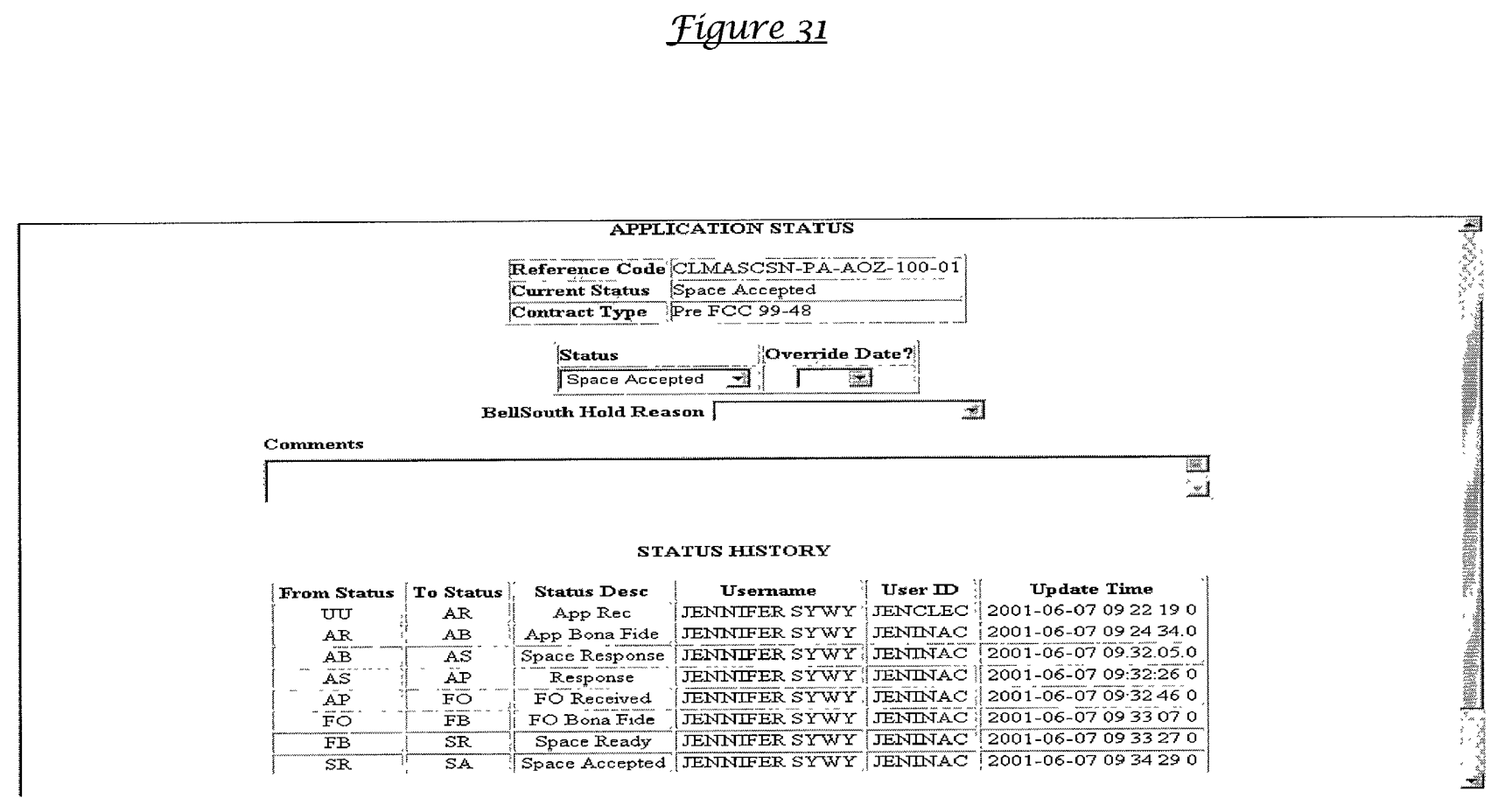

APPLICATION STATUS

| | |
|---|---|
| **Reference Code** | CLMASCSN-PA-AOZ-100-01 |
| **Current Status** | Space Accepted |
| **Contract Type** | Pre FCC 99-48 |

| **Status** | **Override Date?** |
|---|---|
| Space Accepted | |

BellSouth Hold Reason

Comments

STATUS HISTORY

| From Status | To Status | Status Desc | Username | User ID | Update Time |
|---|---|---|---|---|---|
| UU | AR | App Rec | JENNIFER SYWY | JENCLEC | 2001-06-07 09 22 19 0 |
| AR | AB | App Bona Fide | JENNIFER SYWY | JENINAC | 2001-06-07 09 24 34.0 |
| AB | AS | Space Response | JENNIFER SYWY | JENINAC | 2001-06-07 09.32.05.0 |
| AS | AP | Response | JENNIFER SYWY | JENINAC | 2001-06-07 09:32:26 0 |
| AP | FO | FO Received | JENNIFER SYWY | JENINAC | 2001-06-07 09·32 46 0 |
| FO | FB | FO Bona Fide | JENNIFER SYWY | JENINAC | 2001-06-07 09 33 07 0 |
| FB | SR | Space Ready | JENNIFER SYWY | JENINAC | 2001-06-07 09 33 27 0 |
| SR | SA | Space Accepted | JENNIFER SYWY | JENINAC | 2001-06-07 09 34 29 0 |

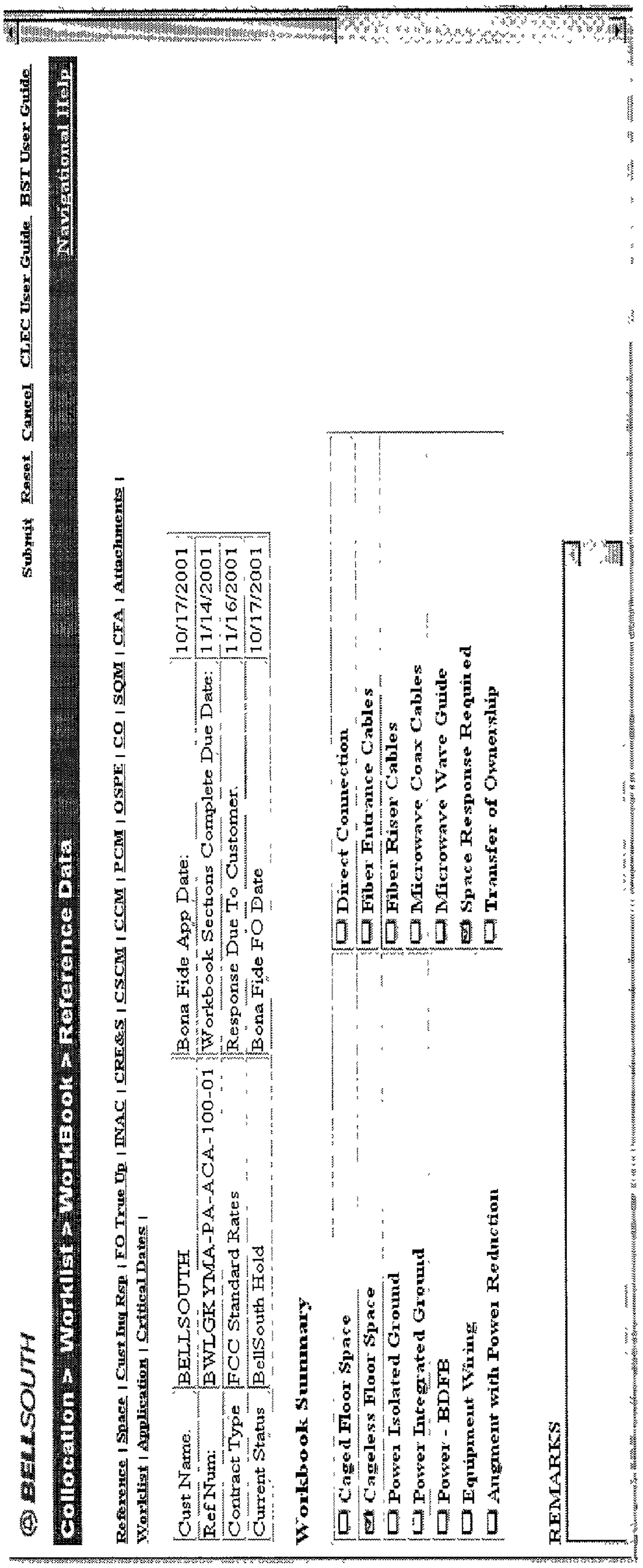

Figure 32

@BELLSOUTH                                                                              Submit Reset Cancel CLEC User Guide BST User Guide

Collocation > Worklist > WorkBook > Reference Data                                                              Navigational Help Reference | Space | Cust Inq Rsp | FO True Up | INAC | CRE&S | CSCM | CCM | PCM | OSPE | CO | SQM | CFA | Attachments |
Worklist | Application | Critical Dates |

| Cust Name:      | BELLSOUTH                | Bona Fide App Date:                  | 10/17/2001 |
|-----------------|--------------------------|--------------------------------------|------------|
| Ref Num:        | BWLGKYMA-PA-ACA-100-01   | Workbook Sections Complete Due Date: | 11/14/2001 |
| Contract Type   | FCC Standard Rates       | Response Due To Customer:            | 11/16/2001 |
| Current Status  | BellSouth Hold           | Bona Fide FO Date                    | 10/17/2001 |

Workbook Summary

- ☐ Caged Floor Space
- ☑ Cageless Floor Space
- ☐ Power Isolated Ground
- ☐ Power Integrated Ground
- ☐ Power - BDFB
- ☐ Equipment Wiring
- ☐ Augment with Power Reduction

- ☐ Direct Connection
- ☐ Fiber Entrance Cables
- ☐ Fiber Riser Cables
- ☐ Microwave Coax Cables
- ☐ Microwave Wave Guide
- ☑ Space Response Required
- ☐ Transfer of Ownership

REMARKS

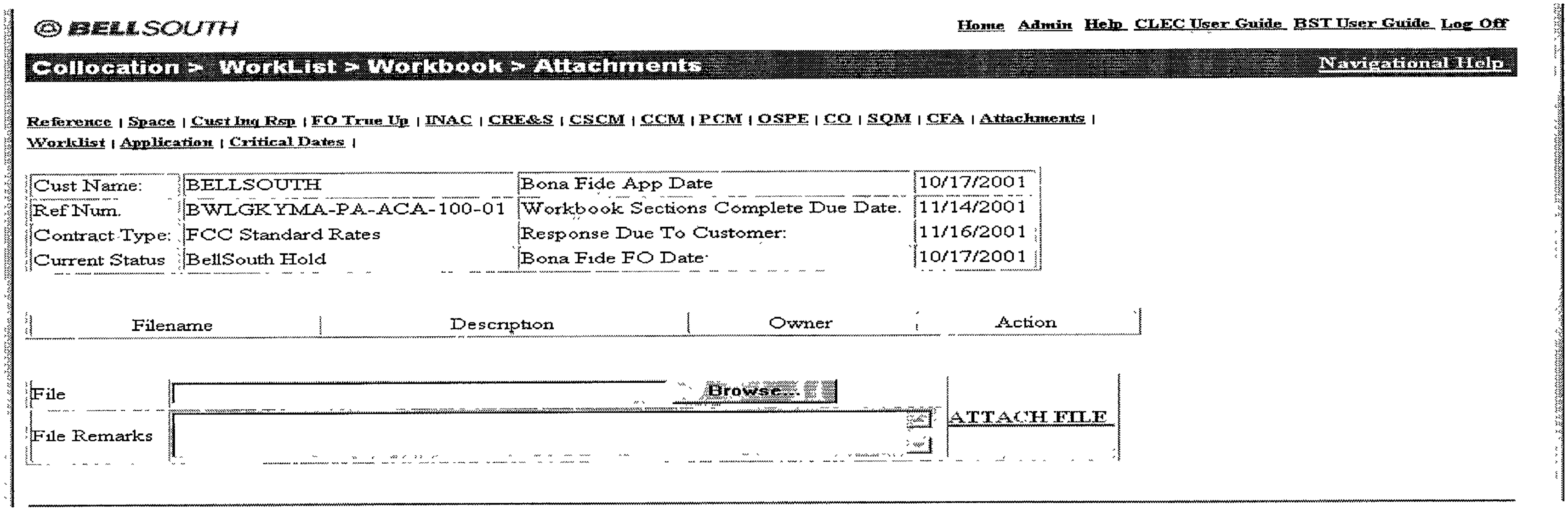

Figure 33

© BELLSOUTH

Home  Admin  Help  CLEC User Guide  BST User Guide  Log Off

Collocation > WorkList > Workbook > Attachments     Navigational Help

Reference | Space | Cust Ing Rsp | FO True Up | INAC | CRE&S | CSCM | CCM | PCM | OSPE | CO | SQM | CFA | Attachments |
Worklist | Application | Critical Dates |

| Cust Name: | BELLSOUTH | Bona Fide App Date | 10/17/2001 |
| Ref Num. | BWLGKYMA-PA-ACA-100-01 | Workbook Sections Complete Due Date. | 11/14/2001 |
| Contract Type: | FCC Standard Rates | Response Due To Customer: | 11/16/2001 |
| Current Status | BellSouth Hold | Bona Fide FO Date | 10/17/2001 |

Filename         Description          Owner           Action

File        [Browse]

File Remarks          [ATTACH FILE]

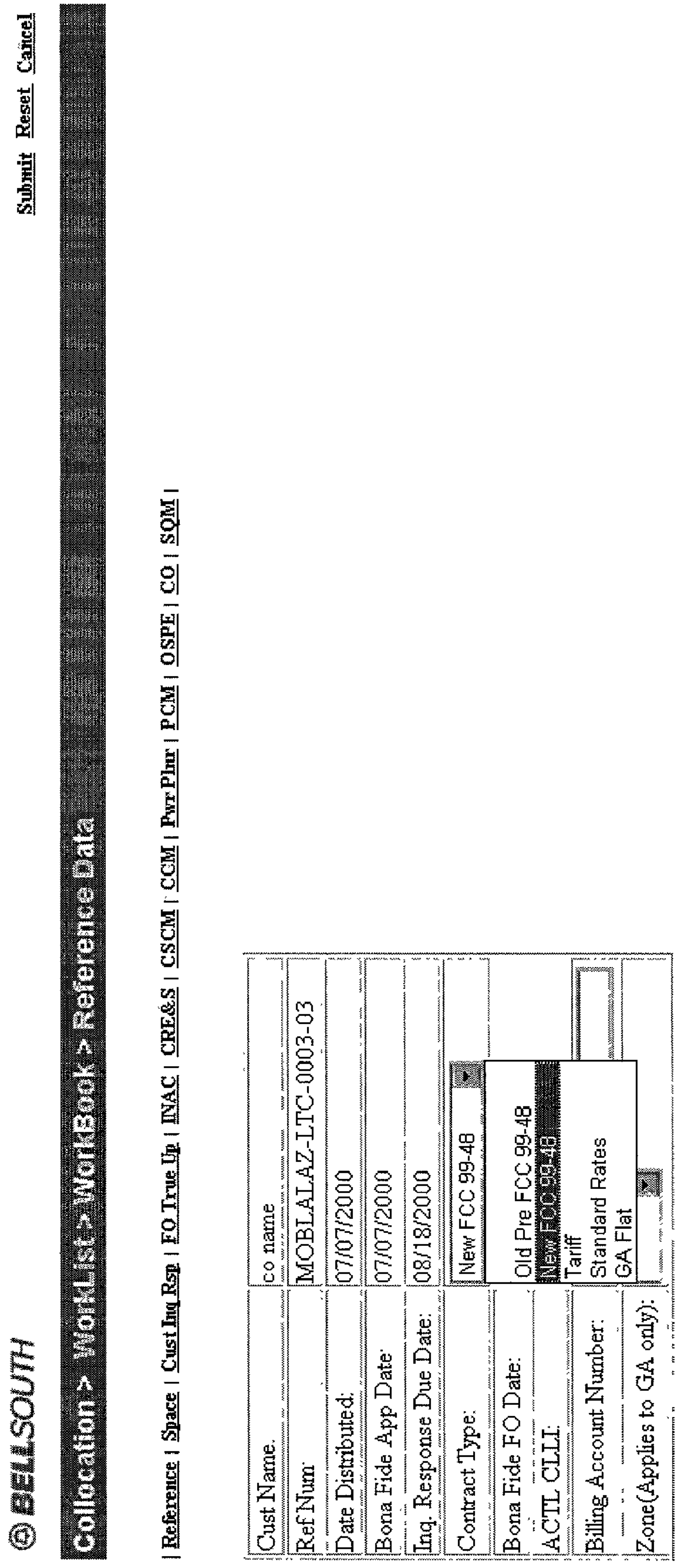

*Figure 34*

© *BELLSOUTH*

Collocation > WorkList > WorkBook > Reference Data

Submit  Reset  Cancel

| Reference | Space | Cust Inq Rsp | FO True Up | INAC | CRE&S | CSCM | CCM | Pwr Plnr | PCM | OSPE | CO | SQM |

| | |
|---|---|
| Cust Name. | co name |
| Ref Num | MOBLALAZ-LTC-0003-03 |
| Date Distributed: | 07/07/2000 |
| Bona Fide App Date: | 07/07/2000 |
| Inq. Response Due Date: | 08/18/2000 |
| Contract Type: | New FCC 99-48 ▼ <br> Old Pre FCC 99-48 <br> New FCC 99-48 <br> Tariff <br> Standard Rates <br> GA Flat |
| Bona Fide FO Date: | |
| ACTL CLLI: | |
| Billing Account Number: | |
| Zone (Applies to GA only): | |

Figure 35

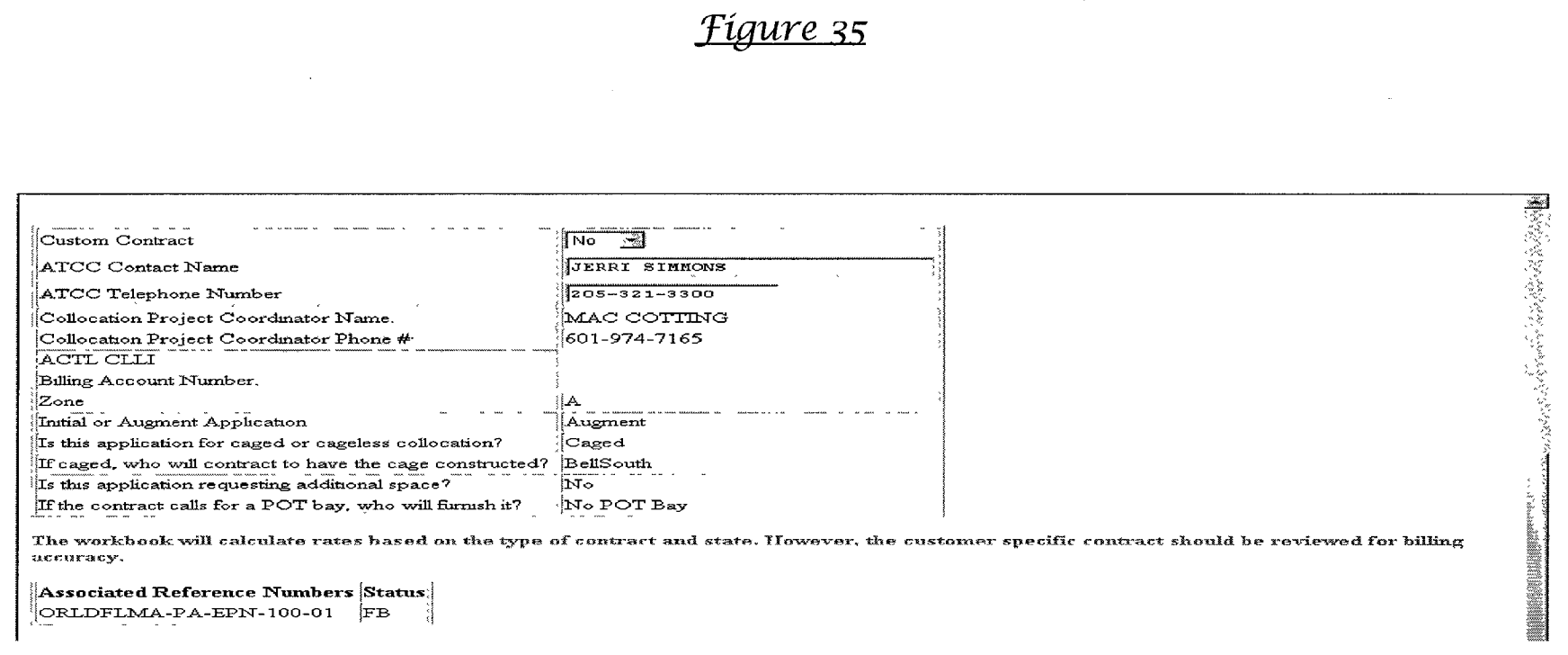

| | |
|---|---|
| Custom Contract | No |
| ATCC Contact Name | JERRI SIMMONS |
| ATCC Telephone Number | 205-321-3300 |
| Collocation Project Coordinator Name. | MAC COTTING |
| Collocation Project Coordinator Phone # | 601-974-7165 |
| ACTL CLLI | |
| Billing Account Number. | |
| Zone | A |
| Initial or Augment Application | Augment |
| Is this application for caged or cageless collocation? | Caged |
| If caged, who will contract to have the cage constructed? | BellSouth |
| Is this application requesting additional space? | No |
| If the contract calls for a POT bay, who will furnish it? | No POT Bay |

The workbook will calculate rates based on the type of contract and state. However, the customer specific contract should be reviewed for billing accuracy.

| Associated Reference Numbers | Status |
|---|---|
| ORLDFLMA-PA-EPN-100-01 | FB |

*Figure 36*

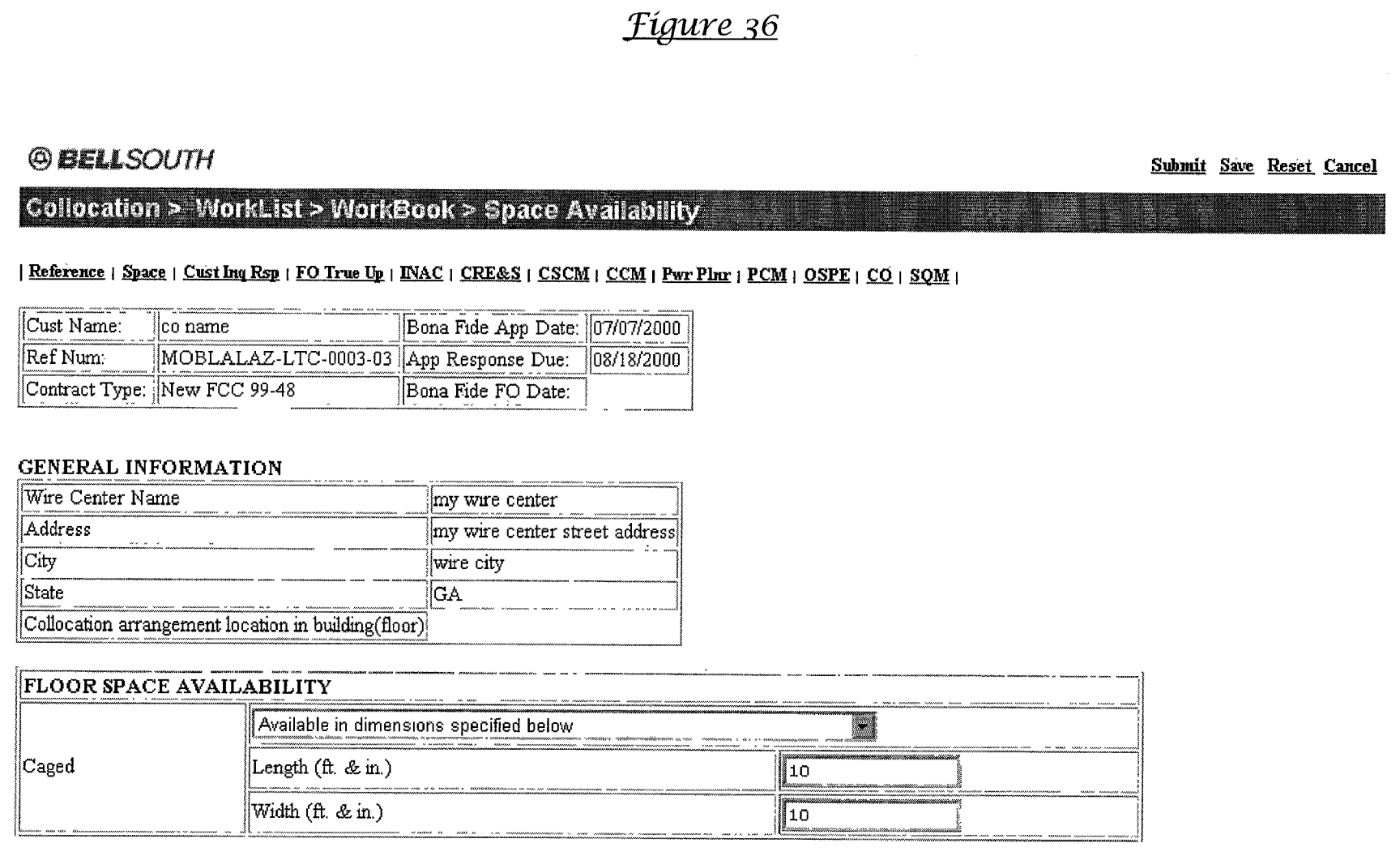

BELLSOUTH

Submit Save Reset Cancel

Collocation > WorkList > WorkBook > Space Availability

| Reference | Space | Cust Inq Rsp | FO True Up | INAC | CRE&S | CSCM | CCM | Pwr Plnr | PCM | OSPE | CO | SQM |

| | | | |
|---|---|---|---|
| Cust Name: | co name | Bona Fide App Date: | 07/07/2000 |
| Ref Num: | MOBLALAZ-LTC-0003-03 | App Response Due: | 08/18/2000 |
| Contract Type: | New FCC 99-48 | Bona Fide FO Date: | |

GENERAL INFORMATION

| | |
|---|---|
| Wire Center Name | my wire center |
| Address | my wire center street address |
| City | wire city |
| State | GA |
| Collocation arrangement location in building(floor) | |

| FLOOR SPACE AVAILABILITY | | |
|---|---|---|
| Caged | Available in dimensions specified below | |
| | Length (ft. & in.) | 10 |
| | Width (ft. & in.) | 10 |

*Figure 37*

| | |
|---|---|
| Response Expiration Date | 01/04/2002 |

GENERAL INFORMATION

| | |
|---|---|
| Wire Center Name | NSVL-SHARONDALE |
| Address | 3203 HILLSIDE DR |
| City | NASHVILLE |
| State | TN |
| Collocation arrangement location in building | |

| PROJECT INTERVAL - BELLSOUTH SPACE AND INFRASTRUCTURE | ESTIMATE |
|---|---|
| Interval from Bona Fide Firm Order to Space Ready- Calendar days | 30 |

| | ESTIMATE |
|---|---|
| ORDINARY/EXTRAORDINARY CONDITIONS | Ordinary |

*Figure 38*

| NON-RECURRING CHARGES DUE AT FIRM ORDER | | | PAID AT FO |
|---|---|---|---|
| Firm Order Processing | | | 1204 |
| Cable Installation | 0 | 100% Due at Firm Order | 0 |
| | | **Total Due At Firm Order** | 1204 |

| RECURRING SPACE PREPARATION FEE - SUMMARY | | ESTIMATE |
|---|---|---|
| Central Office Modifications, Per Sq. Ft | 2.74 | 49.32 |
| Common Systems Modifications - Cageless, Per Sq. Ft | 2.95 | 53.1 |
| Common Systems Modifications - Caged, Per Arrangement | 100.14 | 0 |
| **Total Recurring Space Preparation Fee** | | 102.42 |

| RECURRING FLOOR SPACE FEE | | | ESTIMATE |
|---|---|---|---|
| Unenclosed Floor Space, Sq. Ft. | Per Sq. Ft. | 6.75 | 18.0 |
| Quantity of Racks(Unenclosed) | | | 2 |
| Enclosed Floor Space, Sq. Ft. | | | |
| **Total Recurring Floor Space Fee** | | | 121.5 |

*Figure 39*

| RECURRING SPACE ENCLOSURE FEE | | ESTIMATE |
|---|---|---|
| Who will contract to have the cage constructed? | | N/A |
| First 100 Sq. Ft. | 218.53 | 0 |
| Per Additional 50 Sq. Ft. | 21.44 | |
| **Total Recurring Space Enclosure Fee** | | 0 |

| RECURRING FEES - OTHER | | | | ESTIMATE |
|---|---|---|---|---|
| Cable Support Structure | | | | |
| No. of entrance cables - Est | | Per Cable | 19.8 | 0 |
| Power | | | | |
| Amps, -48V DC | 40 | Per fused amp | 8.87 | 354.8 |
| Security Access System | | Per CO Premises | 55.99 | 55.99 |

| NON-RECURRING CABLE RECORDS FEE | | | | ESTIMATE |
|---|---|---|---|---|
| Cable Records Fee | 1 | Cable Records per Application | 1711 | 1711 |
| VG/DS0 Cable Fee per Application | 925.06 | VG/DS0 per 100 pr. | 18.05 | 1033.36 |
| No. of DS1s Requested | 28 | DS1 per T1TIE | 8.45 | 236.6 |
| No. of DS3s Requested | 1 | DS3 per T3TIE | 29.57 | 29.57 |
| No. of Fiber Cable Fees | 0 | Fiber Cable Fees per multiple of 99 | 279.42 | 0 |
| **Total Non-Recurring Cable Records Fee** | | | | 3010.53 |

*Figure 40*

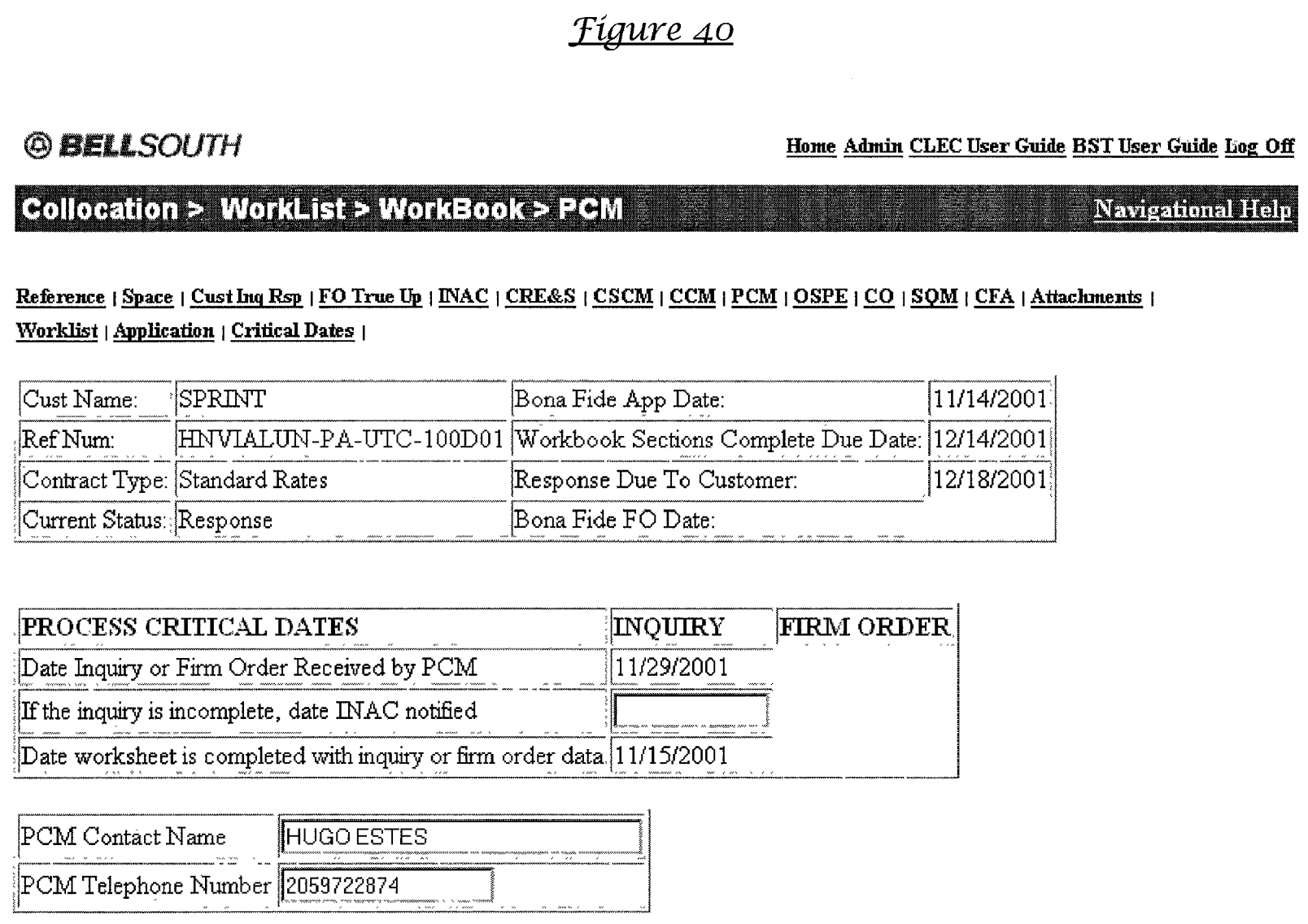

BELLSOUTH

Home Admin CLEC User Guide BST User Guide Log Off

Collocation > WorkList > WorkBook > PCM Navigational Help

Reference | Space | Cust Inq Rsp | FO True Up | INAC | CRE&S | CSCM | CCM | PCM | OSPE | CO | SQM | CFA | Attachments |
Worklist | Application | Critical Dates |

| | | | |
|---|---|---|---|
| Cust Name: | SPRINT | Bona Fide App Date: | 11/14/2001 |
| Ref Num: | HNVIALUN-PA-UTC-100D01 | Workbook Sections Complete Due Date: | 12/14/2001 |
| Contract Type: | Standard Rates | Response Due To Customer: | 12/18/2001 |
| Current Status: | Response | Bona Fide FO Date: | |

| PROCESS CRITICAL DATES | INQUIRY | FIRM ORDER |
|---|---|---|
| Date Inquiry or Firm Order Received by PCM | 11/29/2001 | |
| If the inquiry is incomplete, date INAC notified | | |
| Date worksheet is completed with inquiry or firm order data | 11/15/2001 | |

| | |
|---|---|
| PCM Contact Name | HUGO ESTES |
| PCM Telephone Number | 2059722874 |

*Figure 41*

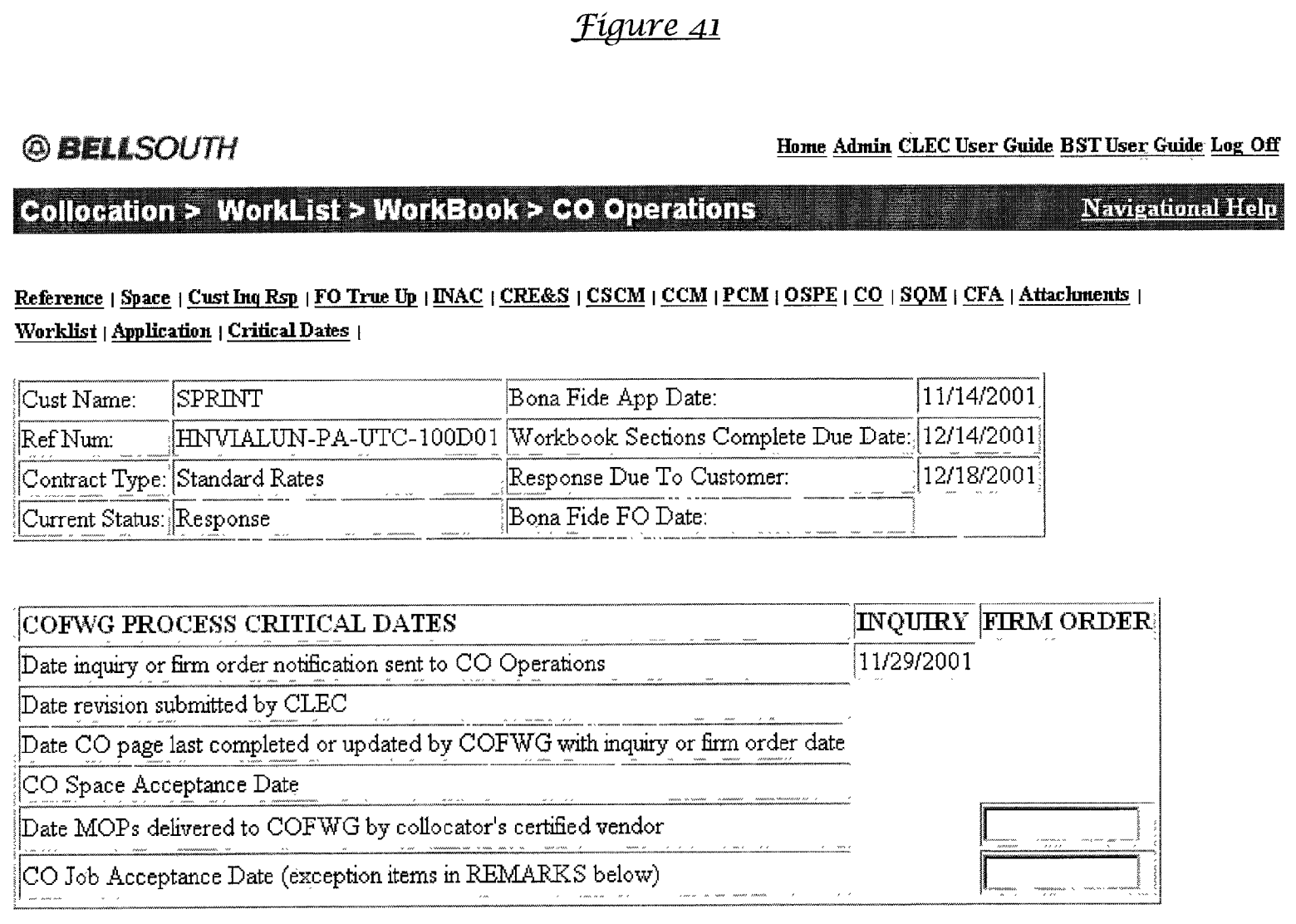

BELLSOUTH

Home Admin CLEC User Guide BST User Guide Log Off

Collocation > WorkList > WorkBook > CO Operations Navigational Help

Reference | Space | Cust Inq Rsp | FO True Up | INAC | CRE&S | CSCM | CCM | PCM | OSPE | CO | SQM | CFA | Attachments |
Worklist | Application | Critical Dates |

| | | | |
|---|---|---|---|
| Cust Name: | SPRINT | Bona Fide App Date: | 11/14/2001 |
| Ref Num: | HNVIALUN-PA-UTC-100D01 | Workbook Sections Complete Due Date: | 12/14/2001 |
| Contract Type: | Standard Rates | Response Due To Customer: | 12/18/2001 |
| Current Status: | Response | Bona Fide FO Date: | |

| COFWG PROCESS CRITICAL DATES | INQUIRY | FIRM ORDER |
|---|---|---|
| Date inquiry or firm order notification sent to CO Operations | 11/29/2001 | |
| Date revision submitted by CLEC | | |
| Date CO page last completed or updated by COFWG with inquiry or firm order date | | |
| CO Space Acceptance Date | | |
| Date MOPs delivered to COFWG by collocator's certified vendor | | |
| CO Job Acceptance Date (exception items in REMARKS below) | | |

*Figure 42*

| Coordination Checklist | INQUIRY | FIRM ORDER |
|---|---|---|
| Date Space and Infrastructure are to be complete - Planned/Committed | | |
| Date notification provided to ATC(no more than 7 days before space ready) | | |
| Date collocator called to schedule the space acceptance meeting | | |
| Date of space acceptance meeting | | |
| Date Space and Infrastructure complete - Actual | | |
| Number of relay racks/JA circuits needed | | |
| Did collocator request Access to Unfinished Collocation Space? If Yes, enter Agreement signature date. | | |
| Has the collocator requested undersized power feeders? (I.e., is the protection device size less than the maximum drain)? | | |
| If yes to question above, date of signature of Undersized Power Feeders Waiver | | |
| Date of commencement(provided by collocator) | | |

*Figure 43*

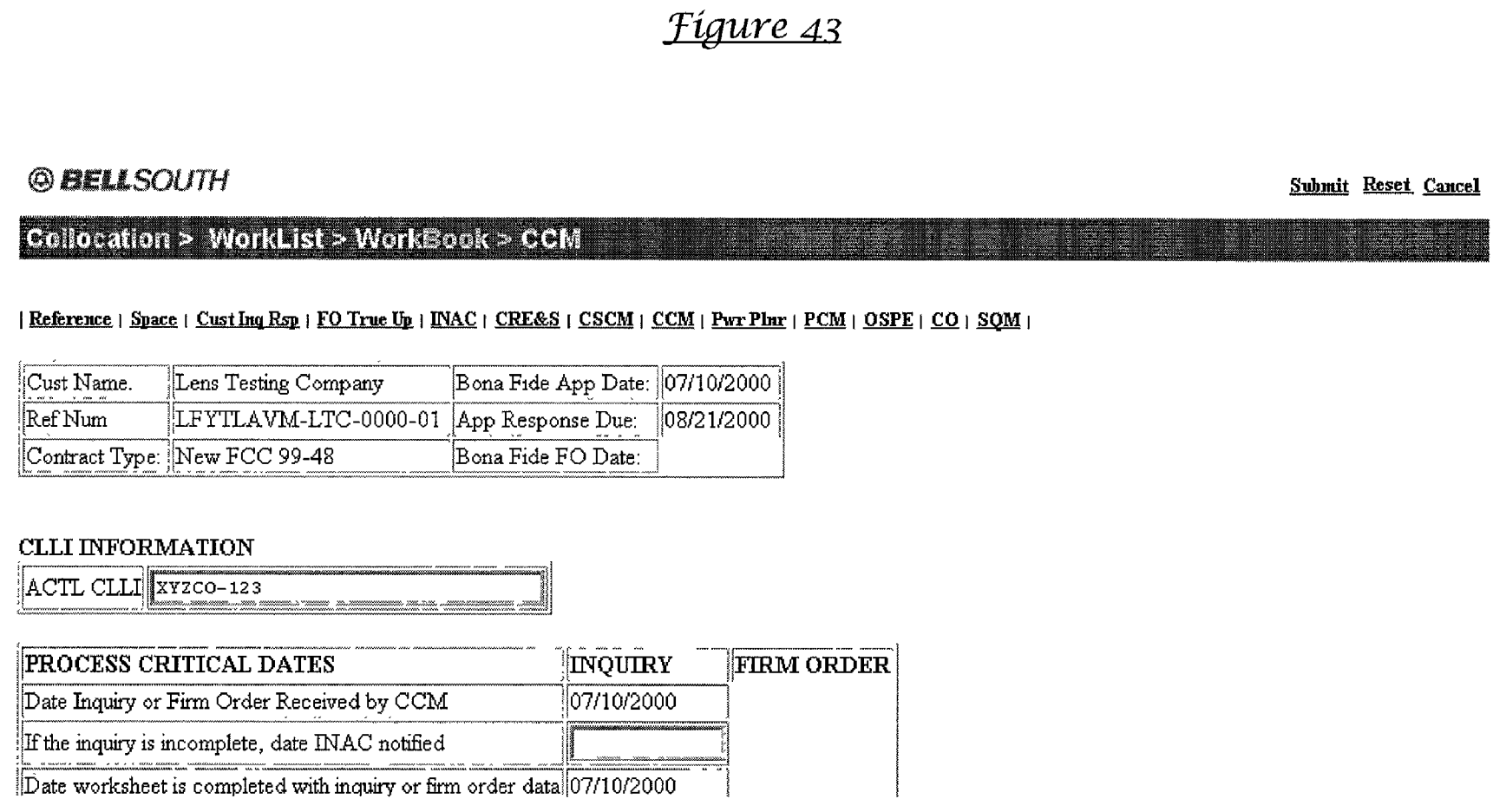

BELLSOUTH

Submit Reset Cancel

Collocation > WorkList > WorkBook > CCM

| Reference | Space | Cust Inq Rsp | FO True Up | INAC | CRE&S | CSCM | CCM | Pwr Plnr | PCM | OSPE | CO | SQM |

| | | | |
|---|---|---|---|
| Cust Name. | Lens Testing Company | Bona Fide App Date: | 07/10/2000 |
| Ref Num | LFYTLAVM-LTC-0000-01 | App Response Due: | 08/21/2000 |
| Contract Type: | New FCC 99-48 | Bona Fide FO Date: | |

CLLI INFORMATION

| | |
|---|---|
| ACTL CLLI | XYZCO-123 |

| PROCESS CRITICAL DATES | INQUIRY | FIRM ORDER |
|---|---|---|
| Date Inquiry or Firm Order Received by CCM | 07/10/2000 | |
| If the inquiry is incomplete, date INAC notified | | |
| Date worksheet is completed with inquiry or firm order data | 07/10/2000 | |

*Figure 44*

| | | | |
|---|---|---|---|
| Cust Name: | Lens Testing Company | Bona Fide App Date: | 07/10/2000 |
| Ref Num: | LFYTLAVM-LTC-0000-01 | App Response Due: | 08/21/2000 |
| Contract Type: | New FCC 99-48 | Bona Fide FO Date. | |

GENERAL INFORMATION

| | |
|---|---|
| Wire Center Name | Vermillion |
| Address | 123 Ambassador Caffery Drive |
| City | Lafayette |
| State | LA |
| Collocation arrangement location in building | Basement |

| NON-RECURRING CHARGES DUE AT FIRM ORDER | PREPAYMENT TOTAL | | |
|---|---|---|---|
| Space Preparation | 6795 | 50% Due at Firm Order | 3397 5 |
| Power Construction | 0 | 50% Due at Firm Order | 0 |
| Cable Installation | 1706 | 100% Due at Firm Order | 1706 |
| | | **Total Due at Firm Order** | 5103.5 |

*Figure 45*

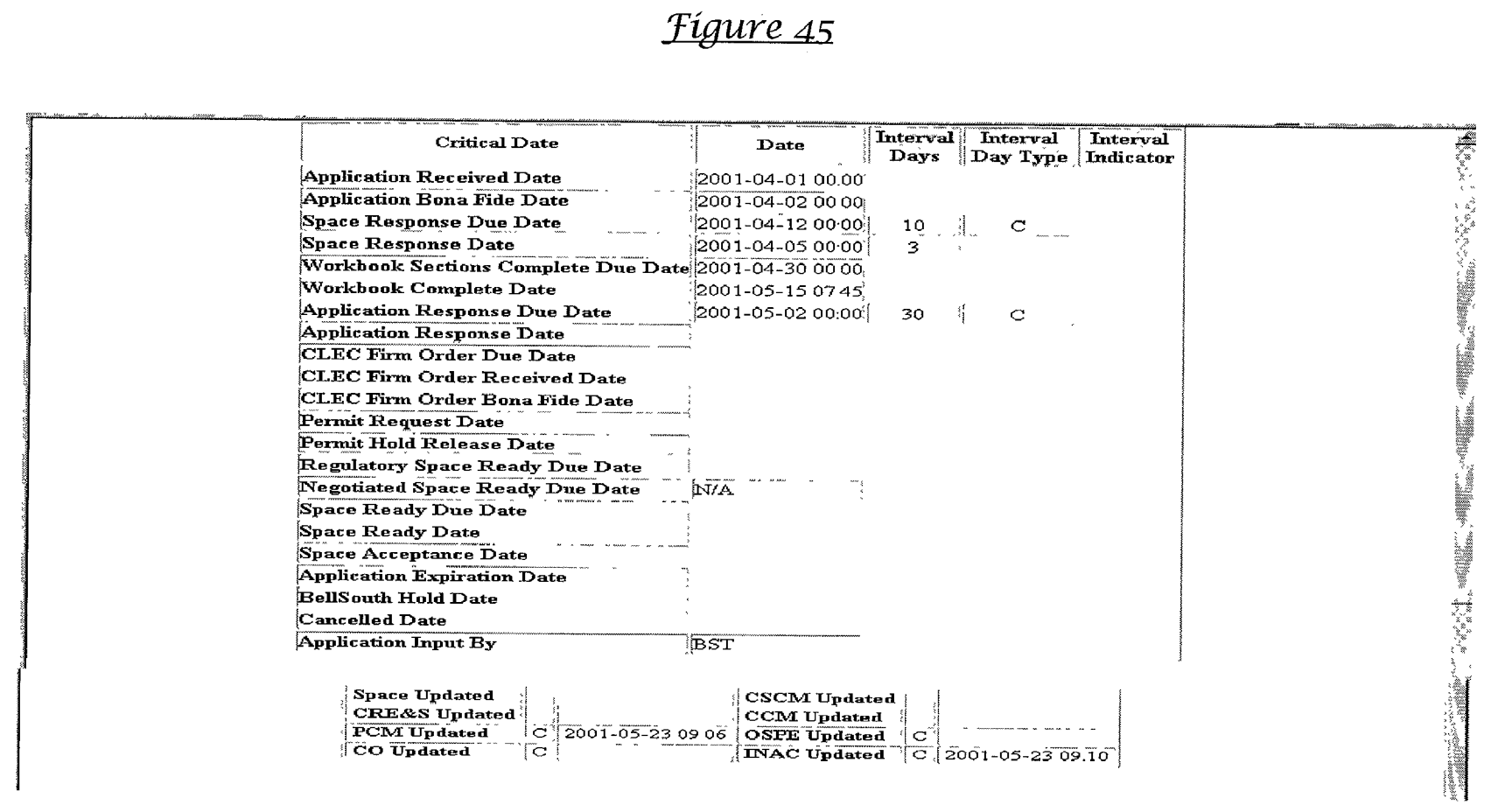

| Critical Date | Date | Interval Days | Interval Day Type | Interval Indicator |
|---|---|---|---|---|
| Application Received Date | 2001-04-01 00:00 | | | |
| Application Bona Fide Date | 2001-04-02 00:00 | | | |
| Space Response Due Date | 2001-04-12 00:00 | 10 | C | |
| Space Response Date | 2001-04-05 00:00 | 3 | | |
| Workbook Sections Complete Due Date | 2001-04-30 00:00 | | | |
| Workbook Complete Date | 2001-05-15 07:45 | | | |
| Application Response Due Date | 2001-05-02 00:00 | 30 | C | |
| Application Response Date | | | | |
| CLEC Firm Order Due Date | | | | |
| CLEC Firm Order Received Date | | | | |
| CLEC Firm Order Bona Fide Date | | | | |
| Permit Request Date | | | | |
| Permit Hold Release Date | | | | |
| Regulatory Space Ready Due Date | | | | |
| Negotiated Space Ready Due Date | N/A | | | |
| Space Ready Due Date | | | | |
| Space Ready Date | | | | |
| Space Acceptance Date | | | | |
| Application Expiration Date | | | | |
| BellSouth Hold Date | | | | |
| Cancelled Date | | | | |
| Application Input By | BST | | | |

| | | | | | |
|---|---|---|---|---|---|
| Space Updated | | | CSCM Updated | | |
| CRE&S Updated | | | CCM Updated | | |
| PCM Updated | C | 2001-05-23 09:06 | OSPE Updated | C | |
| CO Updated | C | | INAC Updated | C | 2001-05-23 09:10 |

*Figure 46*

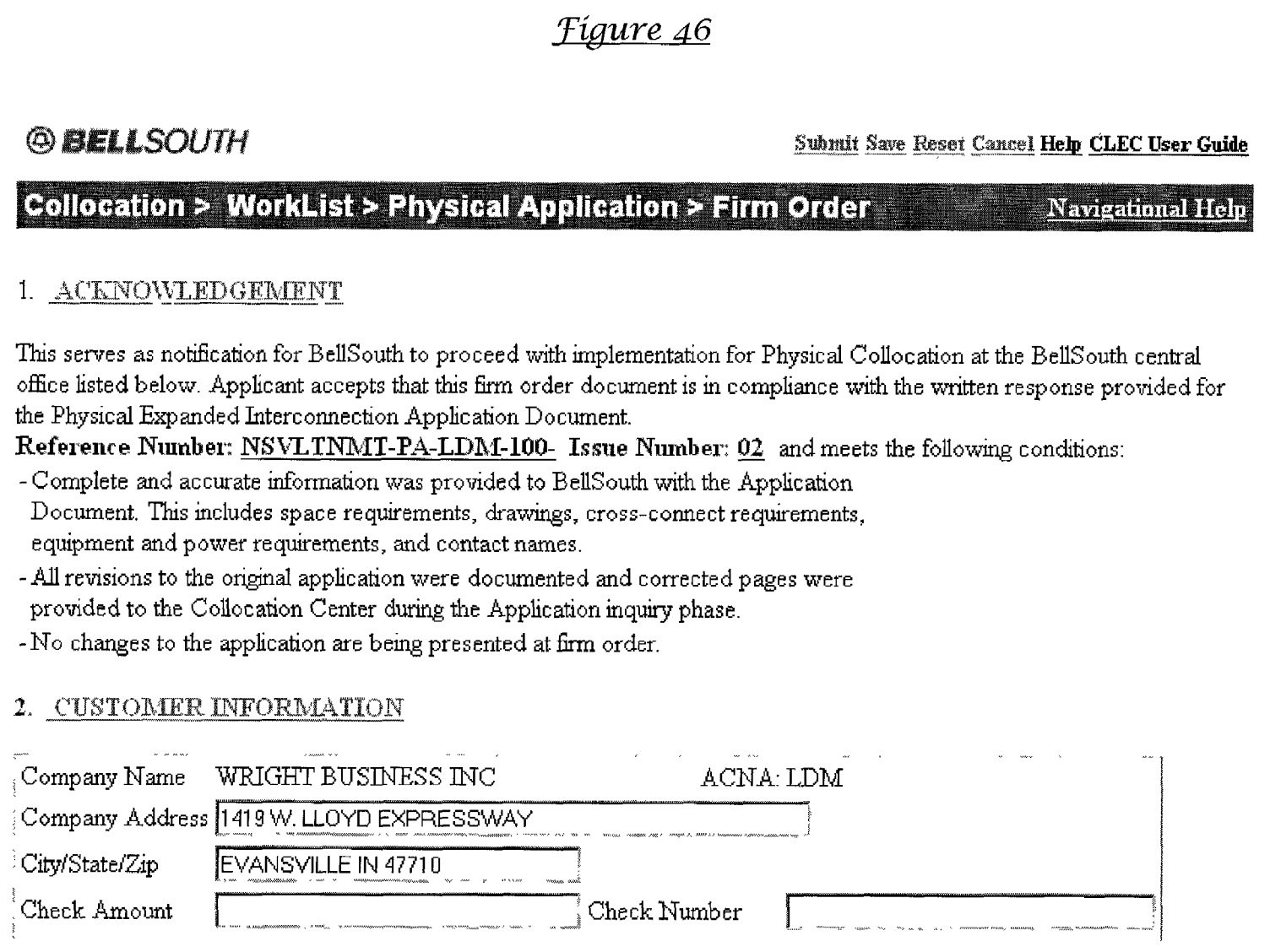

BELLSOUTH

Submit Save Reset Cancel Help CLEC User Guide

Collocation > WorkList > Physical Application > Firm Order Navigational Help

1. ACKNOWLEDGEMENT

This serves as notification for BellSouth to proceed with implementation for Physical Collocation at the BellSouth central office listed below. Applicant accepts that this firm order document is in compliance with the written response provided for the Physical Expanded Interconnection Application Document.

Reference Number: NSVLTNMT-PA-LDM-100- Issue Number: 02 and meets the following conditions:

- Complete and accurate information was provided to BellSouth with the Application Document. This includes space requirements, drawings, cross-connect requirements, equipment and power requirements, and contact names.
- All revisions to the original application were documented and corrected pages were provided to the Collocation Center during the Application inquiry phase.
- No changes to the application are being presented at firm order.

2. CUSTOMER INFORMATION

| | | | |
|---|---|---|---|
| Company Name | WRIGHT BUSINESS INC | ACNA: LDM | |
| Company Address | 1419 W. LLOYD EXPRESSWAY | | |
| City/State/Zip | EVANSVILLE IN 47710 | | |
| Check Amount | | Check Number | |

*Figure 47*

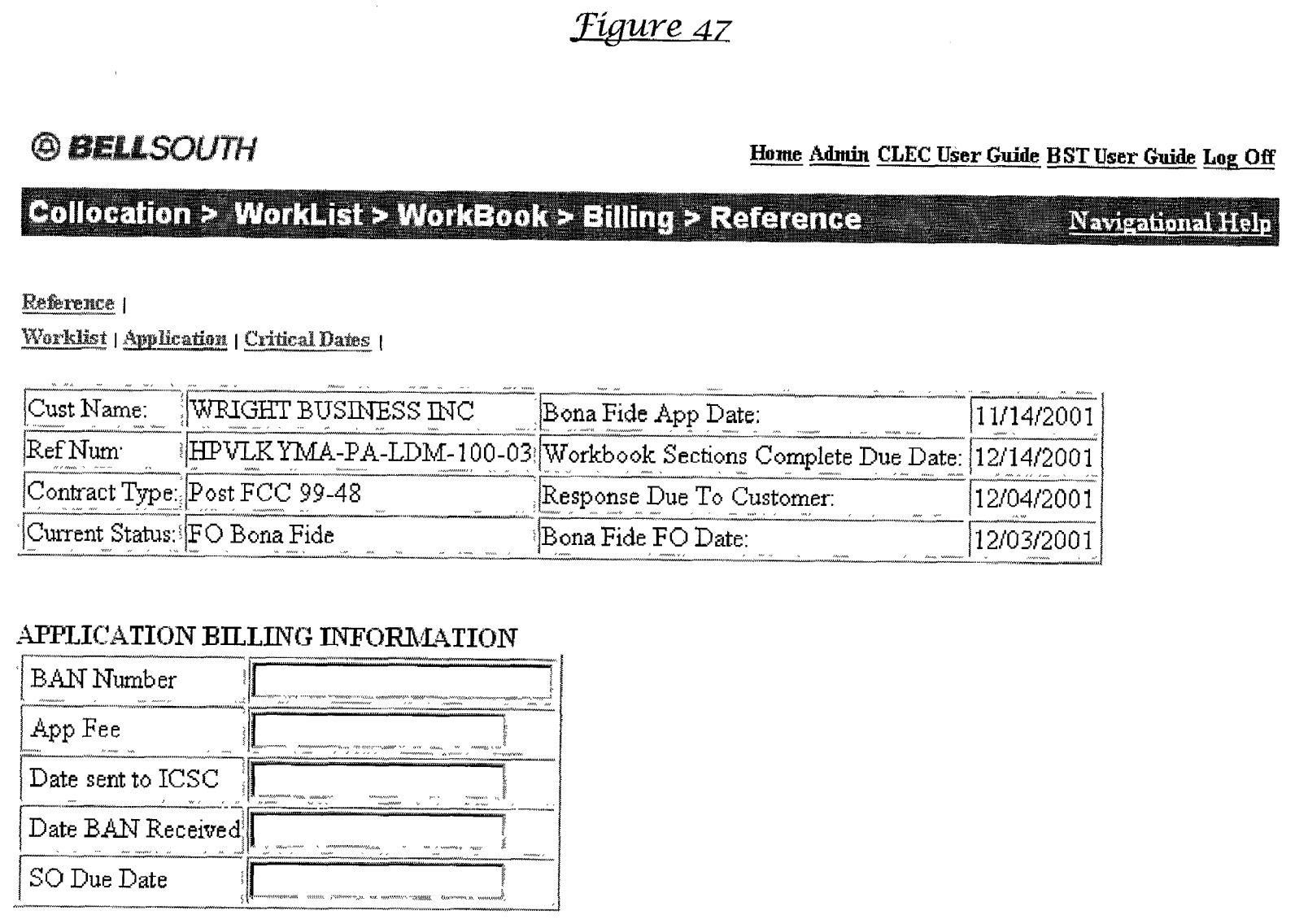

BELLSOUTH

Home Admin CLEC User Guide BST User Guide Log Off

Collocation > WorkList > WorkBook > Billing > Reference Navigational Help

Reference |

Worklist | Application | Critical Dates |

| | | | |
|---|---|---|---|
| Cust Name: | WRIGHT BUSINESS INC | Bona Fide App Date: | 11/14/2001 |
| Ref Num: | HPVLKYMA-PA-LDM-100-03 | Workbook Sections Complete Due Date: | 12/14/2001 |
| Contract Type: | Post FCC 99-48 | Response Due To Customer: | 12/04/2001 |
| Current Status: | FO Bona Fide | Bona Fide FO Date: | 12/03/2001 |

APPLICATION BILLING INFORMATION

| | |
|---|---|
| BAN Number | |
| App Fee | |
| Date sent to ICSC | |
| Date BAN Received | |
| SO Due Date | |

FIRM ORDER BILLING INFORMATION

| Field | Value |
|---|---|
| Firm Order Amount | |
| Actual Balance Due | 0 |
| Monthly Rec Billing Amount | 0 |
| FO Date to PROCABS | |
| FO Svc Order Requested | |
| FO Svc Order Due Date | |
| 7P Receipt Date | |
| Actual Svc Order Requested | |
| Monthly Billing Requested | |
| FO Effective Bill Date | |
| Committed Due Date | 02/01/2002 |
| Num of JA's | |
| JA ID's | |
| Firm Order True Up Billing Complete | No |

BILLING REMARKS

*Figure 49*

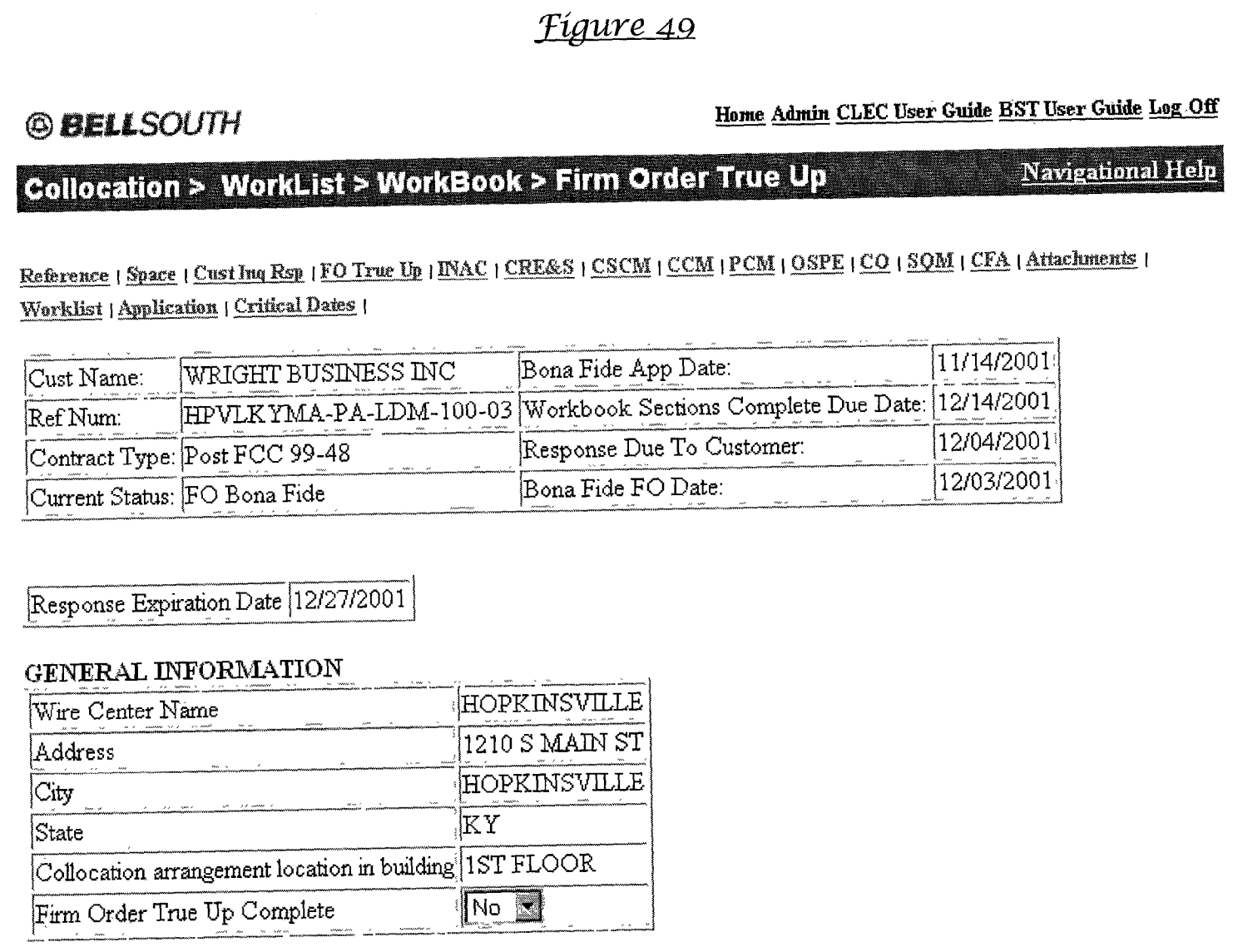

BELLSOUTH

Home Admin CLEC User Guide BST User Guide Log Off

Collocation > WorkList > WorkBook > Firm Order True Up Navigational Help

Reference | Space | Cust Inq Rsp | FO True Up | INAC | CRE&S | CSCM | CCM | PCM | OSPE | CO | SQM | CFA | Attachments |
Worklist | Application | Critical Dates |

| | | | |
|---|---|---|---|
| Cust Name: | WRIGHT BUSINESS INC | Bona Fide App Date: | 11/14/2001 |
| Ref Num: | HPVLKYMA-PA-LDM-100-03 | Workbook Sections Complete Due Date: | 12/14/2001 |
| Contract Type: | Post FCC 99-48 | Response Due To Customer: | 12/04/2001 |
| Current Status: | FO Bona Fide | Bona Fide FO Date: | 12/03/2001 |

| | |
|---|---|
| Response Expiration Date | 12/27/2001 |

GENERAL INFORMATION

| | |
|---|---|
| Wire Center Name | HOPKINSVILLE |
| Address | 1210 S MAIN ST |
| City | HOPKINSVILLE |
| State | KY |
| Collocation arrangement location in building | 1ST FLOOR |
| Firm Order True Up Complete | No |

*Figure 50*

| PROJECT INTERVAL - BELLSOUTH SPACE AND INFRASTRUCTURE | ESTIMATE |
|---|---|
| Interval from Bona Fide Application to Space Ready- Business days | 76 |

| | |
|---|---|
| Space Ready Due Date | 02/01/2002 |

| | ESTIMATE | ACTUAL |
|---|---|---|
| ORDINARY/EXTRAORDINARY CONDITIONS | Ordinary | Ordinary |

Cause of Extraordinary conditions:

| NON-RECURRING CHARGES DUE AT FIRM ORDER | | | PAID AT FO | ACTUAL DUE |
|---|---|---|---|---|
| Space Preparation | 6385 | 50% Due at Firm Order | 3192.5 | |
| Space Preparation Actual | 4495 | Actual Minus FO Paid | | 1302.5 |
| Power Construction | 5522 | 50% Due at Firm Order | 2761 | |
| Power Construction Actual | | Actual Minus FO Paid | | -2761 |
| Cable Installation | 4654 | 100% Due at Firm Order | 4654 | |
| Cable Installation Actual | 0 | Actual Minus FO Paid | | -4654 |
| **Total Actual Charges** | 0 | **Total FO Payment** | 10607.5 | |
| **Total Actual Charges Minus Firm Order Payment** | | | | -6112.5 |

*Figure 51*

SPACE PREPARATION FEE - SUMMARY

| | ESTIMATE | ACTUAL | | | PAID AT FO | ACTUAL DUE |
|---|---|---|---|---|---|---|
| Mechanical/HVAC - Tons | 1 | 1 | Per Ton | 2100 | 2100 | 2100 |
| Ground Bar | 1 | 1 | Per Connection | 720 | 720 | 720 |
| Project Management | 1 | 1 | Per Arrangement | 1675 | 1675 | 1675 |
| Infrastructure | 1890 | | Per Arrangement | | 1890 | |
| Extraordinary Modifications | 0 | 0 | Per Arrangement | | 0 | 0 |
| | | | Total Space Preparation Fee | | 6385 | 4495 |

| DC POWER -48V | ESTIMATE | ACTUAL |
|---|---|---|
| Amps for recurring -48V DC Power Billing | 30 | 30 |
| Total -48V DC Power Construction Cost | 5522 | |

| RECURRING FLOOR SPACE FEE | | | ESTIMATE | ACTUAL |
|---|---|---|---|---|
| Unenclosed Floor Space, Sq. Ft. | Per Sq. Ft. | 5 | 20.0 | 0.0 |
| Quantity of Racks(Unenclosed) | | | 2 | |
| Enclosed Floor Space, Sq. Ft. | | | | 20 |
| **Total Recurring Floor Space Fee** | | | 100 | 100 |

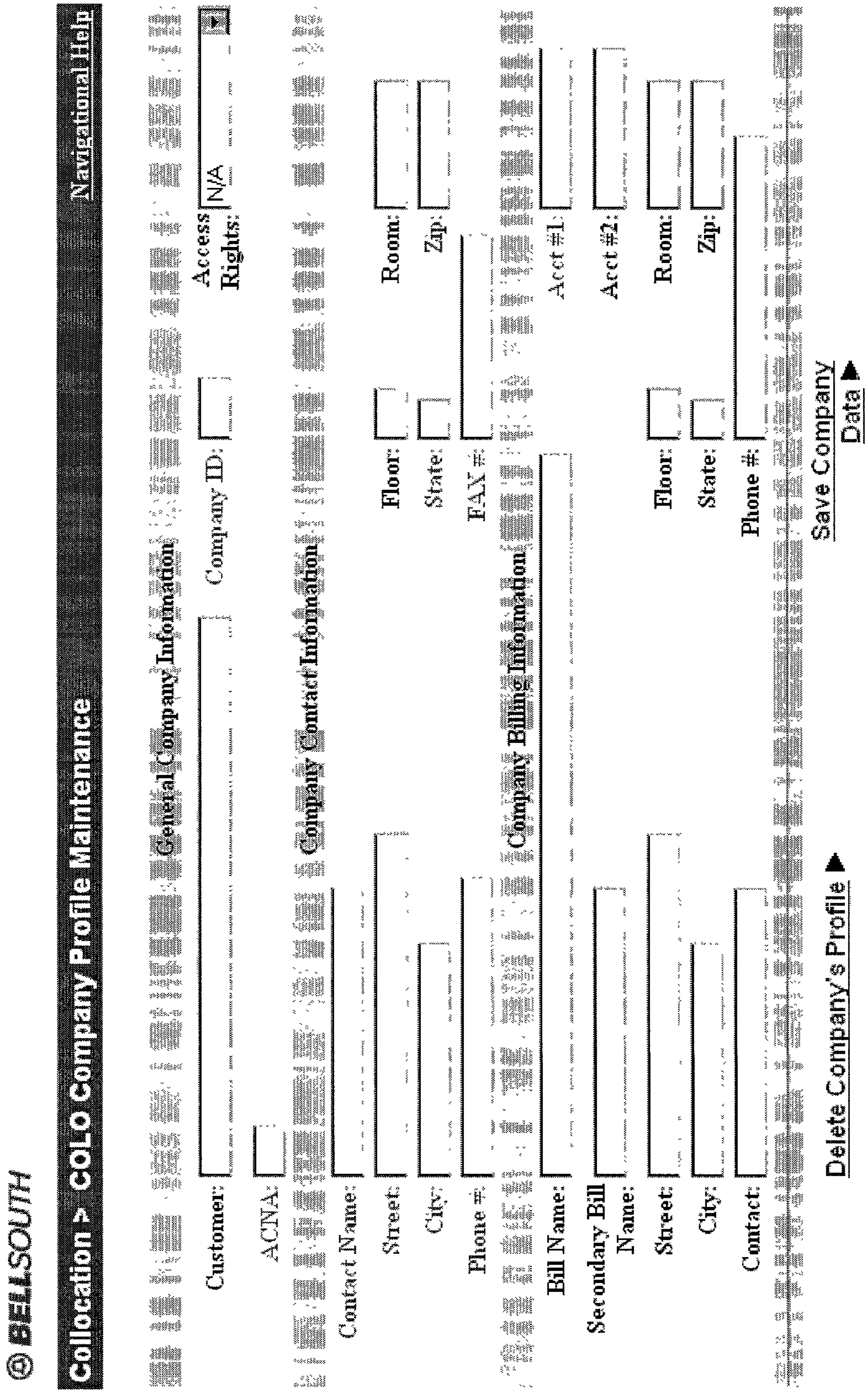

Figure 54

© BELLSOUTH

Collocation > COLO Company Profile Maintenance                    Navigational Help

General Company Information

Customer: [_____]   Company ID: [____]   Access Rights: [N/A ▼]

ACNA: [____]

Company Contact Information

Contact Name: [_____]

Street: [_____]   Floor: [__]   Room: [__]

City: [_____]   State: [__]   Zip: [____]

Phone #: [_____]   FAX #: [_____]

Company Billing Information

Bill Name: [_____]

Secondary Bill Name: [_____]

Street: [_____]   Floor: [__]   Room: [__]   Acct #1: [____]

City: [_____]   State: [__]   Zip: [____]   Acct #2: [____]

Contact: [_____]   Phone #: [_____]

Delete Company's Profile ▲                    Save Company Data ▲

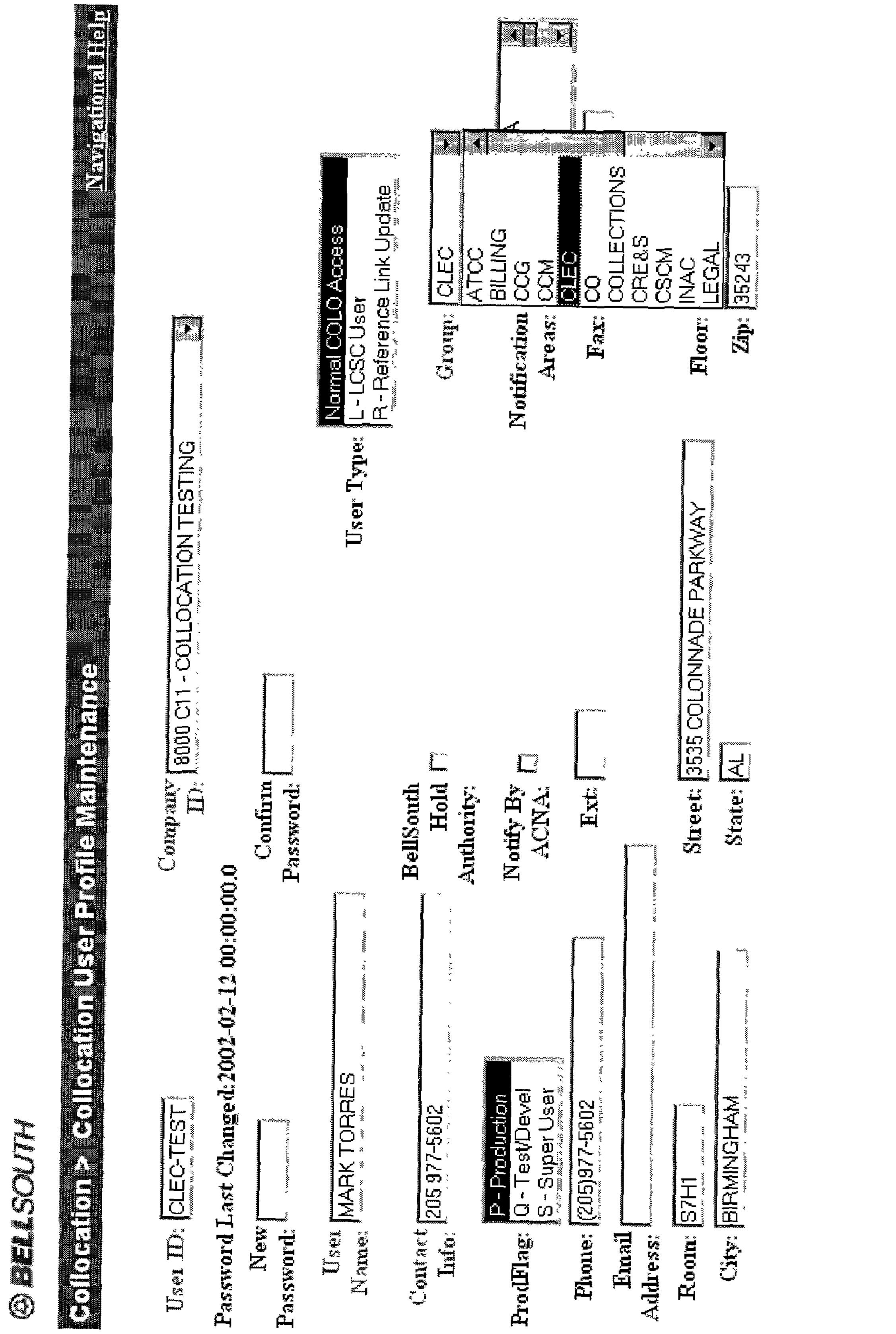

*Figure 56*

@ BELLSOUTH

Collocation > Collocation User Profile Maintenance | Navigational Help

User ID: CLEC-TEST

Company ID: 8000 C11 - COLLOCATION TESTING

Password Last Changed: 2002-02-12 00:00:00.0

New Password:
Confirm Password:

User Name: MARK TORRES

User Type:
- Normal COLO Access
- L - LCSC User
- R - Reference Link Update

Contact Info: 205 977-5602

BellSouth Hold Authority: ☐

Notify By ACNA: ☐

Group:
- CLEC
- ATCC
- BILLING

ProdFlag:
- P - Production
- Q - Test/Devel
- S - Super User

Notification CCG
Areas: CCM

- CO
- CLEC
- COLLECTIONS
- CRE&S
- CSCM
- INAC
- LEGAL

Phone: (205)977-5602    Ext:

Fax:

Email Address:

Street: 3535 COLONNADE PARKWAY

Room: S7H1    Floor:

City: BIRMINGHAM    State: AL    Zip: 35243

*Figure 58*

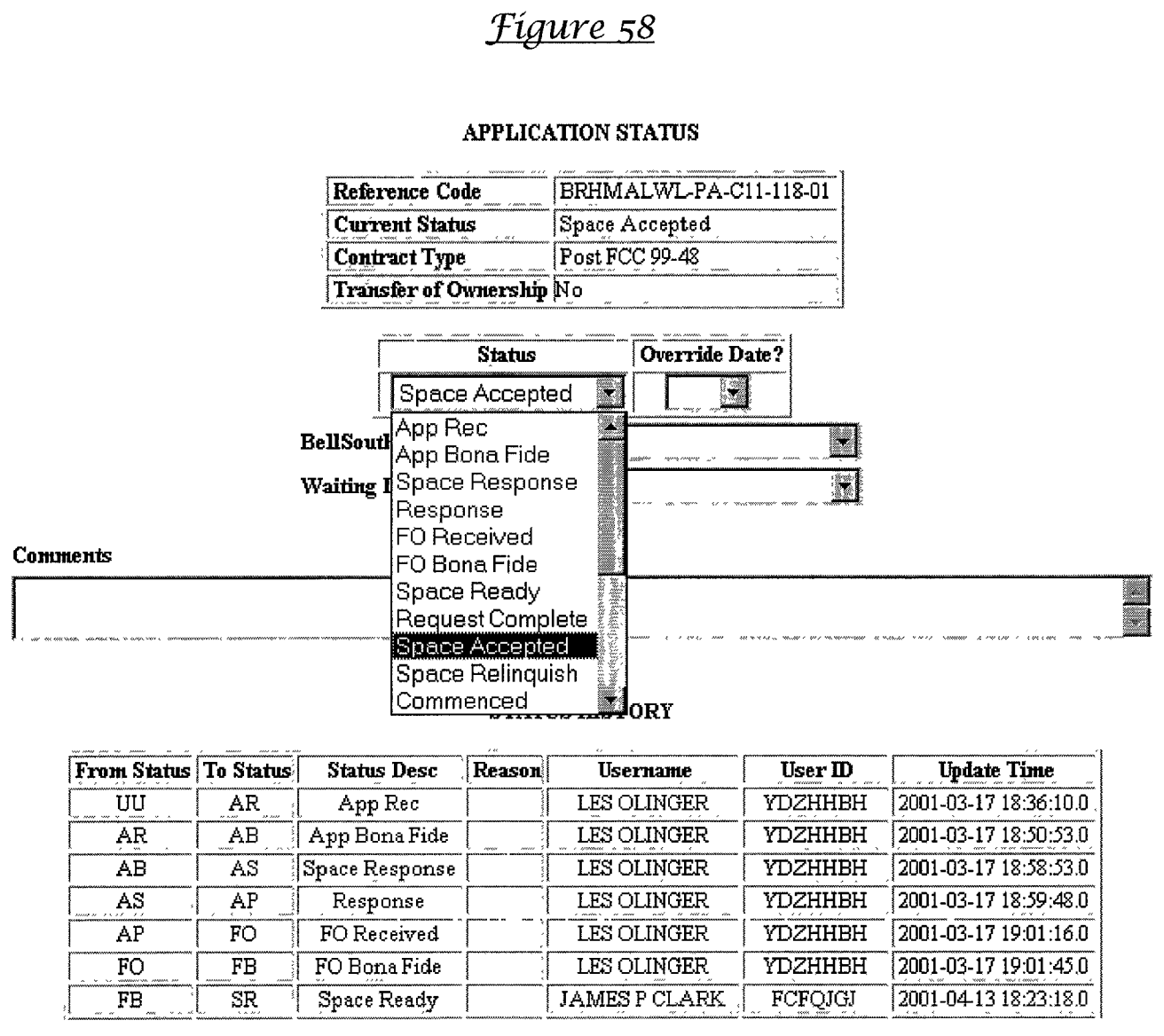

APPLICATION STATUS

| | |
|---|---|
| **Reference Code** | BRHMALWL-PA-C11-118-01 |
| **Current Status** | Space Accepted |
| **Contract Type** | Post FCC 99-48 |
| **Transfer of Ownership** | No |

| Status | Override Date? |
|---|---|
| Space Accepted | |

App Rec
App Bona Fide
Space Response
Response
FO Received
FO Bona Fide
Space Ready
Request Complete
Space Accepted
Space Relinquish
Commenced

BellSouth

Waiting I

Comments

ORY

| From Status | To Status | Status Desc | Reason | Username | User ID | Update Time |
|---|---|---|---|---|---|---|
| UU | AR | App Rec | | LES OLINGER | YDZHHBH | 2001-03-17 18:36:10.0 |
| AR | AB | App Bona Fide | | LES OLINGER | YDZHHBH | 2001-03-17 18:50:53.0 |
| AB | AS | Space Response | | LES OLINGER | YDZHHBH | 2001-03-17 18:58:53.0 |
| AS | AP | Response | | LES OLINGER | YDZHHBH | 2001-03-17 18:59:48.0 |
| AP | FO | FO Received | | LES OLINGER | YDZHHBH | 2001-03-17 19:01:16.0 |
| FO | FB | FO Bona Fide | | LES OLINGER | YDZHHBH | 2001-03-17 19:01:45.0 |
| FB | SR | Space Ready | | JAMES P CLARK | FCFQJGJ | 2001-04-13 18:23:18.0 |

*Figure 59*

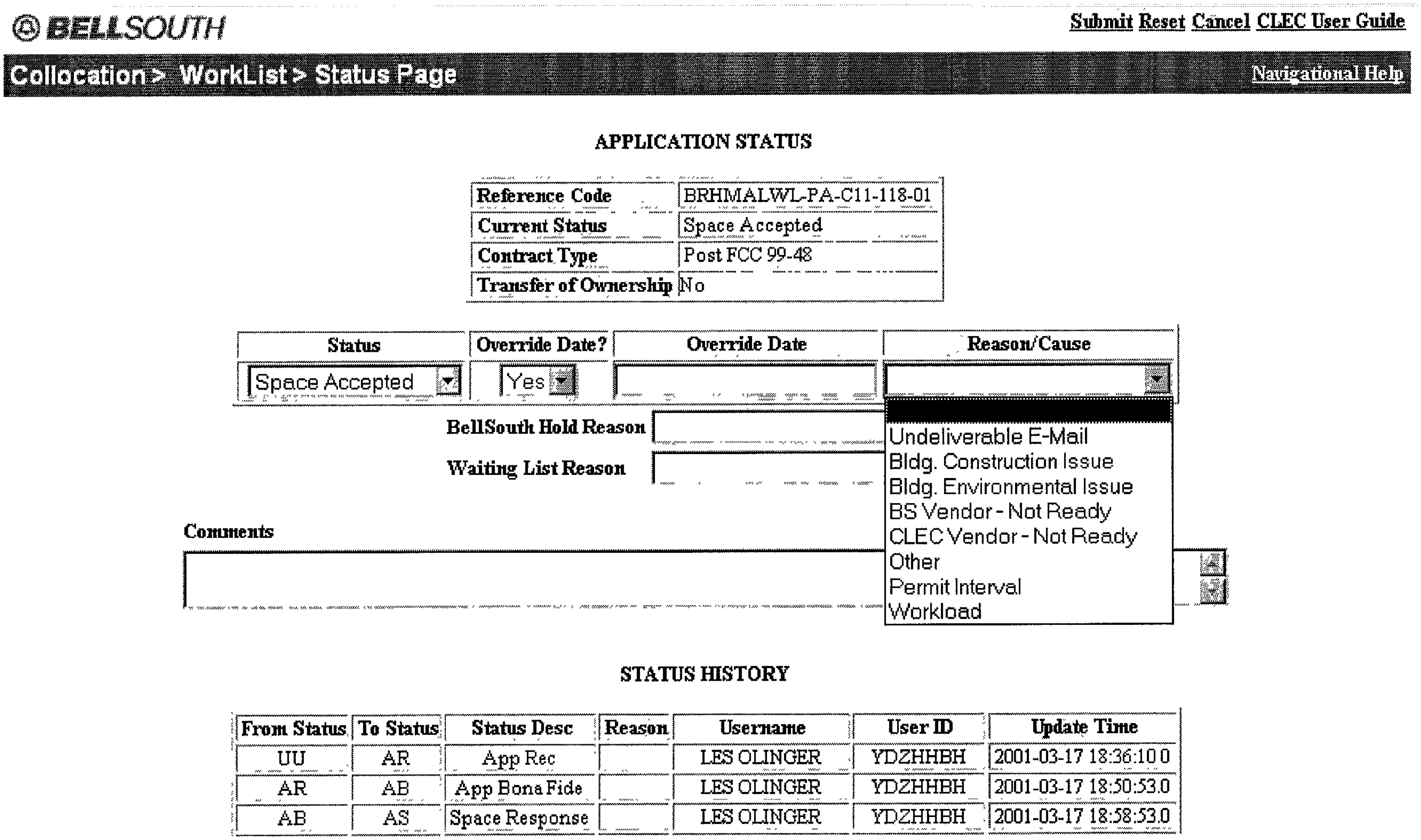

BELLSOUTH

Submit Reset Cancel CLEC User Guide

Collocation > WorkList > Status Page

Navigational Help

APPLICATION STATUS

| | |
|---|---|
| Reference Code | BRHMALWL-PA-C11-118-01 |
| Current Status | Space Accepted |
| Contract Type | Post FCC 99-48 |
| Transfer of Ownership | No |

| Status | Override Date? | Override Date | Reason/Cause |
|---|---|---|---|
| Space Accepted | Yes | | |

Undeliverable E-Mail
Bldg. Construction Issue
Bldg. Environmental Issue
BS Vendor - Not Ready
CLEC Vendor - Not Ready
Other
Permit Interval
Workload BellSouth Hold Reason Waiting List Reason Comments

STATUS HISTORY

| From Status | To Status | Status Desc | Reason | Username | User ID | Update Time |
|---|---|---|---|---|---|---|
| UU | AR | App Rec | | LES OLINGER | YDZHHBH | 2001-03-17 18:36:10.0 |
| AR | AB | App Bona Fide | | LES OLINGER | YDZHHBH | 2001-03-17 18:50:53.0 |
| AB | AS | Space Response | | LES OLINGER | YDZHHBH | 2001-03-17 18:58:53.0 |

*Figure 60*

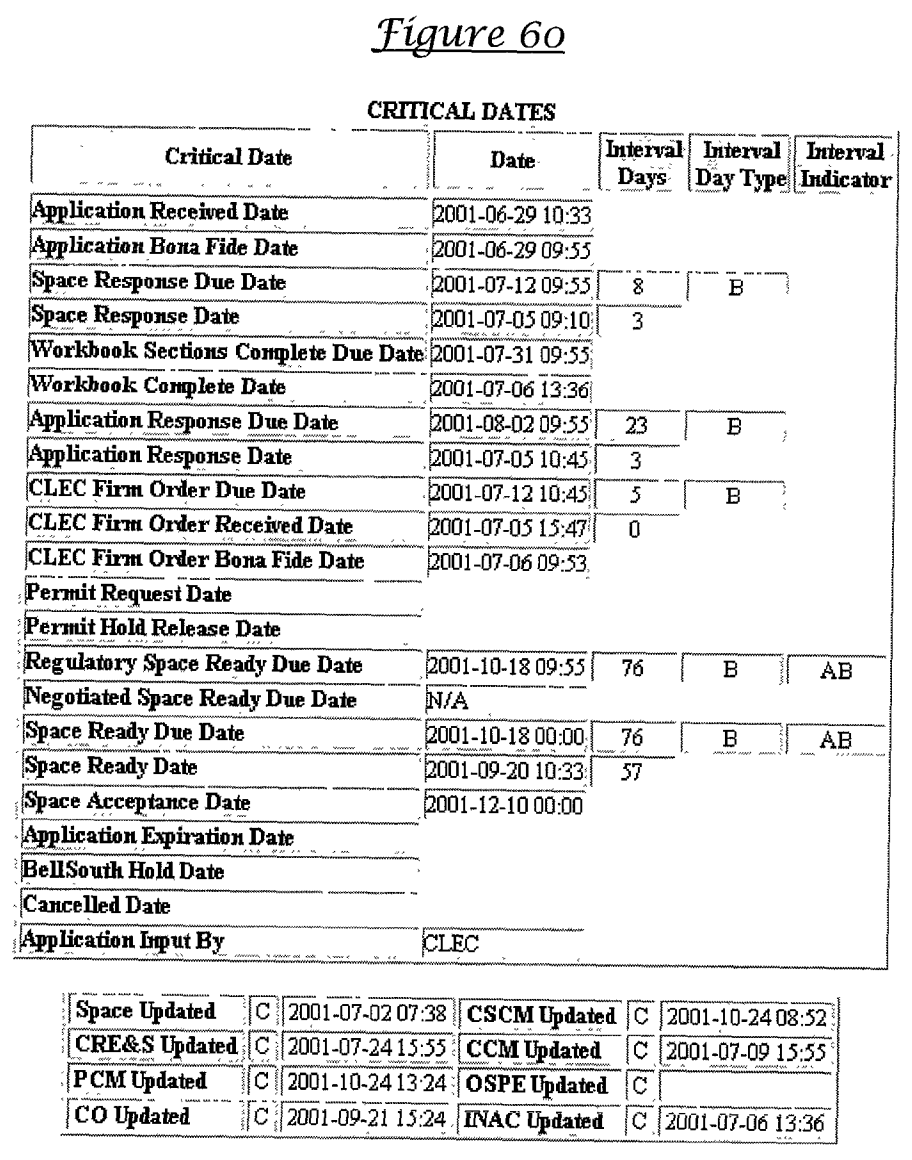

CRITICAL DATES

| Critical Date | Date | Interval Days | Interval Day Type | Interval Indicator |
|---|---|---|---|---|
| Application Received Date | 2001-06-29 10:33 | | | |
| Application Bona Fide Date | 2001-06-29 09:55 | | | |
| Space Response Due Date | 2001-07-12 09:55 | 8 | B | |
| Space Response Date | 2001-07-05 09:10 | 3 | | |
| Workbook Sections Complete Due Date | 2001-07-31 09:55 | | | |
| Workbook Complete Date | 2001-07-06 13:36 | | | |
| Application Response Due Date | 2001-08-02 09:55 | 23 | B | |
| Application Response Date | 2001-07-05 10:45 | 3 | | |
| CLEC Firm Order Due Date | 2001-07-12 10:45 | 5 | B | |
| CLEC Firm Order Received Date | 2001-07-05 15:47 | 0 | | |
| CLEC Firm Order Bona Fide Date | 2001-07-06 09:53 | | | |
| Permit Request Date | | | | |
| Permit Hold Release Date | | | | |
| Regulatory Space Ready Due Date | 2001-10-18 09:55 | 76 | B | AB |
| Negotiated Space Ready Due Date | N/A | | | |
| Space Ready Due Date | 2001-10-18 00:00 | 76 | B | AB |
| Space Ready Date | 2001-09-20 10:33 | 57 | | |
| Space Acceptance Date | 2001-12-10 00:00 | | | |
| Application Expiration Date | | | | |
| BellSouth Hold Date | | | | |
| Cancelled Date | | | | |
| Application Input By | CLEC | | | |

| | | | | | |
|---|---|---|---|---|---|
| Space Updated | C | 2001-07-02 07:38 | CSCM Updated | C | 2001-10-24 08:52 |
| CRE&S Updated | C | 2001-07-24 15:55 | CCM Updated | C | 2001-07-09 15:55 |
| PCM Updated | C | 2001-10-24 13:24 | OSPE Updated | C | |
| CO Updated | C | 2001-09-21 15:24 | INAC Updated | C | 2001-07-06 13:36 |

*Figure 61*

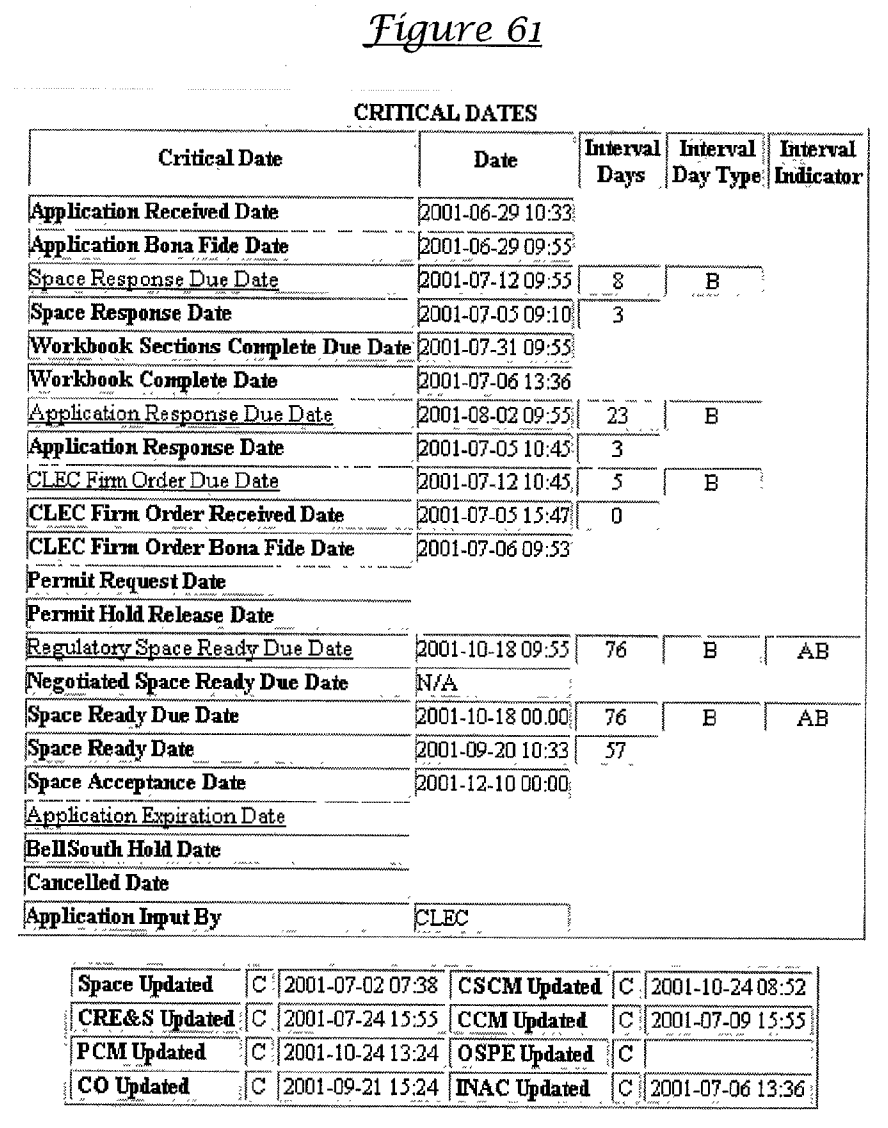

CRITICAL DATES

| Critical Date | Date | Interval Days | Interval Day Type | Interval Indicator |
|---|---|---|---|---|
| **Application Received Date** | 2001-06-29 10:33 | | | |
| **Application Bona Fide Date** | 2001-06-29 09:55 | | | |
| Space Response Due Date | 2001-07-12 09:55 | 8 | B | |
| **Space Response Date** | 2001-07-05 09:10 | 3 | | |
| **Workbook Sections Complete Due Date** | 2001-07-31 09:55 | | | |
| **Workbook Complete Date** | 2001-07-06 13:36 | | | |
| Application Response Due Date | 2001-08-02 09:55 | 23 | B | |
| **Application Response Date** | 2001-07-05 10:45 | 3 | | |
| CLEC Firm Order Due Date | 2001-07-12 10:45 | 5 | B | |
| **CLEC Firm Order Received Date** | 2001-07-05 15:47 | 0 | | |
| **CLEC Firm Order Bona Fide Date** | 2001-07-06 09:53 | | | |
| **Permit Request Date** | | | | |
| **Permit Hold Release Date** | | | | |
| Regulatory Space Ready Due Date | 2001-10-18 09:55 | 76 | B | AB |
| **Negotiated Space Ready Due Date** | N/A | | | |
| **Space Ready Due Date** | 2001-10-18 00:00 | 76 | B | AB |
| **Space Ready Date** | 2001-09-20 10:33 | 57 | | |
| **Space Acceptance Date** | 2001-12-10 00:00 | | | |
| Application Expiration Date | | | | |
| **BellSouth Hold Date** | | | | |
| **Cancelled Date** | | | | |
| **Application Input By** | CLEC | | | |

| | | | | | |
|---|---|---|---|---|---|
| **Space Updated** | C | 2001-07-02 07:38 | **CSCM Updated** | C | 2001-10-24 08:52 |
| **CRE&S Updated** | C | 2001-07-24 15:55 | **CCM Updated** | C | 2001-07-09 15:55 |
| **PCM Updated** | C | 2001-10-24 13:24 | **OSPE Updated** | C | |
| **CO Updated** | C | 2001-09-21 15:24 | **INAC Updated** | C | 2001-07-06 13:36 |

*Figure 62*

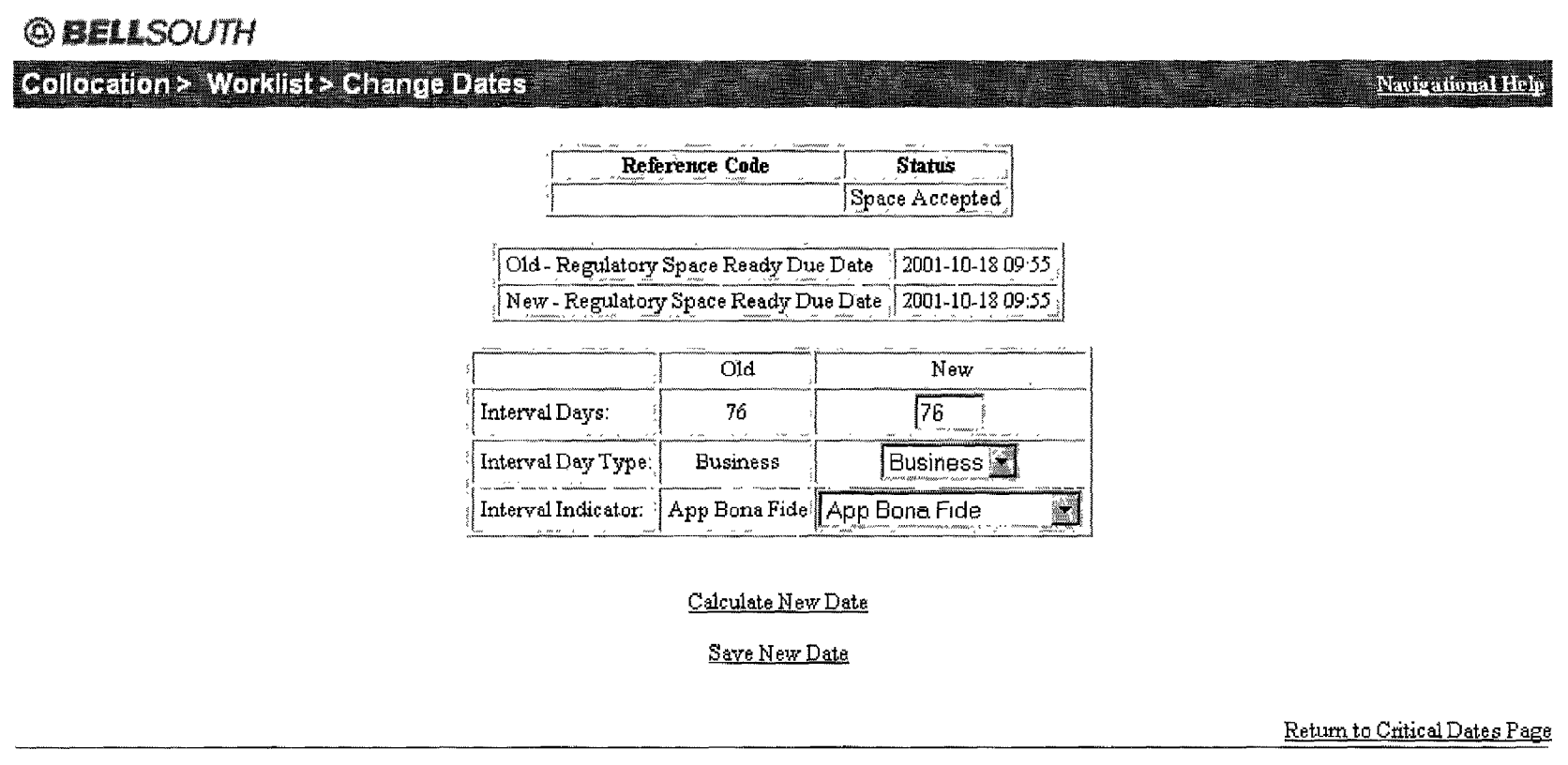

BELLSOUTH

Collocation > Worklist > Change Dates Navigational Help

| Reference Code | Status |
|---|---|
| | Space Accepted |

| | |
|---|---|
| Old - Regulatory Space Ready Due Date | 2001-10-18 09:55 |
| New - Regulatory Space Ready Due Date | 2001-10-18 09:55 |

| | Old | New |
|---|---|---|
| Interval Days: | 76 | 76 |
| Interval Day Type: | Business | Business |
| Interval Indicator: | App Bona Fide | App Bona Fide |

Calculate New Date

Save New Date

Return to Critical Dates Page

SYSTEMS AND METHODS FOR PROCESSING AND MANAGING COLLOCATION APPLICATION OVER A COMPUTER NETWORK

FIELD OF THE INVENTION

The invention generally relates to the field of telecommunications. The invention particularly relates to systems and methods for processing and managing applications for collocation space over a computer network.

BACKGROUND OF THE INVENTION

In the United States, telephone service was historically provided almost exclusively by American Telephone and Telegraph, Inc. (AT&T). Following deregulation of the telephone industry in 1984, AT&T was limited to providing long distance telephone service, and local telephone service was thereafter provided by the Regional Bell Operating Companies (RBOCs), such as Bell Atlantic and BellSouth. Thus, following deregulation, the RBOCs served as the exclusive local exchange carriers (LECs), and maintained the subscriber loop between the Public Switched Telephone Network (PSTN) and each individual telephone subscriber.

In 1996, Congress enacted the Telecommunications Act (the "Act") as part of an effort to foster competition in the local telephone industry. Interpretations and enforcement of key portions of the Act were placed in the jurisdiction of the Federal Communications Commission (FCC). The FCC quickly set forth regulations requiring incumbent local exchange carriers (ILECs) to allow any requesting telecommunications carriers, or competitive local exchange carriers (CLECs), to utilize the ILEC's networks to establish a market presence in a region while the CLEC builds its own physical network. These regulations require ILECs to make their network components available using a variety of approaches in which a CLEC purchases service bundles or individual service components from the ILEC and resells those services, as originally bundled, as rebundled by the CLEC or individually, to the CLEC's customers.

The FCC required ILECs to offer collocation space, in some form, to CLECs as early as 1991, but the Act redefined collocation space requirements. As part of the Act's mandate, an ILEC must allow CLECs access to the ILEC's central offices (COs) and provide space in those COs, known as collocation space, for CLEC equipment. A CLEC, for example, may lease certain unbundled elements of the ILEC's network at reduced rates for resale. The CLEC may lease an unbundled port on an end office switch as a point of access to the ILEC's switch and the subscriber loops. The CLEC then connects its own switch network to the unbundled port. Alternatively, the CLEC may operate its own independent switching facilities and loop plant. In either case, the regulatory requirements mandate that the CLEC facilities must be integrated into the PSTN in a seamless manner from the customer's perspective. As such, customers must be able to make and receive telephone calls using existing dialing patterns, without any apparent distinction in processing as a result of service through the CLEC. The regulatory environment therefore places certain burdens on the ILEC to provide an efficient interconnection to the CLEC's facilities and to provide mechanisms for compensation between the parties for calls interconnected between the two carriers' networks.

The interconnection contemplated by the Act provides nondiscriminatory access or interconnection to such services or information as is necessary to allow the requesting CLEC to implement local dialing parity, including access to telephone numbers, operator service, directory assistance, and directory listing, with no unreasonable dialing delays. Federal regulations require that ILECs provide CLECs with a way to request these services as well as the necessary collocation space in the ILEC's CO. For instance, if there is a CO in which a CLEC wants to locate its equipment, the CLEC must complete an application for collocation space and specific federal rules and regulations mandate how and when the ILEC must respond. Among the federal regulations are specified time limits or intervals for standard work activities such as the interval from application submit date to ILEC response date. These time limits may be as short as a few days, such that even a one day delay can become significant.

Previously, a CLEC completed a paper collocation application and sent the completed application by mail, fax, or e-mail to an account team of the ILEC. If there were errors made by the CLEC in submitting the request, the account team was responsible for contacting the CLEC to verify and/or correct the information. The account team then sent the application to applicable field organizations or groups of the ILEC. Copies of applications had to be faxed or shipped next-day air to multiple sites in the region in order to meet the regulatory mandated date intervals. Because there were so many applications being handled manually, applications were often lost or misplaced and an arduous tracking process had to be implemented to ensure proper handling.

Each applicable field group was responsible for providing any information required of it, based on the collocation application, and entering the necessary data into a simple spreadsheet or on paper. The collective information provided by all of the applicable field groups formed the basis for a response to the CLEC. Once the ILEC sent a response, the CLEC replied by paper with a firm order if it wished to order the allocated collocation space. The paper process is faulty for numerous reasons, including time delays, poor handwriting, inaccurate math, and impossible or inconsistent data parameters entered by the CLEC.

The manual, paper-based environment was improved somewhat through the use of PCs and spreadsheets that multiple field groups could access. However, variations still exist because numerous parties are involved in the process and the information is spread among many PCs and is not centrally located. High employee turnover is another problem for CLECs. Because of the high volume of turnover, CLECs do not know with certainty whether a collocation application was sent, what attachments may have been included with the application, where copies of relevant documents were filed, etc. The manual, paper-based and spreadsheet-based systems and methods are simply too labor intensive and prone to errors.

Therefore, there is a need for methods and systems of automating the collocation application process using a computer network where applications for collocation space are processed, responses are generated, firm orders are submitted, and work is provisioned efficiently and accurately.

SUMMARY OF THE INVENTION

The present invention satisfies the above-described needs by providing a method and system of processing and managing applications for collocation space. In a computer network including at least a workstation, a communications link, a secure web server, an application server, and a database server, an exemplary embodiment of the invention assists users or CLECs in completing applications for collocation space and allows ILECs to efficiently manage preparation of responses to those applications. Generally, an embodiment of the invention includes completion and submission of an application, and subsequent firm order, by a user to notify the ILEC that the user would like to collocate in a particular CO and processing of the application and firm order provisioning by the ILEC, including preparation of a response to the user indicating cost, space available, and other parameters.

An embodiment of the present invention assists users in submission of a collocation application. The user submits information regarding the location of the collocation space, the equipment to be installed, and other parameters. Some data field values in the application are automatically populated when the application is created based on the information provided by the user, or corresponding data, and calculations. The user may also provide a proposed layout of the equipment for the collocation space. Once the application is complete, the user submits the application. A validation check of the application determines whether the information provided by the user is accurate and complete. If the user has submitted invalid or incomplete information, the user receives an error message that advises the user of the error and its location in the application. Multiple errors may be covered by the same error message. After correcting any errors, the user re-submits the application, and receives a confirmation banner with the system assigned reference code. The ILEC is notified that the application was successfully submitted.

Another embodiment of the present invention includes managing collocation applications once they have been submitted and generating responses to those applications. An exemplary workbook with a plurality of sections is created for each submitted application once the application is initially reviewed by the ILEC. Applicable field groups of the ILEC are responsible for completing the appropriate sections. As one group finishes, notification, including all of the relevant information that the next group needs to move forward with the response, is provided to the next group. This saves a significant amount of time in processing applications and results in more due dates being met. Much of the detailed information from the application may be used by the system to set field values when the workbook is created. This minimizes transpositions and inaccuracies and also allows for validation of the information input into the workbook by the ILEC field groups. The workbook may also include a critical dates section to inform the ILEC and/or user of due dates and event dates. Once a response is complete, the user is notified and prompted to submit a firm order.

Advantages of systems and methods according to the present invention include allowing ILECs to speed internal distribution, to respond to applications within the intervals mandated by the various regulatory bodies (FCC and state commissions), to improve reporting capabilities, and to reduce costs. These and other objects, features, and advantages of the present invention may be more clearly understood and appreciated from a review of the following detailed description of the disclosed embodiments and by reference to the appended drawings.

BRIEF DESCRIPTION OF THE DRAWINGS

The drawings include material that is subject to copyright protection. The copyright owner has no objection to the facsimile reproduction of the published patent document or patent disclosure as it appears in the Patent and Trademark Office records, but otherwise reserves all copyrights in the material.

FIG. 8 is an exemplary screen shot illustrating a worklist screen from the ILEC ATCC perspective.

FIG. 11 is an exemplary screen shot depicting sections 4 and 5 of an exemplary collocation application.

FIG. 12 is an exemplary screen shot depicting section 5 of an exemplary collocation application.

FIG. 13 is an exemplary screen shot depicting section 6 of an exemplary collocation application.

FIG. 14 is an exemplary screen shot depicting the first part of section 7 of an exemplary collocation application.

FIG. 15 is an exemplary screen shot depicting the second part of section 7 of an exemplary collocation application.

FIG. 16 is an exemplary screen shot depicting the first part of section 8 of an exemplary collocation application.

FIG. 17 is an exemplary screen shot depicting the second part of section 8 and section 9 of an exemplary collocation application.

FIG. 18 is an exemplary screen shot depicting the first part of section 10 of an exemplary collocation application.

FIG. 19 is an exemplary screen shot depicting the second part of section 10 and section 11 of an exemplary collocation application.

FIG. 20 is an exemplary screen shot depicting the first part of section 12 of an exemplary collocation application.

FIG. 21 is an exemplary screen shot depicting the second part of section 12 and section 13 of an exemplary collocation application.

FIG. 22 is an exemplary screen shot depicting section 14 of an exemplary collocation application.

FIG. 23 is an exemplary screen shot depicting section 15 of an exemplary collocation application.

FIG. 25 is an exemplary screen shot depicting a screen of an exemplary collocation application where a user is notified of an error.

FIG. 28 is an exemplary screen shot depicting sections 2 and 3 of an exemplary augment application of a collocation application.

FIG. 30 is an exemplary screen shot illustrating sections 2 and 3 of an exemplary collocation application created from an existing application.

FIG. 31 is an exemplary screen shot showing application status history.

FIG. 32 is an exemplary screen shot illustrating an exemplary workbook summary.

FIG. 33 is an exemplary screen shot illustrating a screen where a file may be attached to an exemplary workbook.

FIG. 34 is an exemplary screen shot illustrating an exemplary Reference section of an exemplary workbook.

FIG. 35 is an exemplary screen shot illustrating an exemplary Reference section of an exemplary workbook.

FIG. 36 is an exemplary screen shot illustrating an exemplary Space Availability section of an exemplary workbook.

FIG. 37 is an exemplary screen shot showing an exemplary Customer Inquiry Response.

FIG. 38 is an exemplary screen shot showing an exemplary Customer Inquiry Response.

FIG. 39 is an exemplary screen shot showing an exemplary Customer Inquiry Response.

FIG. 40 is an exemplary screen shot depicting an exemplary PCM section of an exemplary workbook.

FIG. 41 is an exemplary screen shot depicting an exemplary CO-Operations section of an exemplary workbook.

FIG. 42 is an exemplary screen shot depicting an exemplary INAC section of an exemplary workbook.

FIG. 43 is an exemplary screen shot depicting an exemplary CCM section of an exemplary workbook.

FIG. 44 is an exemplary screen shot showing an exemplary INAC page of an exemplary workbook.

FIG. 45 is an exemplary screen shot illustrating an exemplary Critical Dates section of an exemplary workbook.

FIG. 46 is an exemplary screen shot depicting an exemplary Firm Order form

FIG. 47 is an exemplary screen shot showing an exemplary billing screen.

FIG. 49 is an exemplary screen shot depicting an exemplary Firm Order True-up screen.

FIG. 50 is an exemplary screen shot depicting an exemplary Firm Order True-up screen.

FIG. 51 is an exemplary screen shot depicting an exemplary Firm Order True-up screen.

FIG. 54 is an exemplary screen shot depicting a company profile maintenance screen.

FIG. 56 is an exemplary screen shot depicting an individual profile maintenance screen.

FIG. 58 is an exemplary screen shot of an application status screen.

FIG. 59 is an exemplary screen shot of an application status screen.

FIG. 60 is an exemplary screen shot of a critical dates screen.

FIG. 61 is an exemplary screen shot of a critical dates screen.

FIG. 62 is an exemplary screen shot of a critical dates screen.

DETAILED DESCRIPTION OF THE INVENTION

The following detailed description utilizes a number of acronyms which are generally well known in the art or industry. While definitions are typically provided with the first instance of each acronym, for convenience, Table 1 below provides a list of the acronyms and their respective definitions.

TABLE 1

| ACRONYM | DEFINITION |
|---|---|
| ACNA | Access Carrier Name Abbreviation |
| ATCC | Account Team Collocation Coordinator |
| CCM | Circuit Capacity Management |
| CFA | Connecting Facility Assignment |
| CIR | Customer Inquiry Response |
| CLEC | Competitive Local Exchange Carrier |
| CLLI | Common Language Location Identifier |
| CO | Central Office |
| CRE&S | Corporate Real Estate and Services |
| CSCM | Common Systems Capacity Management |
| FCC | Federal Communications Commission |
| FO | Firm Order |
| HD | Heat Dissipation |
| ILEC | Incumbent Local Exchange Carrier |
| INAC | Interconnection Network Access Coordinator |
| LEC | Local Exchange Carrier |
| NEBS | National Electrical Building Systems |
| NECA | National Exchange Carrier Association |
| OSPE | Outside Plant Engineering |
| PA | Physical Application |
| PC | Personal Computer |
| PCM | Power Capacity Management |
| PM | Program Manager |
| PSTN | Public Switched Telephone Network |
| RBOC | Regional Bell Operating Company |
| SQM | Service Quality Measurement |
| VA | Virtual Application |

I. Overview

Figure 1:
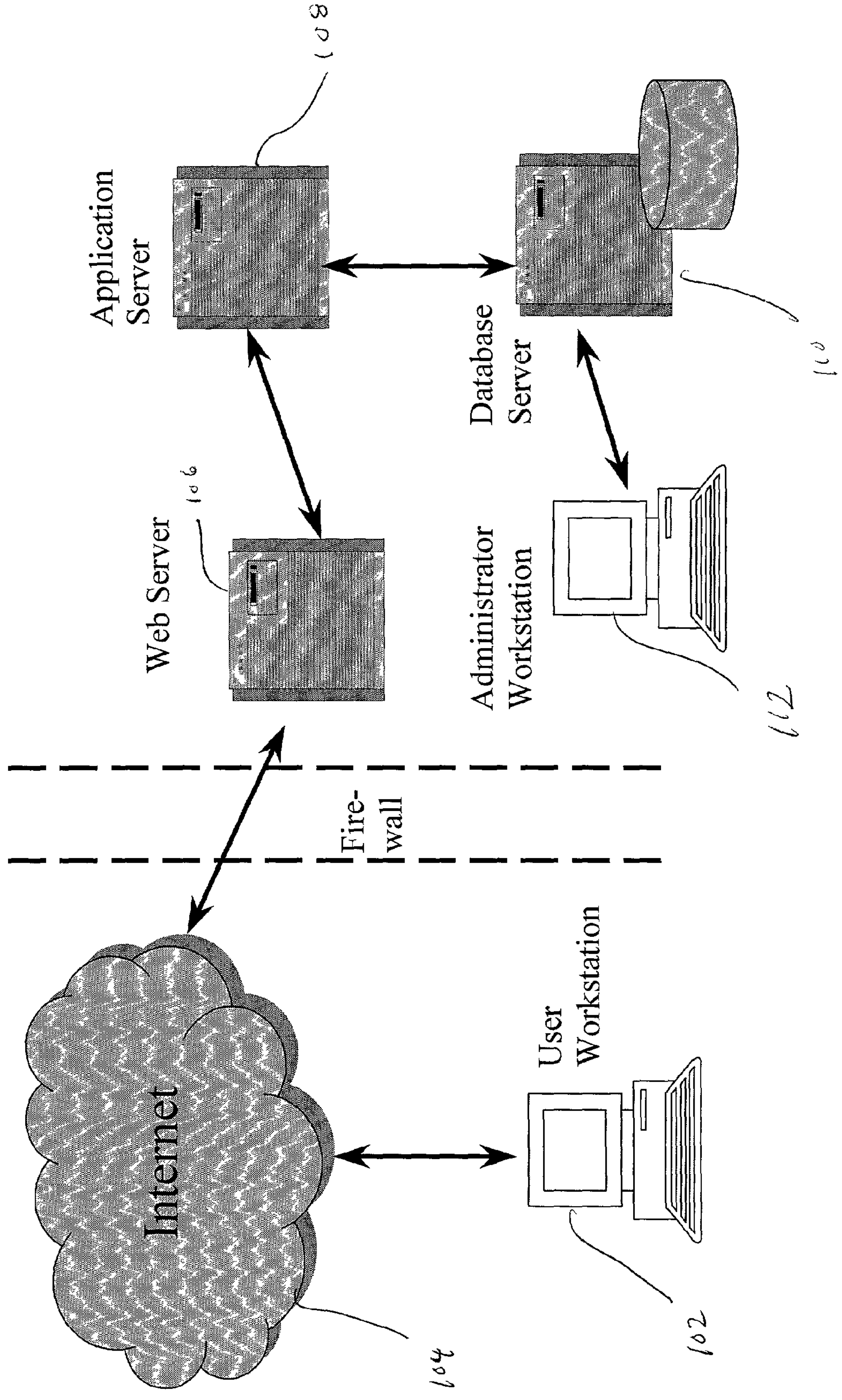
FIG. 1 illustrates an exemplary environment of a system according to the present invention.

Systems and methods according to the invention allow users to submit applications for collocation space and firm orders via a computer network, such as the Internet. As shown in FIG. 1, an exemplary environment includes a computer network with a workstation 102 connected to a secure web server 106 via Internet 104. Web server 106 is connected to an application server 108, which in turn is connected to a database server 110. Optionally, an administrator workstation 112 may be connected to database server 110 to assist in reporting or querying from the administrator or ILEC perspective. Additionally, the exemplary environment may have interfaces to external systems, for example, inputs from contract and rates systems and outputs to service request and billing systems. Systems and methods according to this invention may include submitting and distributing collocation applications and firm orders online; allowing ILEC field personnel to respond to and monitor applications online throughout the response and provisioning process; providing notification to the ILEC groups and users via e-mail of the events affecting each application; and displaying the current status of each application.

A worklist feature according to a system and method of the present invention allows users to view their stored applications for collocation space. Users may perform several tasks, including searching for applications, creating applications, checking the status of applications, and editing or revising applications.

Systems and methods according to the invention may include a collocation application. To complete the application, users are prompted for information regarding the location of the collocation space, the equipment to be installed, and other parameters. Users provide the necessary information and submit the application. Some data field values in the application may be automatically populated by the system when the application is created based on the information provided by the user, data retrieved in response to information provided by the user, and calculations. Users may also provide a proposed layout of the equipment for the collocation space. Once the application is complete, the user submits the application. A validation check of the application may be performed to determine whether the information provided by the user is accurate and complete. Online instructions and help topics may be provided to assist users in completing applications or firm orders.

Systems and methods according to the invention may also include a workbook or similar functionality that aids in the managing of collocation applications and preparation of responses thereto. An exemplary workbook may include multiple sections created for each applicable field group of the ILEC. As one group completes its section and any required tasks, notification is provided to the next group. This saves a significant amount of time in processing applications and results in more due dates being met. Much of the detailed information from the application may be used by the system to set data field values when the workbook is created. The workbook may also include a critical dates section to inform the ILEC and/or user of due dates and event dates. Once a response is complete, the user is notified and prompted to submit a firm order.

If a user submits a firm order, the ILEC completes the provisioning phase where it constructs the collocation space and tracks the progress of completing the project. Once construction of the space is complete, the user visits the CO to inspect the space. If satisfactory, the user accepts the space and billing begins. If necessary, reconciliation occurs where billing is adjusted to reflect the true environment, which may result if the physical characteristics of the CO collocation space differ significantly from assumptions made during the response process.

II. User Login and Administration

Figure 2:
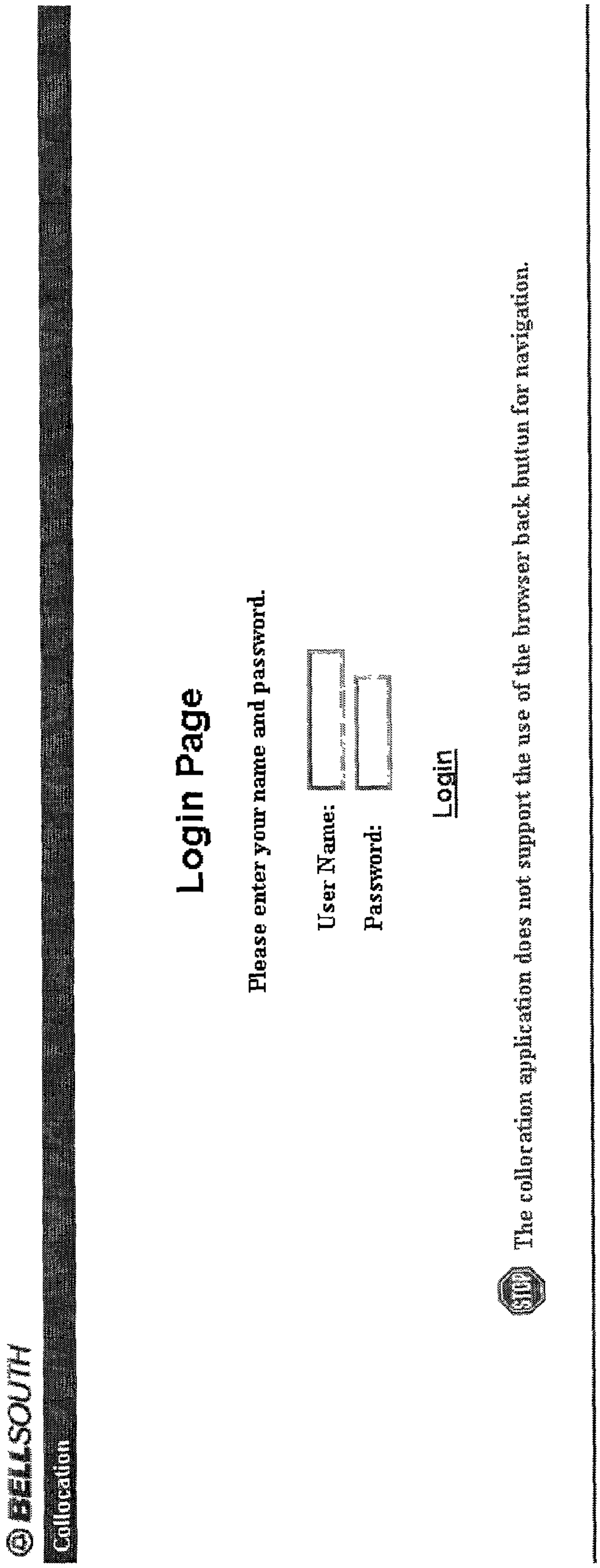
FIG. 2 is an exemplary screen shot of a user login page.
Figure 3:
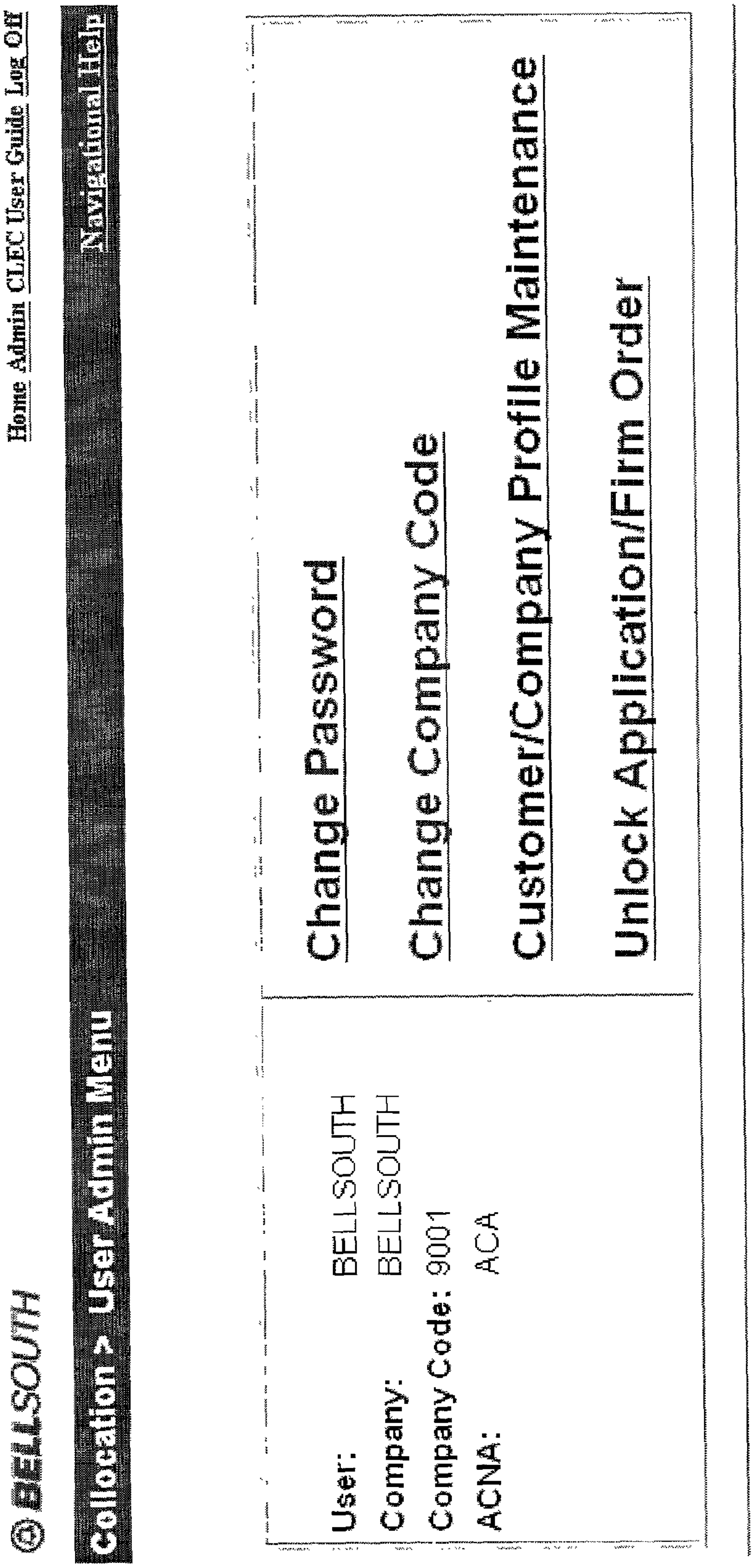
FIG. 3 is an exemplary screen shot illustrating a user administration menu.

When users access the website, they are directed to a login screen, as shown in FIG. 2. If the user is already registered, the user simply enters a user name and password to proceed. If the user has not previously registered, the user contacts a Regional Collocation Manager for assistance in obtaining a user name and password. In an exemplary embodiment, the user, once logged in, may choose from main menu options including Home, Admin, Help, User Guide, and Log Off, as shown in FIG. 3. The User Admin Menu allows the user to change its password, change its company code, or unlock an application or firm order, as shown in FIG. 3. Additionally, in an exemplary embodiment, the user may update or maintain its customer or company profile.

Figure 4:
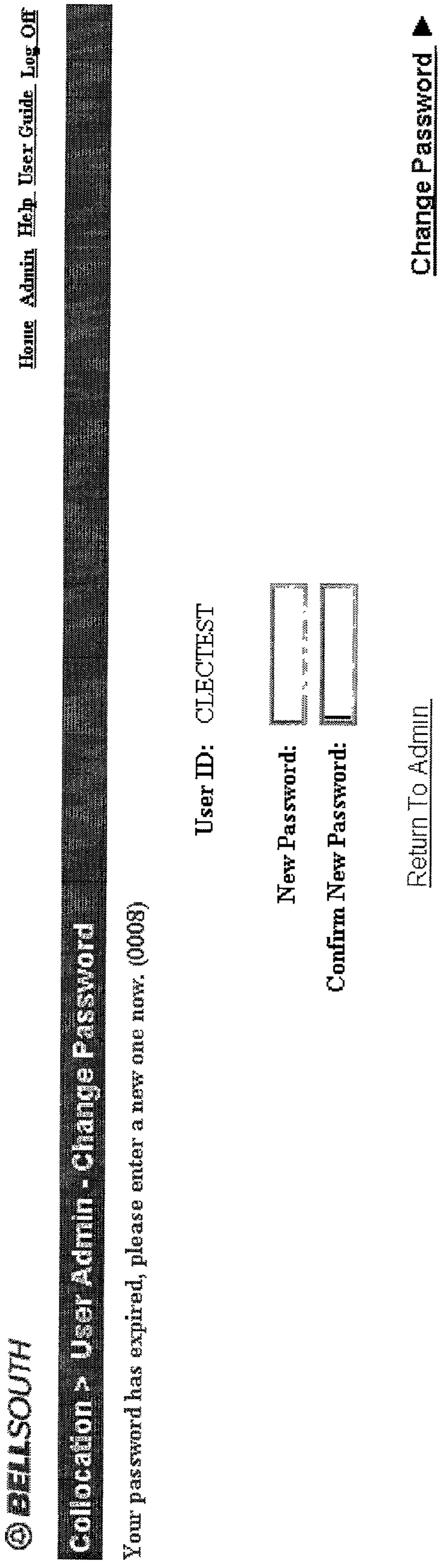
FIG. 4 is an exemplary screen shot illustrating a screen where a user can change a password.
Figure 5:
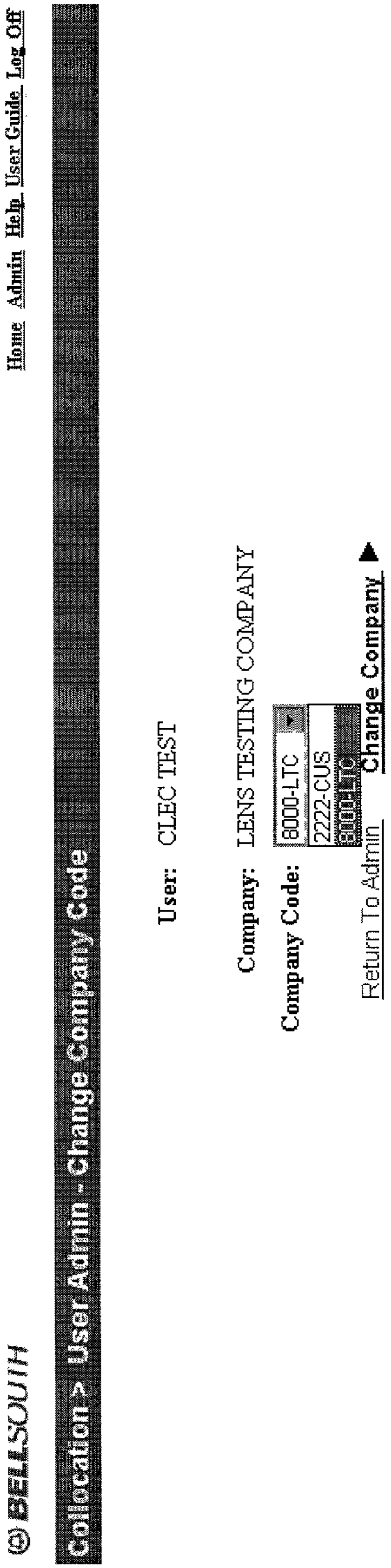
FIG. 5 is an exemplary screen shot illustrating a screen where a user can change a company code.

As shown in FIG. 4, users may change their passwords. In an exemplary embodiment, user passwords expire every sixty days, thus requiring users to enter new passwords periodically. Users may change company codes as shown in FIG. 5. Some users may be associated with multiple codes and may desire to switch to a different company code. For example, a user associated with a CLEC that has more than one company code may use this page to change the active company without having to log off. Each user has a default company code that is the initial company code shown each time the user logs in. Users cannot view applications for more than one company code simultaneously. A drop-down menu allows the user to select a company code from a list of company codes associates with the user in its collocation user profile.

Figure 6:
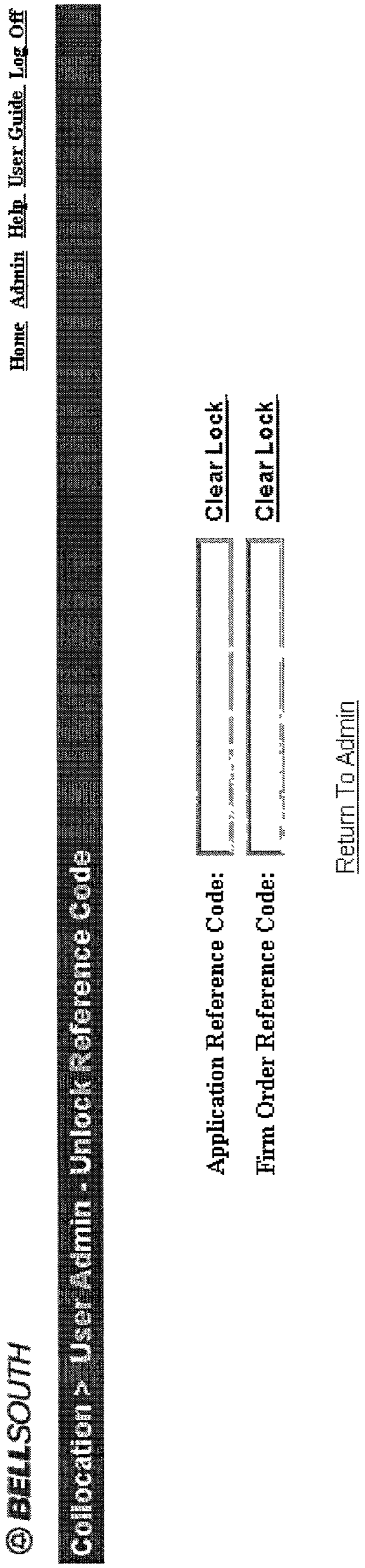
FIG. 6 is an exemplary screen shot illustrating a screen where a user can unlock a reference code.

As shown in FIG. 6, a user may unlock an application or firm order. When a user accesses an application or firm order document, the document is checked out to that user (by the database on which the document is stored) such that two users may not modify a document at the same time. If the user exits the system without canceling, saving, or submitting the changes made to the document, the document remains checked out. The user who checked out the document or the system administrator may unlock it by entering the reference code and selecting "Clear Lock," as shown in FIG. 6.

III. Worklist

Figure 7:
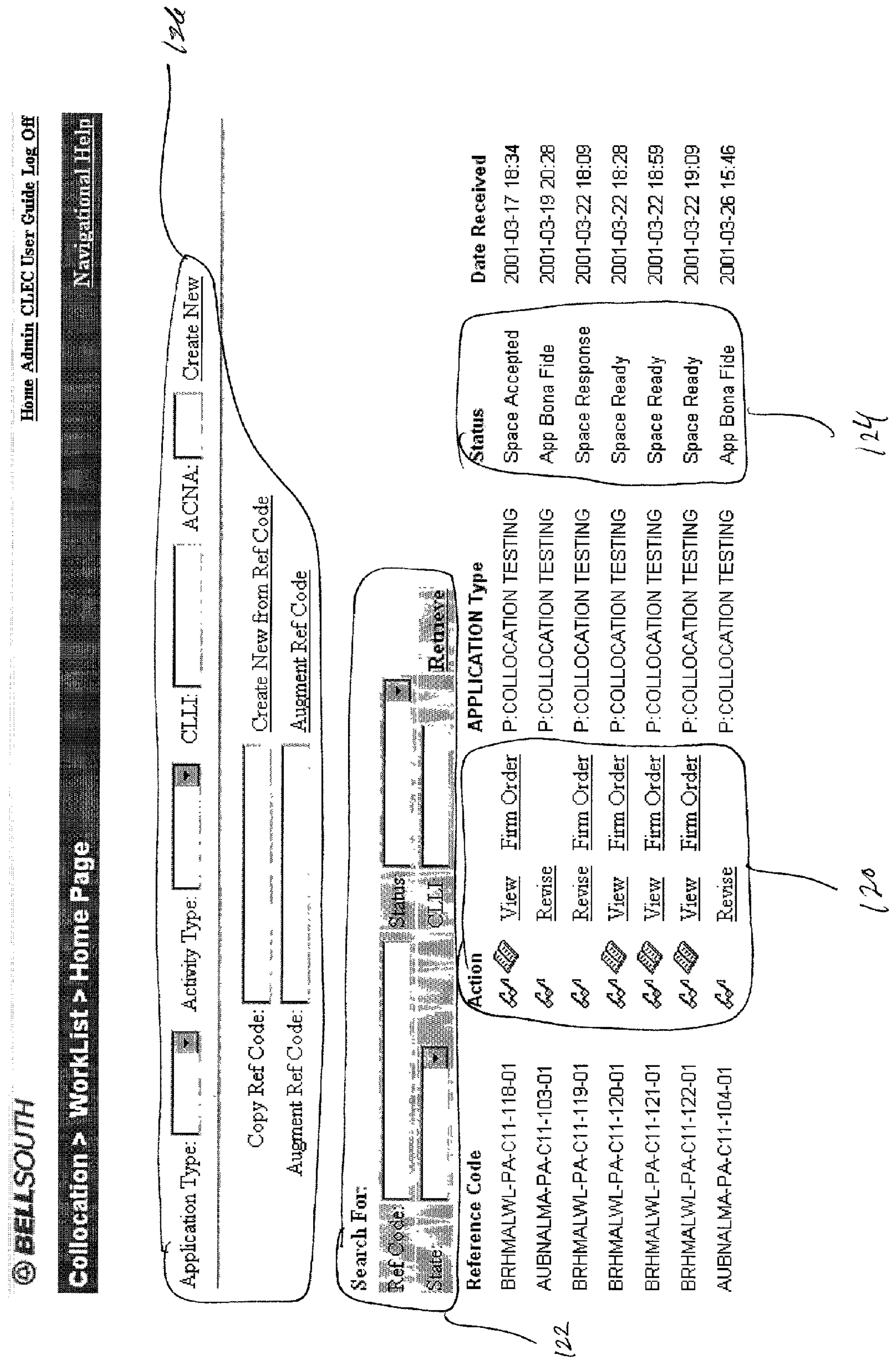
FIG. 7 is an exemplary screen shot illustrating a worklist screen from a user perspective.

FIG. 7 shows an exemplary embodiment of a worklist screen. This screen is the user's home page once the user is logged into the system. In an exemplary embodiment, no applications are visible upon initial login by the user, and the user utilizes the "Search For" area to retrieve one or more or all applications. In another embodiment, all applications to which the user has access are visible upon login by the user, and the user can limit the number of applications by using the search function. As shown in FIG. 7, reference codes are assigned to each collocation application. In an exemplary embodiment, the reference code may incorporate information from the application to assist the user in knowing the location, type, and CLEC details for that application. As an example, the second reference code listed is AUBNALMA-PA-C11-103-01. "AUBNALMA" is the Common Language Location Identification (CLLI) code for the central office (CO) location where the user desires collocation space. In this example, "AUBN" represents the city Auburn, "AL" represents the State of Alabama, and "MA" represents Main, the CO location in Auburn, Ala. There are thousands of CLLI codes representing the numerous COs across the United States. The National Exchange Carrier Association (NECA) #4 Tariff, which is incorporated herein by reference, contains a list of all CLLI codes.

The collocation application type is shown as "PA," indicating that a collocation application is a physical application. All of the applications listed in FIG. 7 are physical applications. "VA" indicates that a collocation application is a virtual application. An exemplary embodiment may also include application types such as "MA" for microwave application, "AA" for adjacent application, "RP" for remote terminal physical application, "RA" for remote terminal adjacent application, and so on.

A physical application (PA) is one in which the user's equipment is in a caged environment. Generally, equipment may be located in a caged or cageless environment. In a caged environment, all of the user's equipment is located in a secure room or cage with access available only by key or code. In a cageless environment, the user's equipment is located in a common area open to all other users and ILEC personnel. A virtual application (VA) is one in which the user's equipment is in a cageless environment. The user is not allowed physical access to the equipment in a VA, and the equipment is maintained by the ILEC.

"C11" represents the company code, or Access Carrier Name Abbreviation (ACNA), that is assigned by Telcordia™ to the particular CLEC or company, such as AT&T®, Sprint®, etc. The application number and version are indicated by "103-01." In an exemplary embodiment, a company's first collocation application is assigned the number "100," the next application is assigned "101," and so on. The initial version of an application is assigned "01" and as revisions are made, new version numbers ("02," "03," and so on) are assigned.

There are several areas of the worklist where users may perform different tasks. As shown in FIG. 7, an action area 120 allows users to view, revise or edit applications; view a workbook associated with an application; print and display printable versions of applications; and submit firm orders. Selecting the glasses icon displays a printable version of the application, while selecting "Firm Order" allows the user to submit a firm order for that application. Selecting "Edit" (not shown in FIG. 7) permits users to edit unsubmitted applications, and "Revise" is available for users to revise applications that have already been submitted. Several of these functionalities are discussed in further detail below.

Selecting the workbook icon allows users to view the Customer Inquiry Response (CIR) section of the workbook for the application. As shown in FIG. 7, when the status of an application is changed to "App Bona Fide," a workbook for the application is created and a workbook icon appears next to the reference code of the application from that point forward (unless the application is canceled). An exemplary embodiment of a workbook is discussed in further detail below with regard to FIGS. 32–51.

A search area 122, as shown in FIG. 7, allows users to search for one or more applications based on criteria such as reference code, status, state, or CLLI. Other criteria, such as ACNA or city, or application type may also be used. To view all applications to which the particular user has access, the user clears all fields and selects "Retrieve." A status area 124 shows the status of each application listed. As shown in FIG. 7, different status indicators include "App Bona Fide," "Space Accepted," "Space Response," and "Space Ready." Numerous other status indicators may be used, as would be understood by those skilled in the art, and status descriptions are discussed in further detail below.

Figure 9:
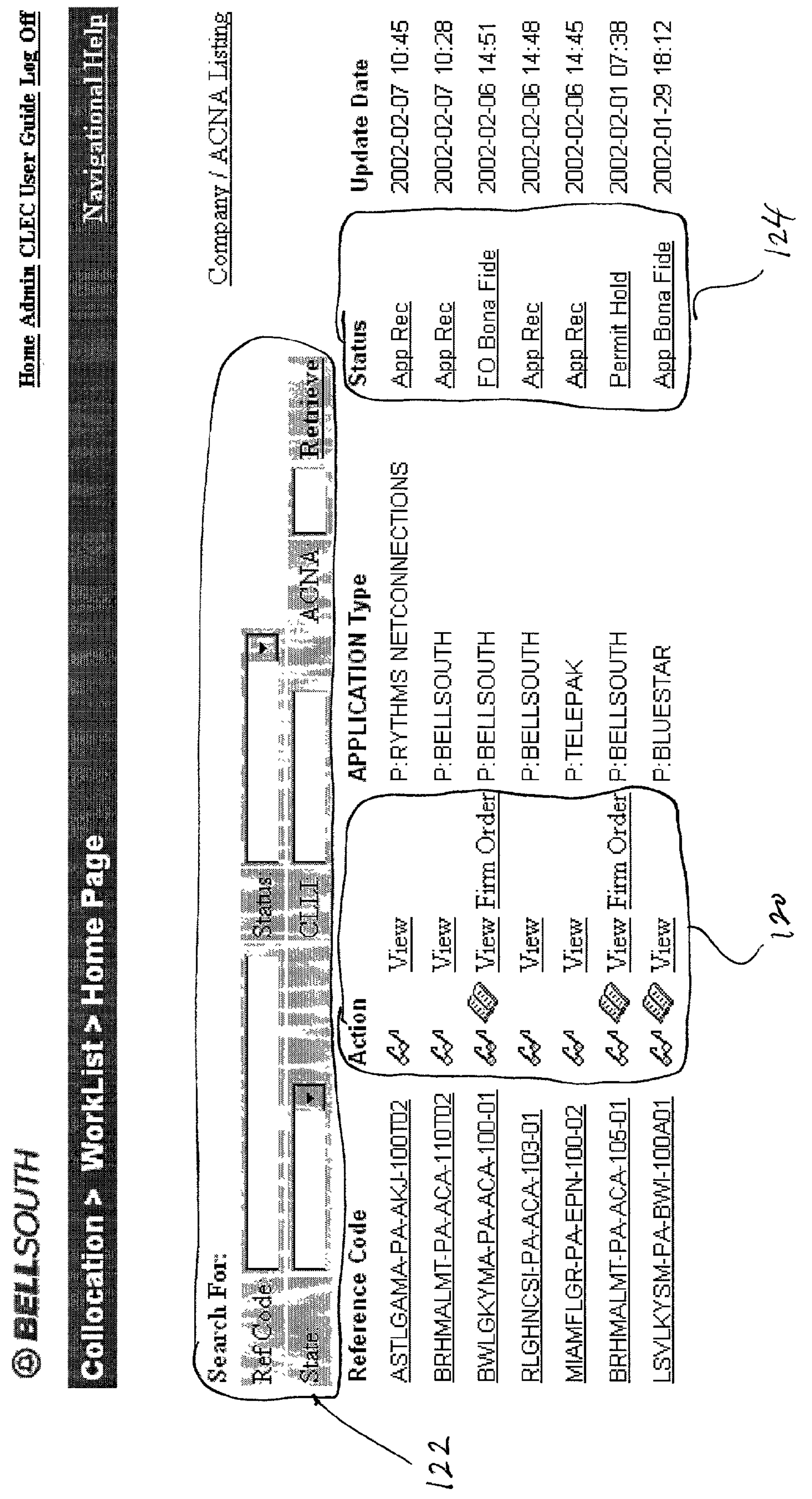
FIG. 9 is an exemplary screen shot illustrating a worklist screen from an ILEC field group perspective.

FIG. 8 depicts a worklist screen from the perspective of the Account Team Collocation Coordinator (ATCC) of the ILEC. The profile associated with the individual utilizing the system determines the features available depending on whether the rode assigned to the logged-in individual is a user, an ATCC, or a field group of the ILEC. The ATCC may view applications of all users and create an application, as shown by a creation area 126. Additionally, the dollar sign icon shown in the action area 120 indicates an additional functionality that is only available to the ATCC of the ILEC. This additional functionality relates to billing and is used by the ILEC billing coordinator to document and monitor billing activity for each application. FIG. 9 depicts a worklist screen from an ILEC field group perspective. The worklist screen includes an action area 120, a search area 122, and a status area 124. Field groups cannot create applications or perform billing functions, but they may search and view applications for all users. Additional functionalities of the ILEC ATCC and field groups are discussed in further detail below.

Creation area 126, as shown in FIG. 7 (and also FIG. 8), is where all applications initially begin. To submit an initial application, the user selects an application and activity type, enters the CLLI code for the location where the equipment is to be installed, and selects "Create New." The ACNA field is automatically populated by the system with the ACNA associated with the user. If a paper application is sent to the ILEC, the ILEC creates an application in the same manner as a user does.

IV. Creating, Revising, Editing, and Augmenting Collocation Applications

Figure 10:
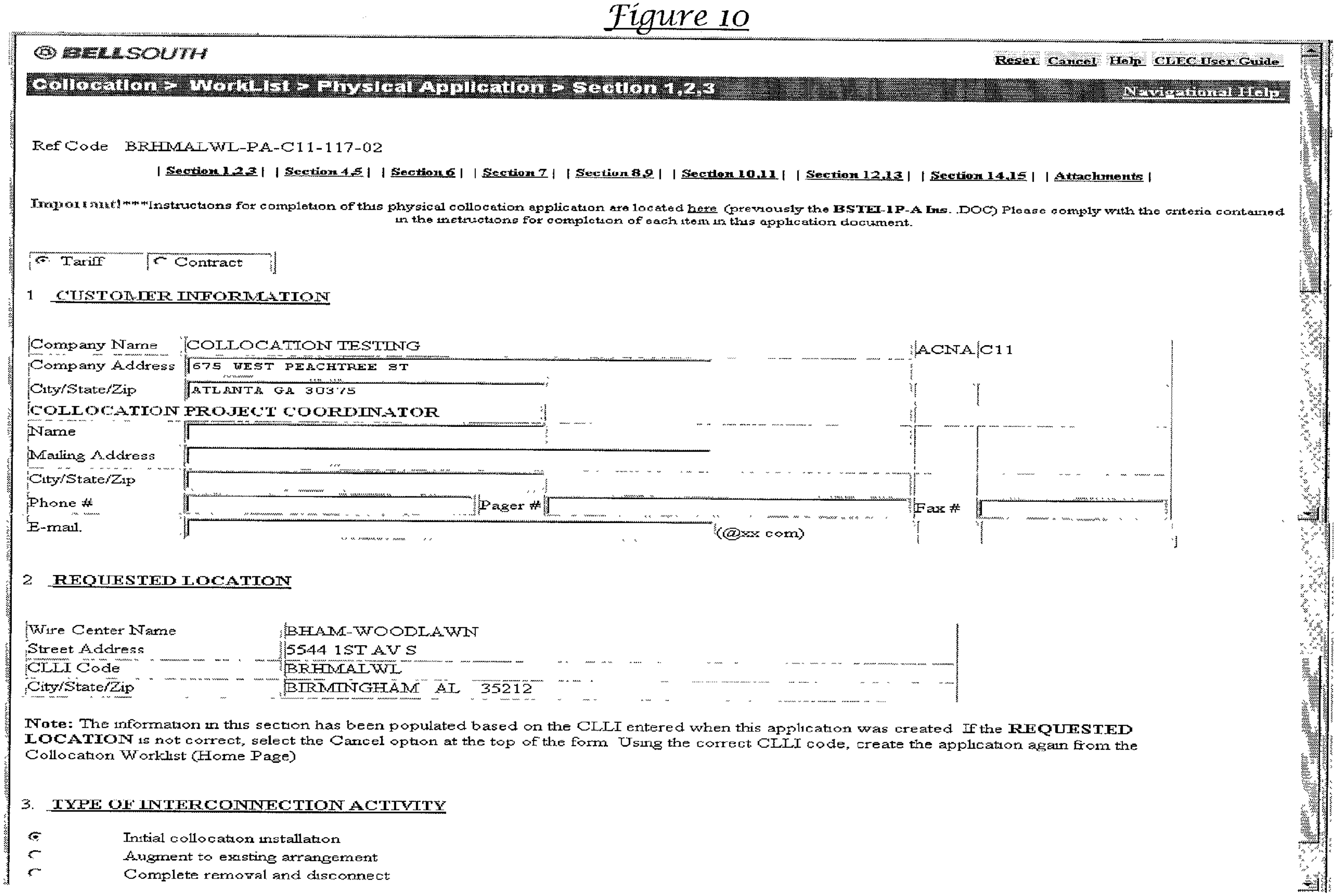
FIG. 10 is an exemplary screen shot depicting sections 1–3 of an exemplary collocation application.

Once an application is created, a reference code is assigned and a first page of the application appears, as shown in FIG. 10. In an exemplary embodiment of the collocation application shown in FIG. 10, the first screen includes sections 1–3. The user selects tariff or contract and completes section 1, customer information. The user is prompted to enter the contract user's business name and address, ACNA, and contact information for a project manager. The system automatically populates any fields for which it already has data about the user, such as ACNA and address information.

Section 2 includes the wire center name, address, CLLI code, city, state, and zip code for the CO location where the user desires to install equipment. In an exemplary embodiment, if the user enters a CLLI code when creating the application, the system will supply the corresponding wire center name and address information to reduce errors and save the user time. Section 3 shows that the user has three choices regarding type of interconnection activity. However, only "Initial collocation installation" may be selected by the user when the activity type "Initial" is used to create a new application. In an exemplary embodiment, three activity types are available to the user: Initial, Augment, and Disconnect. These activity types correspond to the three selections available in the exemplary embodiment of section 3, as shown in FIG. 10. ILEC personnel may have available to them a fourth activity type, "Termination," which may be used when the ILEC is disconnecting equipment on behalf of a user based on extenuating circumstances (e.g., by order of a bankruptcy court). Once the required information in sections 1–3 is entered, this screen will prompt the user to stop the application if the user does not want to proceed with the location entered in section 2.

Sections 4 and 5 appear on a second screen of an exemplary embodiment of the collocation application. These sections are shown in FIGS. 11 and 12. The user selects the type of space and enters the square footage. In an exemplary embodiment, when an Augment application is created, the user is provided with additional data input items for a caged or cageless non-conventional to allow the user to indicate requirements for additional space or space to be vacated. The user provides existing space detail plus information on the additional or vacated space. Optionally, the system may calculate and display the resulting space to reduce errors. If the user selects "Cageless Conventional" in section 4, the user then completes appropriate details in section 5A, 5B, or 5C. The user enters rack and spacer size. The system calculates the total width in column 6 and subtotals column 6 for all racks of equal depth and enters that subtotal in column 7. This ensures that the calculations are accurate and saves the user time. Additional rows can be added to the table by selecting "Add Row," as shown in FIG. 11. Additional rows can also be added to the tables in sections 5B and 5C, as shown in FIG. 12.

Section 5B allows users to enter changes regarding the use of "Cageless Conventional" collocation space that has previously been assigned. In the case of a new application, it is unnecessary for a user to complete this section. In the case of a previously submitted application, the user completes section 5B to indicate any requested changes. In section 5C, users provide information regarding all "Cageless Conventional" space that is to be released either by removal of existing equipment or releasing space previously reserved for future use. It is unnecessary for the user to complete section 5C when creating a new application.

Additionally, detailed instructions and, where applicable, examples of how to complete the tables in section 5 are available by clicking on the section (or subsection) title. This may be implemented for all sections of the collocation application, as shown in the exemplary embodiments in FIGS. 10–26.

As shown in FIG. 13, users are requested to provide detailed information about the equipment to be installed (or removed, if equipment is to be removed) in section 6 of the application. The user may add tables if necessary. The exemplary embodiment shown in FIG. 13 requests numerous categories of information. In data item 1, users indicate the rack number as shown in a proposed floor plan layout that is (or will later be) attached to the application. In data item 2, users enter contact information for the vendor or manufacturer of the equipment. Users provide model numbers and functional descriptions for equipment in data items 3 and 4. In data item 5, users enter the existing quantity of equipment installed, and the quantity of equipment to be added or removed is entered in data item 6.

The total quantity in data item 7 is calculated and entered by the system, as is the total heat dissipation in data item 8. The "Total" portion of data item 8 reflects the heat release for all of the equipment across the line entry. The information for the "Per Unit" portion of data item 8 is provided by the user. Heat dissipation (HD) is directly proportional to the amount of power consumed by equipment. In data items 9 and 10, users enter the nominal and worst case −48V DC power requirements of the equipment on a per unit basis. The system calculates the total values. The system performs validation checks that verify whether the HD and the −48V DC nominal power entries in each equipment table fall within expected ranges (as defined below). If the one or more entries fall outside the expected ranges, an error message appears when the user attempts to submit the application. The message identifies the equipment table that fails the verification check. Upon receiving such a message, users should verify their entries with manufacturer's equipment specifications and correct any discrepancies.

In data item 11, users enter "yes" if the equipment meets the criteria level 1 requirements as outlined in the Telcordia Special Report SR-3580, Issue 1 for National Equipment Building Systems (NEBS) requirements, said document being incorporated herein by reference. Users enter "no" if the equipment does not meet these requirements. Users provide an attachment listing the non-compliant equipment and explaining the specific NEBS level 1 criteria that the equipment fails to meet. The system calculates the subtotals for heat dissipation and nominal and worst case power requirements in the table shown above the "Remarks" section in FIG. 13.

Section 7 is shown in FIGS. 14 and 15. Although section 7 is shown in two figures, section 7 is available to users on a single screen in an exemplary embodiment. In section 7, users provide information on −48V Power requirements and grounding, as illustrated in FIGS. 14 and 15. Sections 8 and 9 are shown in FIGS. 16 and 17. Typically, these sections are available to users on a single screen. Section 8 pertains to co-carrier cross connect detail, such as how many cables are needed, to and from which cages will the cable run, what type of service, and so on. Users complete section 8A if a connection between non-contiguous collocation arrangements is being requested. If the user desires a co-carrier cross connect, the user enters additional requested information regarding the equipment and equipment rack location. Users complete section 8B if the installation requires fiber interconnection of the user's non-contiguous racks or cabinets. As shown in FIG. 17, section 9 prompts users to provide the quantity for each type of cable being installed and directs users as to which portion of section 10 should be completed for the particular type of cable.

Sections 10 and 11 are shown in FIGS. 18 and 19. Generally, in an exemplary embodiment, these sections 10 and 11 are available to users on a single screen. Drop-down menus in section 10 assist users with entering data related to the types of cable being used. Users complete section 11 if shared space is involved.

FIGS. 20 and 21 depict sections 12 and 13, which, in an exemplary embodiment, are available to users on a single screen. In the portion of section 12 shown in FIG. 21, the user selects the type of wiring requirement (such as DS-1, DS-3, etc.), type of connection, and whether the project is an addition or removal, as well as the desired quantity of each circuit. Drop-down menus assist users in providing this information. In the exemplary embodiment of section 13 shown in FIG. 21, users are prompted for contact information for equipment wiring, technical, local coordinator, and building access.

Figure 24:
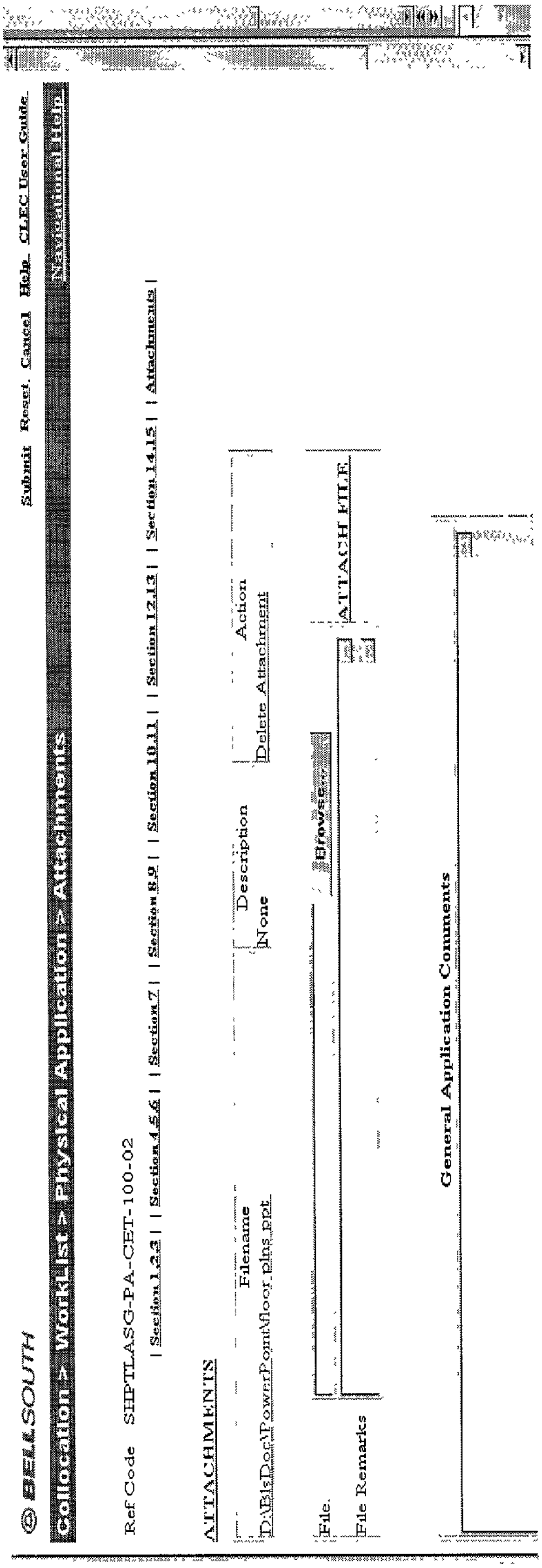
FIG. 24 is an exemplary screen shot depicting a screen of an exemplary collocation application where a user may attach a file.

As shown in FIG. 22, the user supplies billing information in section 14. In section 15, the user certifies that the equipment listed in the application complies with several industry standards for safety and compatibility, as shown in FIG. 23. By selecting the Attachments link that is available at the top of most screens, as shown for example in FIG. 16, users may attach electronic files or documents to their applications, as shown in FIG. 24. Users may add any comments about the attachment(s) in the box provided. Generally, users are prompted for a diagram of the space within which the equipment is to be located. The diagram may be sent as an attachment with the application, and the attachment remains linked to the application throughout its history, assisting in audit purposes.

Figure 26:
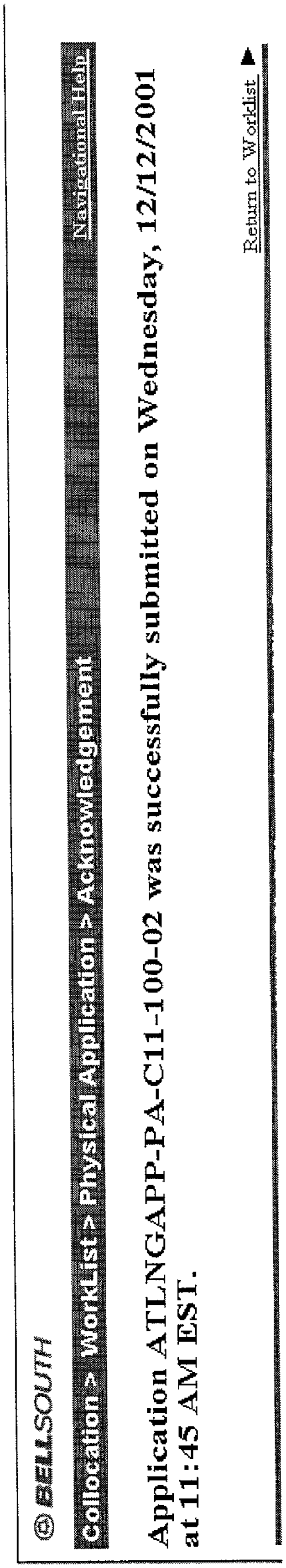
FIG. 26 is an exemplary screen shot depicting a confirmation screen of an exemplary collocation application.

Once the user is ready to submit the application, the user selects "Submit," as shown in FIG. 24. At this time, the system performs a final check of the application to determine whether any items are inconsistent, invalid, or otherwise incomplete. If there is a problem with any item, the system returns an error message indicating the source of the problem. As an example, in FIG. 25, the system advises the user that the certification checkbox in section 15 (shown in FIG. 23) is a required field that has not been completed. The user makes any necessary corrections and selects "Submit" again to submit the application. If there are no inconsistencies or other incomplete items, the system generates a confirmation screen, including a time stamp, to indicate a successful submission, as shown in FIG. 26. Before submitting a completed application, the user may save the application as "unsubmitted." This is particularly useful if the user needs additional information to complete the application or needs to verify some information before submitting the application.

Once an initial application has been created, several functionalities are available to users to make changes or take other action with regard to the application. As discussed earlier in conjunction with FIG. 7, there is an action area 120 where users may edit, revise, or view applications or firm orders. "Edit" is available only for unsubmitted applications, which are applications that have been saved by the user but not yet submitted. The user selects "Edit" to continue working on the application. For submitted applications, "Revise" rather than "Edit" is available. When a user selects "Revise," a new version of the application is created. If a firm order for the application has been submitted, "View" allows the user to view, but not change, the application.

Figure 27:
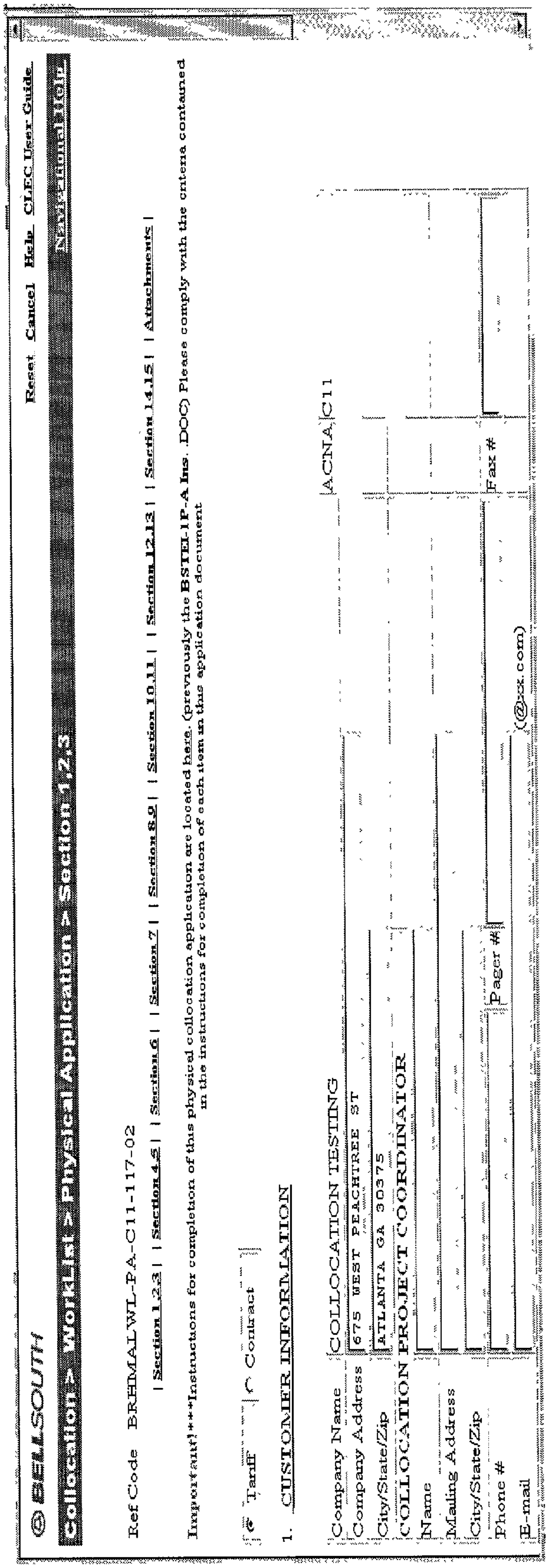
FIG. 27 is an exemplary screen shot depicting section 1 of an exemplary revision of a collocation application.

When a user selects "Revise," a new reference code is assigned as shown in FIG. 27. The reference code indicates that this is version "02" of the application. Additionally, a "save" option is no longer available among the main menu options shown at the top of the screen because an initial version of the application has previously been submitted. The user completes any revisions and submits the application. Other aspects of revising an application are generally the same or similar to entering information for and submitting an initial application. Version 01 of the application that was revised remains in the database but is marked superseded, providing an audit trail. The superseded applications are not viewed by users unless specifically requested and are kept primarily as historical records.

Referring to FIG. 7, for those applications where a Response to the application has been sent by the ILEC, a "Firm Order" link is available. The user selects the link to view the firm order document. A firm order may not be revised. To place an order, the user completes and submits the firm order form.

Referring again to FIG. 7, a user may augment an existing equipment arrangement by selecting "Augment Ref Code." If "Augment Ref Code" is selected, the activity types available for selection are augment, disconnect, and termination, and the CLLI and ACNA are also entered. The user enters the reference code of the arrangement to be augmented prior to selecting the "Augment Ref Code" link. If the original application is available, it is provided as a basis for the augment application and the application type, CLLI, and ACNA of the augment application correspond to those of the original application. The assigned application number is the next available number for the CLLI and ACNA, regardless of the original application number, and the version number is preceded by an "A" to indicate that the application is for an augment. FIG. 28 shows an example of section 3 of an augment application. Under "Type of Interconnection Activity," the only choices offered are augment options.

Figure 29:
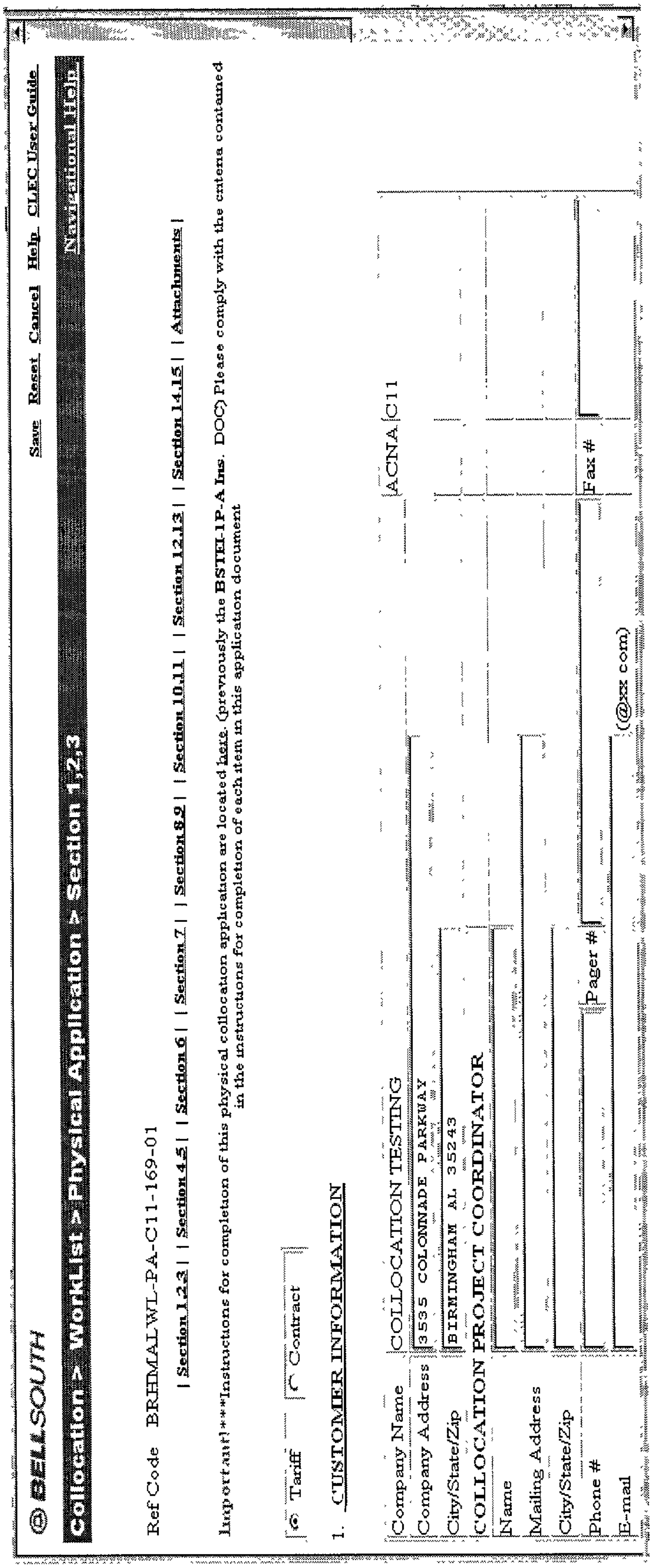
FIG. 29 is an exemplary screen shot illustrating section 1 of an exemplary collocation application created from an existing application.

Referring to FIG. 7, users may utilize "Create New from Ref Code" to create a new application that is based on an existing application. The user enters the reference code to be used as the basis for the new application and the CLLI code for the new application. The ACNA field is automatically populated by the system based on the user's profile. The user then selects "Create New from Ref Code" to create the new application. As shown in FIG. 29, a new reference code is generated using the CLLI code provided by the user and the next application number available for the CLLI and ACNA, and other information in the application is automatically populated based on the information in the previously existing application. Examples of sections 2 and 3 of a new application created in this manner are shown in FIG. 30. The user verifies that the requested location is correct in section 2 and selects the type of interconnection activity in section 3. Other aspects of completing the application are generally the same or similar to submitting an initial application created without reference to an existing application, as described above with reference to FIGS. 10–26.

Once a collocation application is submitted by a user, the ILEC coordinator is notified by the system by e-mail or some other electronic means. The account team reviews the application for special contractual obligations that may exist between the user and the ILEC. Contractual obligations or other requirements are generally not validation or consistency checks performed by the system because contracts between the ILEC and each CLEC are constantly changing and being re-negotiated. The contract requirements for each CLEC may be implemented electronically, but this would require the implementation of complex and subjective business rules into the system, as well as additional personnel to enter the numerous updates.

The ATCC can revise the application as required, once the user has submitted the application. The system records that the changes were entered by the ATCC. After a complete review, if everything in the application is satisfactory, the ATCC changes the status of the application to "App Bona Fide." Overrides and special conditions may also be attached to an application by the ATCC. For an application status change, from status A to status B for example, a table provides for which field groups of the ILEC are to be notified of the status change. Several exemplary status descriptions include, but are not limited to, the options listed in Table 2:

TABLE 2

| STATUS | DESCRIPTION |
|---|---|
| Unsubmitted | Application has been saved but not submitted |
| App Received | Application has been submitted |
| App Bona Fide | Application is ready to be processed |
| Internal Hold | Application issues need to be clarified with user |
| Space Response | Space response has been sent |
| Response | Response sent to user |
| FO Received | Firm order received |
| FO Bona Fide | Ready for provisioning |
| Permit Hold | ILEC has applied for a building permit |
| Canceled | Application is canceled and no longer accessible |
| Space Ready | Space is available and waiting on acceptance by user |
| Space Accepted | Space has been accepted by user |

An exemplary status area 124, as shown in FIGS. 7–9, provides the current status of the application and the date of the most recent status change for the application. An ILEC may select the current status on the worklist to update an application status. CLECs rely on this status information to monitor application activity. A screen detailing the application status history, as shown in FIG. 31, appears when the user selects the status link. In an alternate embodiment, the status history feature may only be available to the ILEC. A log of the application history appears at the bottom of the screen, from oldest to newest entry. Most status changes are made in a logical order. As an example, the ILEC is not allowed to change "App Bona Fide" to "FO Bona Fide." An error message appears, indicating that the change is invalid and listing the steps that have not yet been completed for the application. When placing an application on "Internal Hold," the ILEC must provide a comment to explain the reason. A comment is also required to explain the reason for removal of the "Internal Hold" (e.g., what corrections or remedial actions have been performed).

V. Processing of Collocation Applications

Once an application enters the App Bona Fide status (i.e., a space response or response is being prepared by the ILEC), a workbook is created. The workbook is a valuable tool for users and for the ILEC. The individual profile role is used to determine what system features are available to each field group of the ILEC. For example, each ILEC field group may be able to view all sections of the workbook but only be allowed to save or submit information related to that field group's particular function. FIG. 32 depicts an exemplary workbook summary screen for a collocation application, in this example, reference code BWLGKYMA-PA-ACA-100-01. The workbook summary provides the ILEC field groups with the ability to quickly determine whether they need to provide a response to the application. The workbook summary checkmarks are activated based on the details provided in the application using a fixed set of business rules. This feature saves a significant amount of time for the ILEC field groups since they now will only review applications that require a response from their functional area. There are numerous menu links to additional sections or pages of the workbook across the top of the screen, as shown in FIG. 32. Selecting "Application" takes the field group directly to the application to obtain any necessary information needed to complete a workbook section. Selecting "Attachments" allows for the addition and/or deletion of attachments to and/or from the workbook. A file may be attached by selecting "Attach File," as shown in FIG. 33.

An exemplary Reference section is shown in FIGS. 34 and 35. After changing the status of the application to "App Bona Fide," the Common Systems Capacity Management (CSCM) group selects the contract type from the drop-down menu, as shown in FIG. 34. The billing account number and zone are completed if necessary, and the ILEC selects "Submit" to submit the completed Reference page. As shown in FIG. 35, the Reference page contains contact information for ATCCs and collocation project coordinators. The Reference page may also display status information for associated collocation application reference numbers.

An exemplary Space Availability section is shown in FIG. 36. The CSCM group enters the space response information. Notification of the applicable field groups is triggered once the CSCM group submits the completed page. The ATCC sends the response to the CLEC and updates the status of the application to "Space Response" to reflect that the space response has been sent to the CLEC. If the space response is other than as requested by the CLEC, then comments may be included. In certain instances, there may not be any space available at the desired CO location. If this is the case, the status of the application is changed to an "Internal Hold" status.

FIGS. 37–39 are exemplary screen shots of a Customer Inquiry Response (CIR). In an exemplary embodiment, the CIR generally appears on a single screen. The CIR is the detailed response to the customer or user. It is a compilation of the individual responses from the ILEC field groups and contains the cost estimate for the work to provide the user with the requested collocation space. A user or CLEC may view the CIR page while the application is in the Response status.

The application workbook also contains sections for applicable field groups. Links to these sections are provided at the top of the workbook Reference screen, as shown in FIG. 32. As examples, FIGS. 40–43 show workbook pages for several ILEC field groups. FIG. 40 shows an exemplary workbook section for the Power Capacity Management (PCM), FIG. 41 shows an exemplary workbook section for CO-Operations, FIG. 42 shows an exemplary workbook section for the Interconnection Network Access Coordinator (INAC); and FIG. 43 shows an exemplary workbook section for the Circuit Capacity Management (CCM) field group. Other field groups shown in FIG. 32 include Corporate Real Estate and Services (CRE&S), CSCM, Outside Plant Engineering (OSPE), Service Quality Measurement (SQM), and Connecting Facility Assignment (CFA). Exemplary screen shots are not shown for these additional field groups, but exemplary sections would contain information tailored to the specific group and would be generally similar to those shown in FIGS. 40–43. Each field group responds to its own page, and the pages are customized based on the contract type. Additionally, some data fields are automatically populated by the system, based on information from other sections or provided by the user when completing the application, and may not be edited. As each field group submits its page, the INAC is notified. Once all of the applicable field groups complete their respective section, the INAC completes and submits the INAC page, an exemplary embodiment of which is shown in FIG. 44.

The ATCC reviews the CIR, shown above in FIGS. 37–39, and sends it to the user. The ATCC is notified once the INAC workbook section is complete. The CIR is customized by contract type and once it is sent, the status of the application is changed to "Response" to reflect that the CIR has been sent to the user. If the ATCC approves, the CIR is sent to the CLEC and the date and time of transmission are recorded. The ILEC may select the "Critical Dates" page, as shown in FIG. 45, from the workbook to view the critical dates for certain tasks related to the collocation application. The field for the last date updated and status flag for each section of the workbook is populated as shown at the bottom of FIG. 45.

Once the CIR is sent to the CLEC, the CLEC must submit a firm order within a predetermined period of time, based on federal regulations and/or contractual obligations. If the CLEC fails to do so, the status of the application is changed to "Expired," the application is removed from the worklist, and notification is sent internally (at the ILEC) to release the allocated space. If the CLEC submits a firm order, the status of the application is changed to "FO Received" to reflect this and provisioning begins among the ILEC field groups to prepare the collocation space once the firm order is reviewed and verified as complete (status changes to "FO Bona Fide"). FIG. 46 is an exemplary Firm Order form where the user provides any requested information and submits a firm order for the application.

Figure 48:
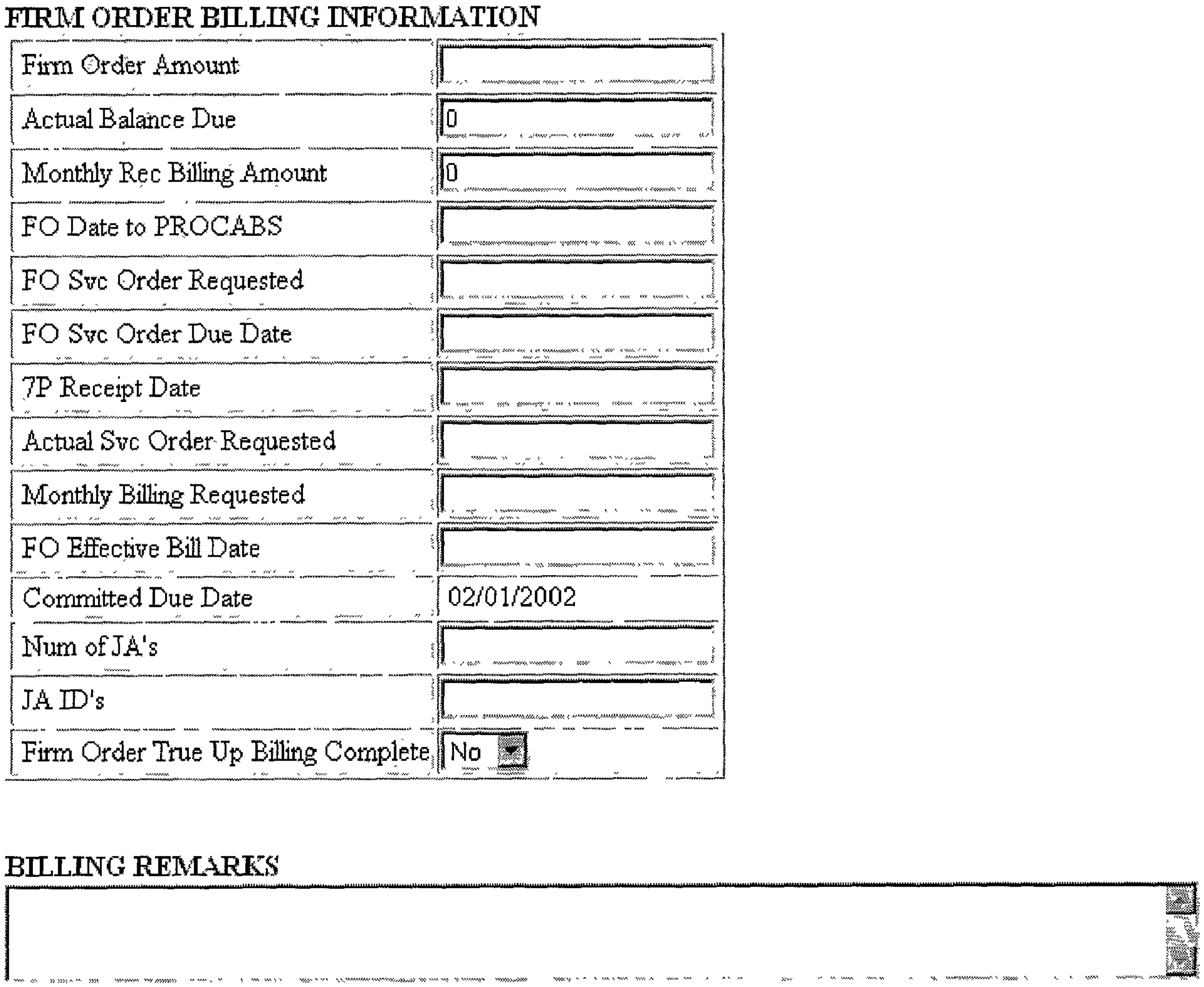
FIG. 48 is an exemplary screen shot showing an exemplary billing screen.

An exemplary billing screen, as shown in FIGS. 47 and 48, may be accessed by selecting the dollar sign icon in the action area of the worklist page, as shown in FIG. 8 and discussed briefly above. The billing page is only available to ILEC personnel. The exemplary embodiment shown in FIGS. 47 and 48 is divided into four sections: general information, application billing information, firm order billing information, and remarks.

Once the firm order is bona fide, provisioning begins. The ILEC records dates such as completion of build out, customer review of space, and customer acceptance of space. Once the customer accepts the collocation space and the project is completed, a true-up phase begins. This is a reconciliation phase, but no billing is actually done by the ILEC. FIGS. 49–51 show exemplary Firm Order True-Up screens. At this stage, the ILEC is providing the user with final data regarding costs and other details so that billing can begin.

VI. Management of Collocation Applications, including Administrative Notification and Due Date and Event Date Management The system notifies the various ILEC functional or field groups via e-mail or some other electronic means of numerous key events as a collocation application progresses through the process from start ("App Received") to finish ("Request Complete"). An extensive set of database tables is utilized to provide a flexible yet easily maintained process.

The foundation of the notification process is the geographically-based areas composed of one or more CLLI codes, which may be referred to as "Notification Areas". A CLLI can be included in any number of areas. Therefore, a Notification Area for a state is composed of all CLLIs within the geographic boundary of the state. A sub-state "Notification Area" can contain any number of CLLIs including CLLIs from adjoining states to reflect cross-boundary ILEC field groups. This allows each field group within an area to describe its geographic boundaries uniquely and separately from all other field groups. For each field group, all CLLIs within an area are assigned to a uniquely named grouping. After the Notification Area(s) for a field group are defined, the members of that field group may be associated with that Notification Area(s) in the individual profile for each field group member that utilizes the system.

Figure 52:
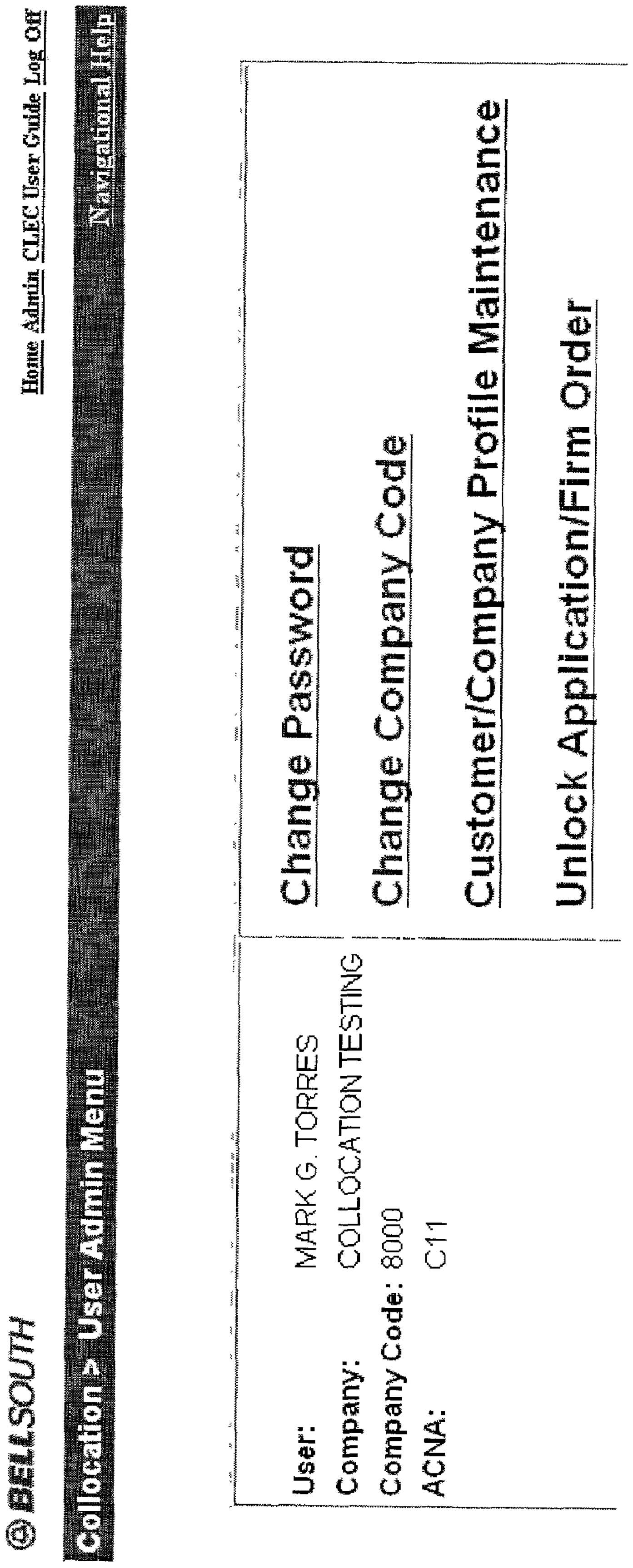
FIG. 52 is an exemplary screen shot showing an administration menu for a system administrator.
Figure 53:
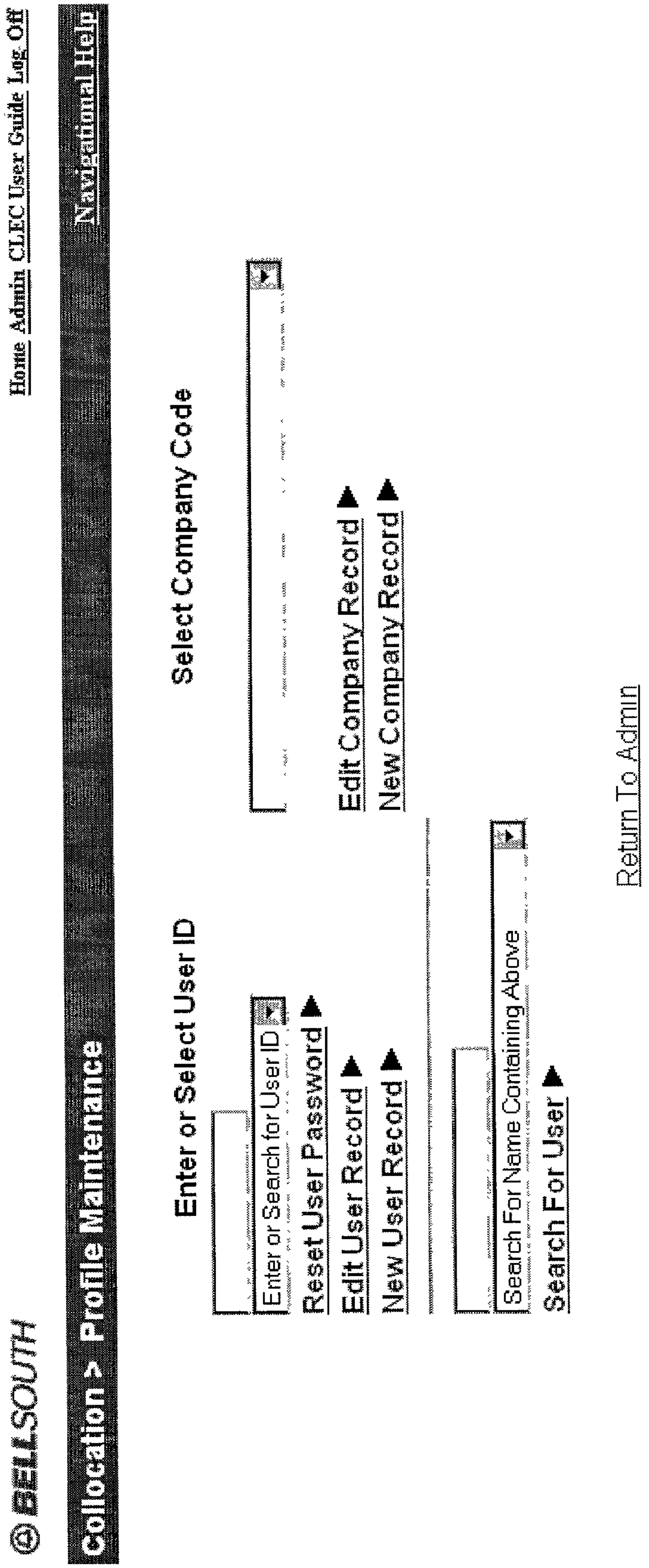
FIG. 53 is an exemplary screen shot depicting a profile maintenance menu screen.
Figure 55:
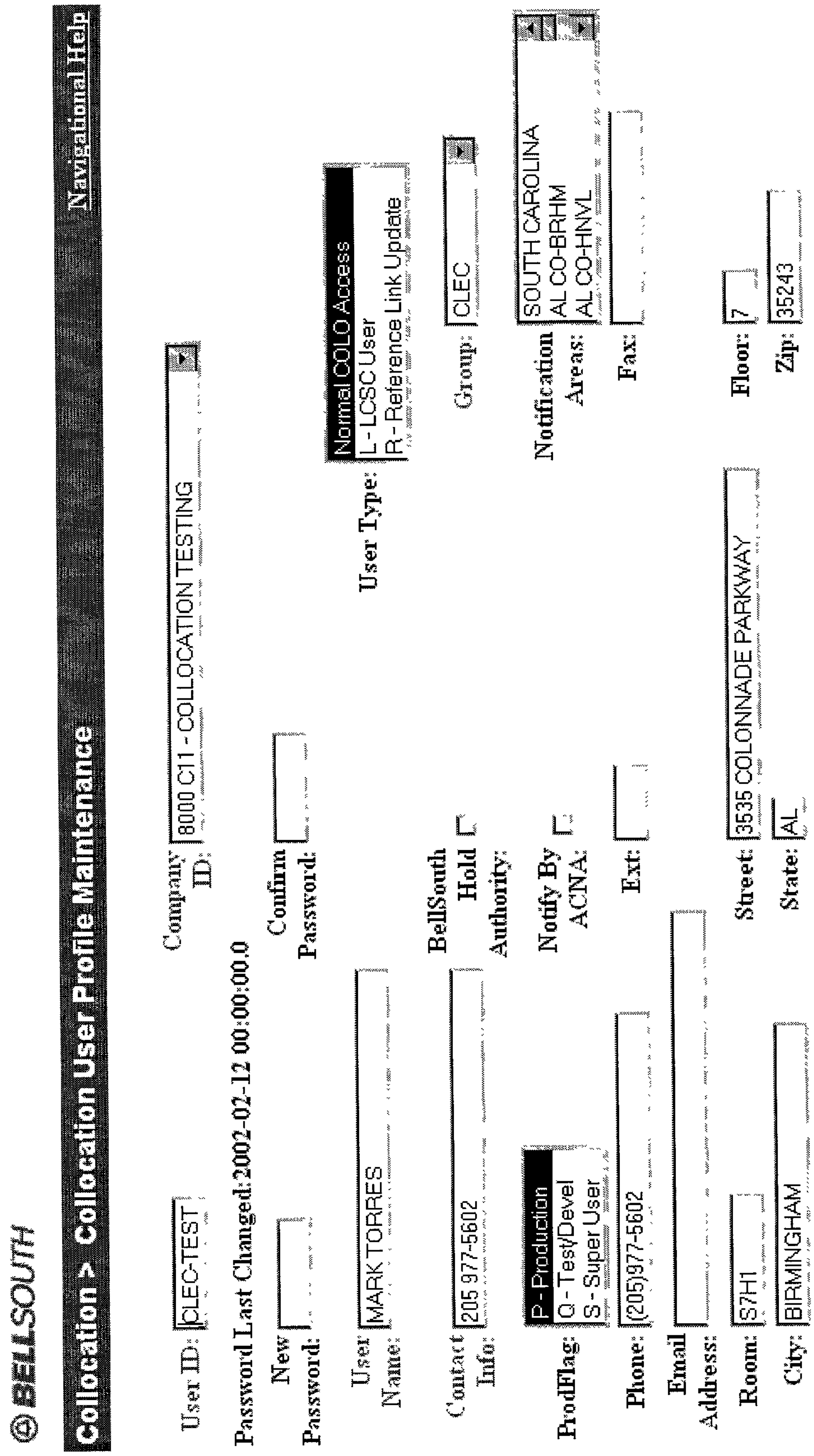
FIG. 55 is an exemplary screen shot depicting an individual profile maintenance screen.
Figure 57:
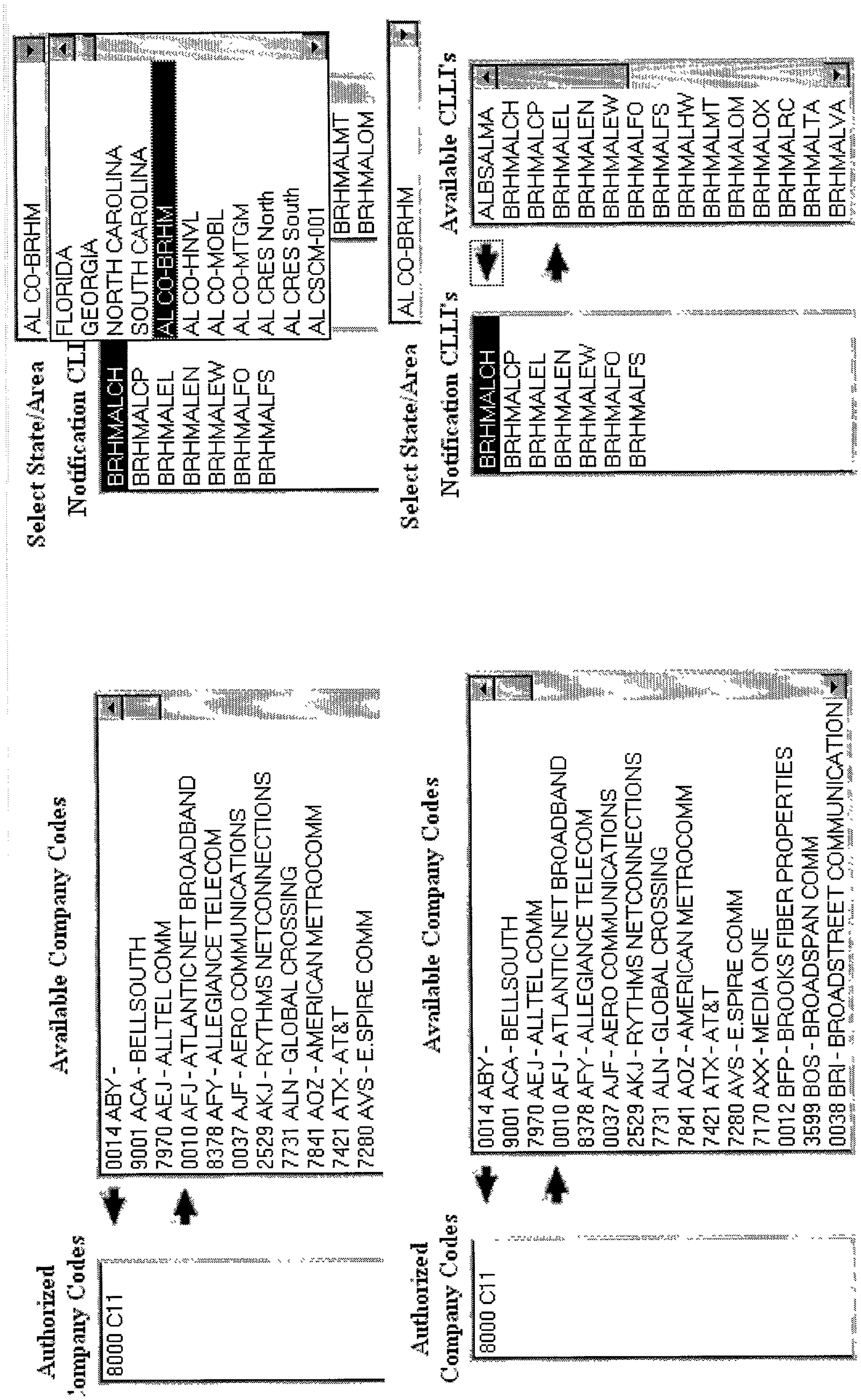
FIG. 57 is an exemplary screen shot depicting an individual profile maintenance screen.

As shown in FIG. 52, the Customer/Company Profile Maintenance screen is available to system administrators from the administrator menu screen. Profile maintenance options include maintenance of both company and individual user (including CLEC users and ILEC field groups, administrators, or other ILEC personnel) profiles, as shown in FIG. 53. Before an application can be submitted, a record for both the company or CLEC and the individual must be added to the system. An exemplary embodiment of a company profile maintenance screen is shown in FIG. 54. An exemplary embodiment of a individual profile maintenance screen is shown in FIGS. 55–57, and although shown in multiple figures, is typically viewable on a single screen.

As shown in FIG. 56, users, administrators, and ILEC field group members using the system are assigned to a group, including, but not limited to, for example, ATCC, Billing, CCG, CCM, CLEC, CO, Collections, CRE&S, CSCM, INAC, and Legal. The group or role to which the individual is assigned defines the features of the system that are available to that individual. An individual may be associated with one or more Notification Areas. For example, if a user was to be associated with Florida and Georgia, then those two states would be selected in the notification area panel. As shown in FIG. 55, three Notification Areas (South Carolina, AL CO-BRHM, and AL CO-HNVL) are visible in the selection panel. An unlimited number of Notification Areas can be defined in the system. Some individuals will require a custom Notification Area. The system has the capability to associate a CLLI list in addition to a Notification Area with any individual. The portion of the screen shown in FIG. 57 provides an example of how seven CO CLLIs may be associated with an individual.

The notification process is event driven by a change in application status or other specific event. When an event occurs, a custom notification is generated by the system and distributed based on the notification rules. Each defined event is associated with one or more groups or roles. The system identifies a "Notification Group," comprising all users associated with that particular role and who are also associated with a Notification Area or CLLI for the application that generated the event. All members of the Notification Group receive the email notification that identifies the application by reference number and the event that occurred along with any other information that is significant to the event. Exemplary embodiments of such a notification process and system include an Internet-based email process that provides for either internal ILEC notification, external notification of vendors and suppliers, or both.

Workflow management functions of the system are centered around a process which may be referred to as "Critical Date Management." In this context, both due dates and event dates are considered part of the Critical Date Management process. Due dates for a collocation application are based on event intervals as defined by federal and/or state regulatory bodies. Collocation application event intervals are based on a number of characteristics of the application space, including, but not limited to, application type (physical or virtual), space type (caged or cageless), and activity type (initial or augment). An exemplary embodiment may utilize a table-based lookup to provide the flexibility needed to define all of the possible parameters of the due date intervals. The due dates for any individual application are primarily determined when the application status is set to App Bona Fide and then FO Bona Fide. Accordingly, the application status section is significant for the Critical Date Management process, as is the critical dates section.

Exemplary embodiments of application status screens are shown in FIGS. 31, 58, and 59. The application status screen may be accessed from the worklist by selecting the status for the application. In an exemplary embodiment, only ILEC field groups or other ILEC personnel may access this screen. The ATCC, as the customer or user contact group, has primary responsibility with regard to changing the status of an application. Some of the exemplary status options are visible in FIG. 58.

The event date for the status change is the date on which the status of the application is updated. In some cases, the application status is not actually changed on the event date. One example of this is where a number of applications are submitted at the end of the day and all of them are not reviewed before the close of business on that day. Once the unexamined applications are reviewed the following business day and determined to be valid and accurate, then the status of the applications is set to App Bona Fide effective the date of receipt, not the date of the review, of the applications. The ILEC accesses the application status screen for such an application and indicates that a date override is needed.

In our example above, the date override function is used to change the App Bona Fide status date to the date the application was received. Generally, the ILEC may not enter any override date that is earlier than the App Received date. The ILEC enters an override reason and a comment (e.g., application received at the end of the day and could not be processed on the received date), as shown in FIG. 59. The date override capability allows the system to accurately capture the event with sufficient specificity to document the significant details for reporting and management. The status history section, as shown in FIGS. 58 and 59, captures all event dates, making it possible to quickly determine when changes were made and who made the changes to the application status.

The critical dates section is another significant section with regard to the Critical Date Management process. Exemplary embodiments of critical dates screens are shown in FIGS. 45, 60, and 61. The critical dates screen is accessed from the worklist by selecting the reference code of an application. In an exemplary embodiment, only ILEC field groups or other ILEC personnel may access this screen. The Program Manager (PM) group has primary responsibility as the collocation coordinator group for monitoring and as needed updates to the due dates of an application.

As shown in FIG. 60, a complete history of the dates for the selected application may be obtained from the critical dates screen. All appropriate dates for the application type, including the due dates and event dates, are shown in FIG. 60. Also included are the interval days, interval day type (e.g., calendar or business), and the interval indicator. The interval indicator shows whether the "Regulatory Space Ready Due Date" is based on the App Bona Fide (AB) or FO Bona Fide (FO) event date. For event dates, the system calculates the actual interval days based on the business rules used to determine the corresponding due date. Using this approach ensures that a valid comparison can be made across all applications for statistical analysis and for reporting to regulatory bodies.

As with event dates, situations arise where due dates need to be updated to take into consideration unforeseen changes to business rules. A common example of this is where a regulatory body issues a retroactive ruling. Such a ruling requires changes to the system interval tables in order to show an effective date in the past. After the system interval table has been updated, all impacted applications are manually updated to reflect the new due dates. Due to the critical nature of the work involved, a manual process is preferable to a mechanized implementation in order to effect such retroactive changes. As shown in FIG. 61, due date labels may be selected to allow the selected date to be updated. When a date is selected, the appropriate update screen is displayed. FIG. 62 illustrates an exemplary embodiment of a "Regulatory Space Ready Due Date" update screen. If a different interval was in effect for the exemplary embodiment shown, the different interval would be populated in the "New" column. For those situations where an update needs to be made before the system tables are updated, this screen allows direct input of the "New" values for the interval days and interval day type, as well as the interval indicator if necessary. The ability to adjust event dates and update due dates ensures that the data in the system has the necessary level of accuracy to satisfy reporting requirements.

A standard Query and Reporting tool is used to access the extensive detail available from the system database. This allows managers to track completion of work to ensure that due dates are realized. It also allows summary reporting to analyze critical date management results by ILEC group, geography, CLEC, etc. The availability of these analytical reports from a tool, such as Microsoft Access®, Oracle® Discoverer™, or similar tools, provides critical information needed to manage the application process and to respond to information inquiries from management and regulatory bodies.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method in a system for processing and managing requests for collocation space, the system comprising a workstation, a computer network, a web server, an application server, and a database, said method for assisting a user in completing an application for collocation space, comprising:

(A) obtaining user information regarding a location and physical characteristics of the collocation space and equipment to be installed therein, the collocation space comprising a physical space allocated for equipment belonging to a plurality of communications entities, wherein the user information about the location and physical characteristics comprises at least one of the following: physical space square footage information, physical space type and existing physical space information;

(B) calculating a total width using the user information;

(C) calculating heat dissipation and equipment quantity using the user information:

(D) setting data field values of the application based on the information provided by the user and the calculation based on width, heat dissipation and equipment quantity, the application comprising a form for receiving the information provided by the user;

(E) allowing a proposed layout of the equipment for the collocation space or other documents to be associated with and attached to the application, wherein said proposed layout is based on space requirements associated with the equipment;

(F) prompting submission of the application;

(G) if the user has submitted invalid or incomplete information, presenting the user with an error message and advising the user of a source of any error; and (H) providing confirmation of successful submission of the application.

2. The method of claim 1, further comprising presenting additional data fields of the application for completion by the user based on the information provided by the user.

3. The method of claim 1, further comprising performing a validation check of the application to determine whether the information provided by the user is accurate and complete.

4. The method of claim 1, further comprising prompting the user for resubmission of the application after the user has attempted to correct any error.

5. The method of claim 1, further comprising notifying an entity responsible for providing the collocation space that the application was submitted successfully.

6. The method of claim 1, further comprising allowing the user to copy contents of a previously submitted application for entry into the application.

7. The method of claim 1, further comprising allowing the user to edit a copy of a previously submitted application to create a revised application and to submit the revised application to supersede the previously submitted application.

8. The method of claim 1, wherein step B comprises accessing the database to obtain data corresponding to the information and entering the data in the data fields.

9. The method of claim 1, wherein step B comprises performing calculations based on the information and entering results in the data fields.

10. A method in a system comprising a workstation, a computer network, a web server, an application server, and a database, said method for processing and responding to requests for collocation space, comprising:

(A) obtaining from a user information regarding a location and physical characteristics of a collocation space and equipment to be installed therein, the collocation space comprising a physical space allocated for equipment belonging to a plurality of communications entities, wherein the user information about the location and physical characteristics comprises at least one of the following: physical space square footage information, physical space type and existing physical space information;

(B) calculating a total width using the user information;

(C) calculating heat dissipation and equipment quantity using the user information;

(D) setting data field values of an application for collocation space based on the information provided by the user and the calculation—based on width, heat dissipation and equipment quantity, the application comprising a form for receiving the information provided by the user;

(E) prompting submission of the application;

(F) based on data in the application, generating a workbook comprising a plurality of sections, wherein a plurality of responsible entities provide information necessary to complete the plurality of sections;

(G) setting data field values of the plurality of sections based on data in the application;

(H) when a first section of the workbook is completed by a first responsible entity, notifying a second responsible entity; and (I) sending a response to the application to the user.

11. The method of claim 10, further comprising if the user has submitted inaccurate or incomplete information, presenting the user with an error message and advising the user of a source of any error.

12. The method of claim 10, further comprising generating a critical dates section to inform the user and the plurality of responsible entities of due dates and event dates.

13. The method of claim 10, further comprising notifying a third responsible entity when a second section of the workbook is completed by the second responsible entity.

14. The method of claim 10, further comprising performing a validation check of the application to determine whether the information provided by the user is accurate and complete.

15. The method of claim 10, further comprising allowing documents to be associated with and attached to the application.

16. The method of claim 10, further comprising allowing documents to be associated with and attached to the workbook.

17. The method of claim 10, wherein step B comprises accessing the database to obtain data corresponding to the information and entering the data in the data fields.

18. The method of claim 10, wherein step B comprises performing calculations based on the information and entering results in the data fields.

19. The method of claim 10, further comprising managing assignment of event dates and calculation of due dates related to the application.

20. The method of claim 19, further comprising notifying the plurality of responsible entities of the due dates and the event dates via electronic means.

21. The method of claim 20, further comprising selectively notifying an appropriate responsible entity of an event date based on the event and the location of the collocation space.

22. The method of claim 19, wherein due dates are calculated utilizing a table-based lookup in order to determine due date intervals based on characteristics of the application.

23. The method of claim 22, further comprising allowing for revision of due dates for retroactive due date interval changes.

24. The method of claim 19, wherein event dates are assigned automatically to record application status changes.

25. The method of claim 24, further comprising allowing an event date to be adjusted by one of the plurality of responsible entities to reflect an accurate event date that is earlier than an assigned event date.

26. The method of claim 25, further comprising calculating an event date interval.

27. A method in a system comprising a workstation, a computer network, a web server, an application server, and a database, said method for processing and responding to requests for collocation space, comprising:

(A) obtaining from a user information regarding a location and physical characteristics of a collocation space and equipment to be installed therein, the collocation space comprising a physical space allocated for equipment belonging to a plurality of communications entities, wherein the user information about the location and physical characteristics comprises at least one of the following: physical space square footage information, physical space type and existing physical space information;

(B) calculating a total width using the user information;

(C) calculating heat dissipation and equipment quantity using the user information;

(D) setting data field values of an application for collocation space based on the information provided by the user and the calculation—based on width, heat dissipation and equipment quantity, the application comprising a form for receiving the information provided by the user;

(E) prompting submission of the application;

(F) based on data in the application, generating a workbook comprising a plurality of sections, wherein a plurality of responsible entities provide information necessary to complete the plurality of sections;

(G) setting data field values of the plurality of sections based on data in the application;

(H) when a first section of the workbook is completed by a first responsible entity, notifying a second responsible entity;

(I) sending a response to the application to the user;

(J) notifying a third responsible entity when a second section of the workbook is completed by the second responsible entity;

(K) managing assignment of event dates and calculation of due dates related to the application, wherein the due dates are calculated utilizing a table-based lookup in order to determine due date intervals based on characteristics of the application; and (L) allowing for revision of due dates for retroactive due date interval changes.

* * * * *